(12) United States Patent
Kizawa et al.

(10) Patent No.: US 12,492,399 B2
(45) Date of Patent: Dec. 9, 2025

(54) NUCLEIC ACID COMPLEX FOR REGULATING IHH EXPRESSION

(71) Applicant: RENA THERAPEUTICS INC., Tokyo (JP)

(72) Inventors: Hideki Kizawa, Tokyo (JP); Ko Takagi, Tokyo (JP)

(73) Assignee: RENA THERAPEUTICS INC., Tokyo (JP)

( * ) Notice: Subject to any disclaimer, the term of this patent is extended or adjusted under 35 U.S.C. 154(b) by 1127 days.

(21) Appl. No.: 17/437,692

(22) PCT Filed: Mar. 13, 2020

(86) PCT No.: PCT/JP2020/011018
§ 371 (c)(1),
(2) Date: Sep. 9, 2021

(87) PCT Pub. No.: WO2020/184700
PCT Pub. Date: Sep. 17, 2020

(65) Prior Publication Data
US 2022/0162607 A1 May 26, 2022

(30) Foreign Application Priority Data
Mar. 14, 2019 (JP) .................................. 2019-047703

(51) Int. Cl.
| | |
|---|---|
| *C07H 21/02* | (2006.01) |
| *A61K 31/7088* | (2006.01) |
| *A61P 1/16* | (2006.01) |
| *A61P 11/00* | (2006.01) |
| *A61P 13/12* | (2006.01) |
| *A61P 17/00* | (2006.01) |
| *C12N 15/113* | (2010.01) |

(52) U.S. Cl.
CPC ........ *C12N 15/113* (2013.01); *A61K 31/7088* (2013.01); *A61P 1/16* (2018.01); *A61P 11/00* (2018.01); *A61P 13/12* (2018.01); *A61P 17/00* (2018.01); *C12N 2310/11* (2013.01); *C12N 2310/315* (2013.01); *C12N 2310/321* (2013.01); *C12N 2310/3231* (2013.01); *C12N 2310/3341* (2013.01); *C12N 2310/3517* (2013.01); *C12N 2320/32* (2013.01)

(58) Field of Classification Search
CPC .............. C12N 15/113; C12N 2310/11; C12N 2310/14
See application file for complete search history.

(56) References Cited

U.S. PATENT DOCUMENTS

| | | | |
|---|---|---|---|
| 9,164,105 | B2 | 10/2015 | Song et al. |
| 2010/0130595 | A1 | 5/2010 | Dean et al. |
| 2011/0183948 | A1 | 7/2011 | Levine et al. |
| 2012/0252870 | A1* | 10/2012 | Wei ............. A61P 19/02 435/7.1 |
| 2013/0116301 | A1 | 5/2013 | Freier et al. |
| 2014/0073687 | A1 | 3/2014 | Chien |
| 2020/0224196 | A1 | 7/2020 | Iriyama et al. |

FOREIGN PATENT DOCUMENTS

| | | |
|---|---|---|
| CN | 108728440 A | 11/2018 |
| JP | 2013099338 A | 5/2013 |
| JP | 2014511694 A | 5/2014 |
| JP | 2014530004 A | 11/2014 |
| KR | 20140128257 A | 11/2014 |
| WO | 2011005765 A1 | 1/2011 |
| WO | 2011029914 A1 | 3/2011 |
| WO | 2016160721 A1 | 10/2016 |
| WO | 2017184586 A1 | 10/2017 |
| WO | 2019022196 A1 | 1/2019 |

OTHER PUBLICATIONS

Nishina et al. (Nature Communications, 6, 7969, 2015, 1-13).*
Supplementary European Search Report for Corresponding European Patent Application No. 20770166.5, Jun. 1, 2023, 22 pages.
1 Office Action to Corresponding Japanese Patent Application No. 2021-505155, Apr. 23, 2024, 5 pages.
Omenetti et al., "Hedgehog Signaling in the Liver", J Hepatol., 2011, vol. 54, No. 2, pp. 366-373.
Pritchett et al., "Osteopontin Is a Novel Downstream Target of SOX9 With Diagnostic Implications for Progression of Liver Fibrosis in Humans", Hepatology, 2012, vol. 56, No. 3, pp. 1108-1116.
Li et al., "Suppression of hedgehog signaling regulates hepatic stellate cell activation and collagen secretion", Int J Clin Exp Pathol, 2015, vol. 8, No. 11, pp. 14574-14579.
Angulo et al., "Fibrosis in Nonalcoholic Fatty Liver Disease: Mechanisms and Clinical Implications", Seminars in Liver Disease, 2015, vol. 35, No. Feb. 2015, pp. 132-145,.
Wang et al., "Hepatocyte TAZ/WWWTR1 Promotes Inflammation and Fibrosis in Nonalcoholic Steatohepatitis", Cell Metab., 2016, vol. 24, No. 6, pp. 848-862.
International Search Report for Corresponding International Application No. PCT/JP2020/011018 (4 Pages) (May 26, 2020).
Supplementary Partial European Search Report for Corresponding European Application No. 20770166.5, Jan. 4, 2023, 17 pages.

\* cited by examiner

*Primary Examiner* — Amy Rose Hudson
(74) *Attorney, Agent, or Firm* — Lucas & Mercanti, LLP

(57) ABSTRACT

This invention provides a nucleic acid complex and a method for decreasing the expression levels of mRNA and a protein of the IHH gene in animals. The nucleic acid complex for decreasing the expression levels of mRNA and a protein of the IHH gene serves as an IHH-specific inhibitor and it is thus useful for elucidation of IHH gene functions. In addition, an IHH-specific inhibitor is useful for treatment, prevention, amelioration, or delaying of the progression of fibrosis and other fibrotic diseases. Since the nucleic acid complex according to the present invention specifically inhibits IHH gene expression, it is useful for a patient who is in need of treatment, prevention, amelioration, or delaying of the progression of fibrosis and other fibrotic diseases.

20 Claims, 28 Drawing Sheets

Specification includes a Sequence Listing.

Fig. 2-1

IHH gene SEQ ID NO: 1 (human IHH gene)
NCBI Reference Sequence: NM_002181.3

```
   1 atcagcccac caggagacct cgcccgccgc tcccccgggc tccccggcca tgtctcccgc
  61 ccggctccgg ccccgactgc acttctgcct ggtcctgttg ctgctgctgg tggtgccggc
 121 ggcatggggc tgcgggccgg gtcgggtggt gggcagccgc cggcgaccgc cacgcaaact
 181 cgtgccgctc gcctacaagc agttcagccc caatgtgccc gagaagaccc tgggcgccag
 241 cggacgctat gaaggcaaga tcgctcgcag ctccgagcgc ttcaaggagc tcacccccaa
 301 ttacaatcca gacatcatct tcaaggacga ggagaacaca ggcgccgacc gcctcatgac
 361 ccagcgctgc aaggaccgcc tgaactcgct ggctatctcg gtgatgaacc agtggccgg
 421 tgtgaagctg cgggtgaccg agggctggga cgaggacggc caccactcag aggagtccct
 481 gcattatgag ggccgcgcgg tggacatcac cacatcagac cgcgaccgca ataagtatgg
 541 actgctggcg cgcttggcag tggaggccgg ctttgactgg gtgtattacg agtcaaaggc
 601 ccacgtgcat tgctccgtca agtccgagca ctcggccgca gccaagacgg cggctgctt
 661 ccctgccgga gcccaggtac gcctggagag tggggcgcgt gtggccttgt cagccgtgag
 721 gccgggagac cgtgtgctgg ccatggggga ggatgggagc cccaccttca gcgatgtgct
 781 cattttcctg gaccgcgagc ctcacaggct gagagccttc caggtcatcg agactcagga
 841 ccccccacgc cgcctggcac tcacacccgc tcacctgctc tttacggctg acaatcacac
 901 ggagccggca gcccgcttcc gggccacatt tgccagccac gtgcagcctg ccagtacgt
 961 gctggtggct gggggtgccag gcctgcagcc tgcccgcgtg cagctgtct ctacacacgt
1021 ggccctcggg gcctacgccc cgctcacaaa gcatgggaca ctggtggtgg aggatgtggt
1081 ggcatcctgc ttcgcggccg tggctgacca ccacctggct cagttggcct tctggcccct
1141 gagactcttt cacagcttgg catgggcag ctggaccccg ggggagggtg tgcattggta
1201 ccccagctg ctctaccgcc tggggcgtct cctgctagaa gagggcagct tccacccact
1261 gggcatgtcc ggggcaggga gctgaaagga ctccaccgct gccctcctgg aactgctgta
1321 ctgggtccag aagcctctca gccaggaggg agctggccct ggaagggacc tgagctgggg
1381 gacactggct cctgccatct cctctgccat gaagatacac cattgagact tgactgggca
1441 acaccagcgt cccccacccc cgtcgtggtg tagtcataga gctgcaagct gagctggcga
1501 ggggatggtt gttgacccct ctctcctaga gaccttgagg ctggcacggc gactcccaac
1561 tcagcctgct ctcactacga gttttcatac tctgcctccc ccattgggga gggcccattc
1621 catccatctt aggcccttt gggtgggctt gcgcctcagt tgatgctgct aaattccctg
1681 ggagccagca tggatctggc tggacccgat gctgtccaga actgggaagg ccacaggggt
1741 ggggcagcca tcccggccat tctgaggtat gacattcctc cccggccaca ctcctcaaga
1801 cacatccaga gactgttgct gtctgtgggc agagttctgt gttctggcca atgtgaccgt
1861 agtgccgggg actgggggag gtgggttgga tgtgcttgcc accccccgg ctaagctccc
1921 ccttctgctg aaccatgatc cccaccccct ccgccggtca gtctcccata ccttatttat
1981 tggagtggag ggggaagccc atgggagaat tttggggatg ttttggtctt ttcttccttt
2041 tgtaataaaa attatttaag ttgttagagc caaa
```

Fig. 2-2

IHH gene SEQ ID NO: 2 (mouse III gene)
NCBI Reference Sequence: NM_010544.3

```
   1 ctcactcgac cccgggctgc gccgcagacg gcagcagctc ccgctctgcc cgagccgcct
  61 gaccgccggg ccggggtgct aaccgcgggt cccttcagtc cgccggccgg gccagcccag
 121 cccagcccgc cggccctcag ccccgccgcc cgccgccccc cgccgtcgcc gcgttgccaa
 181 aacaaacggg ccggcctatt tattggcggc cggcgagccg ggcagctcag agtcgaggcg
 241 ccgaggggga cagcacgccg ccaccagcca gggccccggg ccccgcccc gcacctgagt
 301 cccgtcggcc ttgagccgcg tcgcgctgcc catggcgccc cgcatggag tccccaagag
 361 ccacccagac gcctgagtcc ccgaagctgt cccagccacg cgcccaccta tcagcccacc
 421 aggcgccctc gcccgctgct ctcccgggct acccggccat gtctcccgcc tggctccggc
 481 cccgactgcg gttctgtctg ttcctgctgc tgctgcttct ggtgccggcg gcgcggggct
 541 gcgggccggg ccgggtggtg ggcagccgcc ggaggccgcc tcgcaagctc gtgcctcttg
 601 cctacaagca gttcagcccc aacgtgccgg agaagaccct gggcgccagc gggcgctacg
 661 aaggcaagat cgcgcgcagc tctgagcgct tcaaagagct caccccaac tacaatcccg
 721 acatcatctt caaggacgag gagaacacgg gtgccgaccg cctcatgacc cagcgctgca
 781 aggaccgtct gaactcactg gccatctctg tcatgaacca gtggcctggt gtgaaactgc
 841 gggtgaccga aggctgggat gaagatggcc atcactcaga ggagtcttta cactatgagg
 901 gccgcgcggt ggatatcacc acctcagacc gtgaccgaaa taagtatgga ctgctggcgc
 961 gcttagcagt ggaggccggc ttcgactggg tgtattacga gtccaaggcc cacgtgcatt
1021 gctctgtcaa gtctgagcat tcggccgctg ccaagacagg tggctgcttt cctgccggag
1081 cccaggtgcg cctagagaac ggggagcgtg tggccctgtc agctgtaaag ccaggagacc
1141 gggtgctggc catgggggag gatgggaccc ccaccttcag tgatgtgctt atttttcctgg
1201 accgcgagcc aaaccggctg agagctttcc aggtcatcga gactcaggat cctccgcgtc
1261 ggctggcgct cacgcctgcc cacctgctct tcattgcgga caatcataca gaaccagcag
1321 cccacttccg ggccacattt gccagccatg tgcaaccagg ccaatatgtg ctggtatcag
1381 gggtaccagg cctccagcct gctcgggtgg cagctgtctc cacccacgtg gcccttgggt
1441 cctatgctcc tctcacaagg catgggacac ttgtggtgga ggatgtggtg gcctcctgct
1501 ttgcagctgt ggctgaccac catctggctc agttggcctt ctggcccctg cgactgtttc
1561 ccagtttggc atggggcagc tggaccccaa gtgagggtgt tcactggtac cctcagatgc
1621 tctaccgcct ggggcgtctc ttgctagaag agagcacctt ccatccactg gcatgtctg
1681 gggcaggaag ctgaagggac tctaaccact gccctcctgg aactgctgtg ctggatccaa
1741 aggcctcctc accaggaagg ctctggccct ggaaggcacc tggcctgagg ttgtctccgt
1801 cctctgtgcc agagtggaga caccattgag acttgaccag gtttgctggg ccccgaacct
1861 tcatcttggt gtagagctgt gaactgagct gacaagcgtg tggtaggctc tcttttccta
1921 gagaccgtaa gacccagcta gctctggctg cgattcttca cacgcattcc atctgtcttt
1981 ggactgctta ctccaatgtt tctcggggcc tgggattgtg actttactgt tggcaactga
2041 tcacagtatg aagagaggct gcccgtagat gggcttgcac tcagtcgat gctgctagat
2101 tcccttgaag ccagcaggga gctggctgga ctcattgcct cccagaactg aaagaccaca
2161 gccagcctgg acatcccgaa acatgacctt ccctgcaggc cacactcctc cagcctcctg
2221 agcctttgct gtcaatgggc ggagtctctg atccgggcaa tgtgaccctg ctacctggga
2281 ctggggaagg ggccttgcca ccctgcccca ggctaagctc cttcccctgc taaaccacac
2341 ccccacctcc tcctcctcca gtctgtctcc ttcaccctat ttatttgcat ggagggggaa
2401 atccatggga gaattttggg aatgttttgg tctttctttt gtaataaaaa ttatttaagt
2461 tgttagaaaa aaaaaa
```

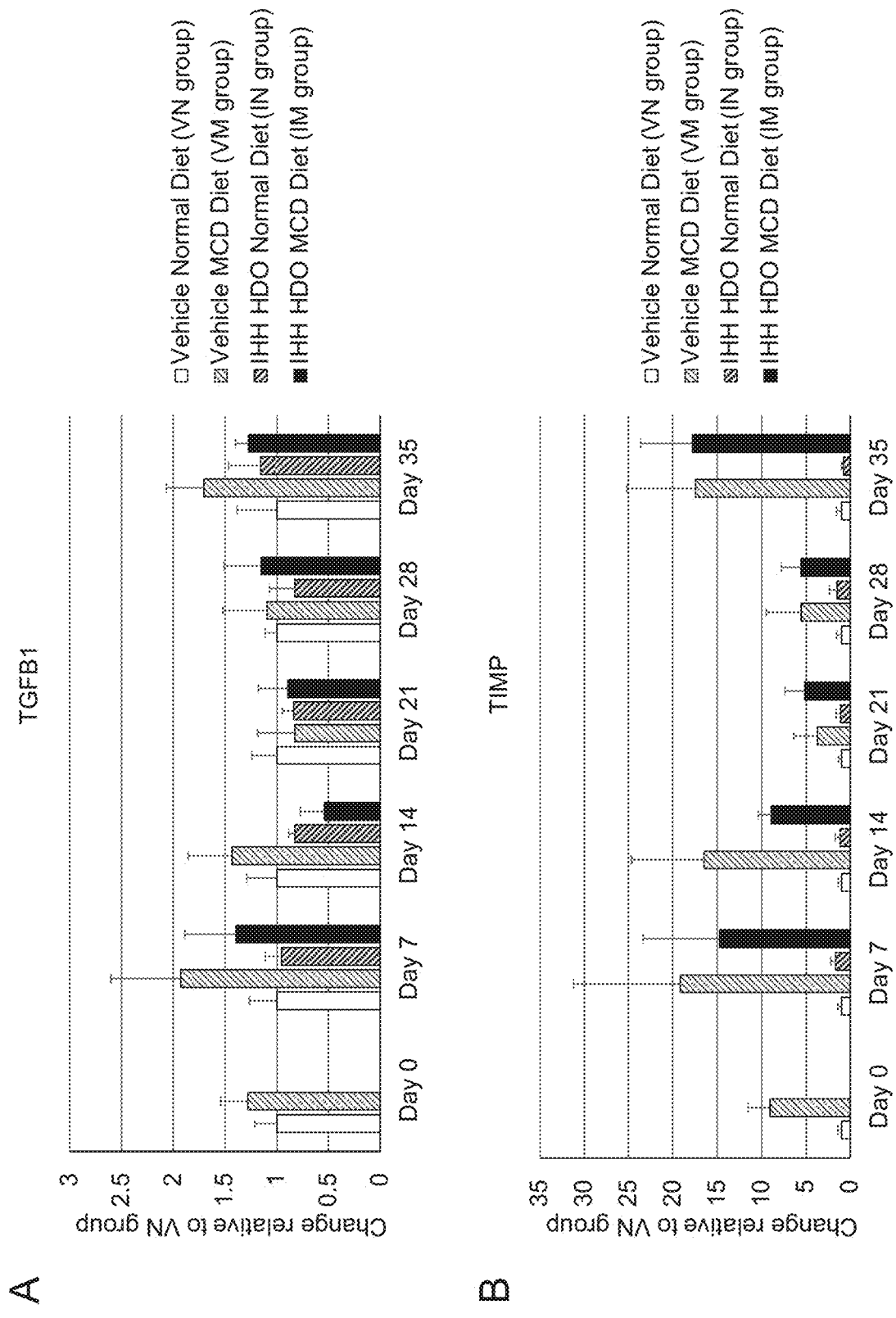

A

B

SEQUENCE LISTING

```
<160> NUMBER OF SEQ ID NOS: 194

<210> SEQ ID NO 1
<211> LENGTH: 2074
<212> TYPE: DNA
<213> ORGANISM: Homo sapiens

<400> SEQUENCE: 1
atcagcccac caggagacct cgcccgccgc tcccccgggc tccccggcca tgtctcccgc      60
ccggctccgg ccccgactgc acttctgcct ggtcctgttg ctgctgctgg tggtgccggc     120
ggcatggggc tgcgggccgg gtcgggtggt gggcagccgc cggcgaccgc cacgcaaact     180
cgtgccgctc gcctacaagc agttcagccc caatgtgccc gagaagaccc tgggcgccag     240
cggacgctat gaaggcaaga tcgctcgcag ctccgagcgc ttcaaggagc tcacccccaa     300
ttacaatcca gacatcatct tcaaggacga ggagaacaca ggcgccgacc gcctcatgac     360
ccagcgctgc aaggaccgcc tgaactcgct ggctatctcg gtgatgaacc agtggcccgg     420
tgtgaagctg cgggtgaccg agggctggga cgaggacggc caccactcag aggagtccct     480
gcattatgag ggccgcgcgg tggacatcac cacatcagac cgcgaccgca ataagtatgg     540
actgctggcg cgcttggcag tggaggccgg ctttgactgg gtgtattacg agtcaaaggc     600
ccacgtgcat tgctccgtca agtccgagca ctcggccgca gccaagacgg gcggctgctt     660
ccctgccgga gcccaggtac gcctggagag tggggcgcgt gtggccttgt cagccgtgag     720
gccgggagac cgtgtgctgg ccatggggga ggatgggagc cccaccttca gcgatgtgct     780
cattttcctg gaccgcgagc ctcacaggct gagagccttc caggtcatcg agactcagga     840
ccccccacgc cgcctggcac tcacacccgc tcacctgctc tttacggctg acaatcacac     900
ggagccggca gcccgcttcc gggccacatt tgccagccac gtgcagcctg gccagtacgt     960
gctggtggct ggggtgccag gcctgcagcc tgcccgcgtg gcagctgtct ctacacacgt    1020
ggccctcggg gcctacgccc cgctcacaaa gcatgggaca ctggtggtgg aggatgtggt    1080
ggcatcctgc ttcgcggccg tggctgacca ccacctggct cagttggcct tctggcccct    1140
```

```
gagactcttt cacagcttgg catggggcag ctggaccccg ggggaggggtg tgcattggta    1200 cccccagctg ctctaccgcc tggggcgtct cctgctagaa gagggcagct tccacccact    1260
gggcatgtcc ggggcaggga gctgaaagga ctccaccgct gccctcctgg aactgctgta    1320
ctgggtccag aagcctctca gccaggaggg agctggccct ggaagggacc tgagctgggg    1380
gacactggct cctgccatct cctctgccat gaagatacac cattgagact tgactgggca    1440
acaccagcgt cccccacccc cgtcgtggtg tagtcataga gctgcaagct gagctggcga    1500
ggggatggtt gttgaccect ctcctctaga accttgagg ctggcacggc gactcccaac    1560
tcagcctgct ctcactacga gttttcatac tctgcctccc ccattgggga gggcccattc    1620
catccatctt aggccccttt gggtgggctt gcgcctcagt tgatgctgct aaattccctg    1680
ggagccagca tggatctggc tggacccgat gctgtccaga actgggaagg ccacaggggt    1740
ggggcagcca tcccggccat tctgaggtat gacattcctc cccggccaca ctcctcaaga    1800
cacatccaga gactgttgct gtctgtgggc agagttctgt gttctggcca atgtgaccgt    1860
agtgccgggg actgggggag gtgggttgga tgtgcttgcc accccccgg ctaagctccc    1920 ccttctgctg aaccatgatc cccacccect ccgccggtca gtctcccata ccttatttat    1980
tggagtggag ggggaagccc atgggagaat ttgggggatg ttttggtctt ttcttccttt    2040
tgtaataaaa attatttaag ttgttagagc caaa                                2074

<210> SEQ ID NO 2
<211> LENGTH: 2476
<212> TYPE: DNA
<213> ORGANISM: Mus musculus

<400> SEQUENCE: 2
ctcactcgac cccgggctgc gccgcagacg gcagcagctc ccgctctgcc cgagccgcct      60
gaccgccggg ccggggtgct aaccgcgggt cccttcagtc cgccggccgg gccagcccag     120
cccagcccgc cggccctcag ccccgccgcc cgccgccccc cgccgtcgcc gcgttgccaa     180
aacaaacggg ccggcctatt tattggcggc cggcgagccg ggcagctcag agtcgaggcg     240 ccgagggga cagcacgccg ccaccagcca gggcccggg cccccgcccc gcacctgagt       300
cccgtcggcc ttgagccgcg tcgcgctgcc catggcgccc ccgcatggag tccccaagag     360
ccacccagac gcctgagtcc ccgaagctgt cccagccacg cgcccaccta tcagcccacc     420
aggcgccctc gcccgctgct ctcccgggct accggccat gtctcccgcc tggctccggc      480
cccgactgcg gttctgtctg ttcctgctgc tgctgcttct ggtgccggcg gcgcggggct     540
gcgggccggg ccgggtggtg ggcagccgcc ggaggccgcc tcgcaagctc gtgcctcttg     600
cctacaagca gttcagcccc aacgtgccgg agaagaccct gggcgccagc gggcgctacg     660
aaggcaagat cgcgcgcagc tctgagcgct tcaaagagct caccccccaac tacaatcccg     720 acatcatctt caaggacgag gagaacacgg gtgccgaccg cctcatgacc cagcgctgca    780
aggaccgtct gaactcactg gccatctctg tcatgaacca gtggcctggt gtgaaactgc     840
gggtgaccga aggctgggat gaagatggcc atcactcaga ggagtctttta cactatgagg    900 gccgcgcggt ggatatcacc acctcagacc gtgaccgaaa taagtatgga ctgctggcgc    960
gcttagcagt ggaggccggc ttcgactggg tgtattacga gtccaaggcc cacgtgcatt   1020
gctctgtcaa gtctgagcat tcggccgctg ccaagacagg tggctgcttt cctgccggag   1080
cccaggtgcg cctagagaac ggggagcgtg tggccctgtc agctgtaaag ccaggagacc   1140
```

```
gggtgctggc catgggggag gatgggaccc ccaccttcag tgatgtgctt attttcctgg    1200
accgcgagcc aaaccggctg agagctttcc aggtcatcga gactcaggat cctccgcgtc    1260
ggctggcgct cacgcctgcc cacctgctct tcattgcgga caatcataca gaaccagcag    1320
cccacttccg ggccacattt gccagccatg tgcaaccagg caatatgtg ctggtatcag     1380 gggtaccagg cctccagcct gctcgggtgg cagctgtctc cacccacgtg gcccttgggt    1440
cctatgctcc tctcacaagg catgggacac ttgtggtgga ggatgtggtg gcctcctgct    1500
ttgcagctgt ggctgaccac catctggctc agttggcctt ctggcccctg cgactgtttc    1560
ccagtttggc atggggcagc tggaccccaa gtgagggtgt tcactggtac cctcagatgc    1620
tctaccgcct ggggcgtctc ttgctagaag agagcacctt ccatccactg gcatgtctg     1680 gggcaggaag ctgaagggac tctaaccact gccctcctgg aactgctgtg ctggatccaa    1740
aggcctcctc accaggaagg ctctggccct ggaaggcacc tggcctgagg ttgtctccgt    1800
cctctgtgcc agagtggaga caccattgag acttgaccag gtttgctggg ccccgaacct    1860
tcatcttggt gtagagctgt gaactgagct gacaagcgtg tggtaggctc tcttttccta    1920
gagaccgtaa gacccagcta gctctggctg cgattcttca cacgcattcc atctgtcttt    1980
ggactgctta ctccaatgtt tctcggggcc tgggattgtg actttactgt tggcaactga    2040
tcacagtatg aagagaggct gcccgtagat gggcttgcac ctcagtcgat gctgctagat    2100
tcccttgaag ccagcaggga gctggctgga ctcattgcct cccagaactg aaagaccaca    2160
gccagcctgg acatcccgaa acatgacctt ccctgcaggc cacactcctc cagcctcctg    2220
agcctttgct gtcaatgggc ggagtctctg atccgggcaa tgtgaccta ctacctggga     2280 ctggggaagg ggccttgcca cccctgccca ggctaagctc cttcccctgc taaaccacac    2340
ccccacctcc tcctcctcca gtctgtctcc ttcaccctat ttatttgcat ggaggggaa     2400 atccatggga gaattttggg aatgttttgg tctttctttt gtaataaaaa ttatttaagt    2460
tgttagaaaa aaaaaa                                                    2476

<210> SEQ ID NO 3
<211> LENGTH: 14
<212> TYPE: DNA
<213> ORGANISM: Artificial
<220> FEATURE:
<223> OTHER INFORMATION: Synthetic

<400> SEQUENCE: 3
atgggagaat tttg                                                      14

<210> SEQ ID NO 4
<211> LENGTH: 14
<212> TYPE: DNA
<213> ORGANISM: Artificial
<220> FEATURE:
<223> OTHER INFORMATION: Synthetic

<400> SEQUENCE: 4
caaaattctc ccat                                                      14

<210> SEQ ID NO 5
<211> LENGTH: 14
<212> TYPE: DNA
<213> ORGANISM: Artificial
<220> FEATURE:
<223> OTHER INFORMATION: Synthetic

<400> SEQUENCE: 5
```

```
tacaagcagt tcag                                                       14

<210> SEQ ID NO 6
<211> LENGTH: 14
<212> TYPE: DNA
<213> ORGANISM: Artificial
<220> FEATURE:
<223> OTHER INFORMATION: Synthetic

<400> SEQUENCE: 6
ctgaactgct tgta                                                       14

<210> SEQ ID NO 7
<211> LENGTH: 14
<212> TYPE: DNA
<213> ORGANISM: Artificial
<220> FEATURE:
<223> OTHER INFORMATION: Synthetic

<400> SEQUENCE: 7
gagaagaccc tggg                                                       14

<210> SEQ ID NO 8
<211> LENGTH: 14
<212> TYPE: DNA
<213> ORGANISM: Artificial
<220> FEATURE:
<223> OTHER INFORMATION: Synthetic

<400> SEQUENCE: 8
cccagggtct tctc                                                       14

<210> SEQ ID NO 9
<211> LENGTH: 16
<212> TYPE: DNA
<213> ORGANISM: Artificial
<220> FEATURE:
<223> OTHER INFORMATION: Synthetic

<400> SEQUENCE: 9
gacatcatct tcaagg                                                     16

<210> SEQ ID NO 10
<211> LENGTH: 16
<212> TYPE: DNA
<213> ORGANISM: Artificial
<220> FEATURE:
<223> OTHER INFORMATION: Synthetic

<400> SEQUENCE: 10
ccttgaagat gatgtc                                                     16

<210> SEQ ID NO 11
<211> LENGTH: 15
<212> TYPE: DNA
<213> ORGANISM: Artificial
<220> FEATURE:
<223> OTHER INFORMATION: Synthetic

<400> SEQUENCE: 11
aggacgagga gaaca                                                      15

<210> SEQ ID NO 12
<211> LENGTH: 15
<212> TYPE: DNA
```

```
<213> ORGANISM: Artificial
<220> FEATURE:
<223> OTHER INFORMATION: Synthetic

<400> SEQUENCE: 12
tgttctcctc gtcct                                                    15

<210> SEQ ID NO 13
<211> LENGTH: 14
<212> TYPE: DNA
<213> ORGANISM: Artificial
<220> FEATURE:
<223> OTHER INFORMATION: Synthetic

<400> SEQUENCE: 13
gtggcagctg tctc                                                     14

<210> SEQ ID NO 14
<211> LENGTH: 14
<212> TYPE: DNA
<213> ORGANISM: Artificial
<220> FEATURE:
<223> OTHER INFORMATION: Synthetic

<400> SEQUENCE: 14
gagacagctg ccac                                                     14

<210> SEQ ID NO 15
<211> LENGTH: 14
<212> TYPE: DNA
<213> ORGANISM: Artificial
<220> FEATURE:
<223> OTHER INFORMATION: Synthetic

<400> SEQUENCE: 15
gtggctgacc acca                                                     14

<210> SEQ ID NO 16
<211> LENGTH: 14
<212> TYPE: DNA
<213> ORGANISM: Artificial
<220> FEATURE:
<223> OTHER INFORMATION: Synthetic

<400> SEQUENCE: 16
tggtggtcag ccac                                                     14

<210> SEQ ID NO 17
<211> LENGTH: 14
<212> TYPE: DNA
<213> ORGANISM: Artificial
<220> FEATURE:
<223> OTHER INFORMATION: Synthetic

<400> SEQUENCE: 17
atgttttggt cttt                                                     14

<210> SEQ ID NO 18
<211> LENGTH: 14
<212> TYPE: DNA
<213> ORGANISM: Artificial
<220> FEATURE:
<223> OTHER INFORMATION: Synthetic

<400> SEQUENCE: 18
aaagaccaaa acat                                                     14
```

<210> SEQ ID NO 19
<211> LENGTH: 16
<212> TYPE: DNA
<213> ORGANISM: Artificial
<220> FEATURE:
<223> OTHER INFORMATION: Synthetic

<400> SEQUENCE: 19 ataagtatg gactgc                                                          16

<210> SEQ ID NO 20
<211> LENGTH: 16
<212> TYPE: DNA
<213> ORGANISM: Artificial
<220> FEATURE:
<223> OTHER INFORMATION: Synthetic

<400> SEQUENCE: 20
gcagtccata cttatt                                                         16

<210> SEQ ID NO 21
<211> LENGTH: 14
<212> TYPE: DNA
<213> ORGANISM: Artificial
<220> FEATURE:
<223> OTHER INFORMATION: Synthetic

<400> SEQUENCE: 21
ccactgggca tgtc                                                           14

<210> SEQ ID NO 22
<211> LENGTH: 14
<212> TYPE: DNA
<213> ORGANISM: Artificial
<220> FEATURE:
<223> OTHER INFORMATION: Synthetic

<400> SEQUENCE: 22
gacatgccca gtgg                                                           14

<210> SEQ ID NO 23
<211> LENGTH: 16
<212> TYPE: DNA
<213> ORGANISM: Artificial
<220> FEATURE:
<223> OTHER INFORMATION: Synthetic

<400> SEQUENCE: 23
actgggtgta ttacga                                                         16

<210> SEQ ID NO 24
<211> LENGTH: 16
<212> TYPE: DNA
<213> ORGANISM: Artificial
<220> FEATURE:
<223> OTHER INFORMATION: Synthetic

<400> SEQUENCE: 24
tcgtaataca cccagt                                                         16

<210> SEQ ID NO 25
<211> LENGTH: 14
<212> TYPE: DNA
<213> ORGANISM: Artificial
<220> FEATURE:

```
<223> OTHER INFORMATION: Synthetic

<400> SEQUENCE: 25
ggcccacgtg catt                                                    14

<210> SEQ ID NO 26
<211> LENGTH: 14
<212> TYPE: DNA
<213> ORGANISM: Artificial
<220> FEATURE:
<223> OTHER INFORMATION: Synthetic

<400> SEQUENCE: 26
aatgcacgtg ggcc                                                    14

<210> SEQ ID NO 27
<211> LENGTH: 16
<212> TYPE: DNA
<213> ORGANISM: Artificial
<220> FEATURE:
<223> OTHER INFORMATION: Synthetic

<400> SEQUENCE: 27
tatttaagtt gttaga                                                  16

<210> SEQ ID NO 28
<211> LENGTH: 16
<212> TYPE: DNA
<213> ORGANISM: Artificial
<220> FEATURE:
<223> OTHER INFORMATION: Synthetic

<400> SEQUENCE: 28
tctaacaact taaata                                                  16

<210> SEQ ID NO 29
<211> LENGTH: 14
<212> TYPE: DNA
<213> ORGANISM: Artificial
<220> FEATURE:
<223> OTHER INFORMATION: Synthetic

<400> SEQUENCE: 29
atgggggagg atgg                                                    14

<210> SEQ ID NO 30
<211> LENGTH: 14
<212> TYPE: DNA
<213> ORGANISM: Artificial
<220> FEATURE:
<223> OTHER INFORMATION: Synthetic

<400> SEQUENCE: 30
ccatcctccc ccat                                                    14

<210> SEQ ID NO 31
<211> LENGTH: 14
<212> TYPE: DNA
<213> ORGANISM: Artificial
<220> FEATURE:
<223> OTHER INFORMATION: Synthetic

<400> SEQUENCE: 31
attttcctgg accg                                                    14
```

```
<210> SEQ ID NO 32
<211> LENGTH: 14
<212> TYPE: DNA
<213> ORGANISM: Artificial
<220> FEATURE:
<223> OTHER INFORMATION: Synthetic

<400> SEQUENCE: 32
cggtccagga aaat                                                        14

<210> SEQ ID NO 33
<211> LENGTH: 16
<212> TYPE: DNA
<213> ORGANISM: Artificial
<220> FEATURE:
<223> OTHER INFORMATION: Synthetic

<400> SEQUENCE: 33
aggtcatcga gactca                                                      16

<210> SEQ ID NO 34
<211> LENGTH: 16
<212> TYPE: DNA
<213> ORGANISM: Artificial
<220> FEATURE:
<223> OTHER INFORMATION: Synthetic

<400> SEQUENCE: 34
tgagtctcga tgacct                                                      16

<210> SEQ ID NO 35
<211> LENGTH: 14
<212> TYPE: DNA
<213> ORGANISM: Artificial
<220> FEATURE:
<223> OTHER INFORMATION: Synthetic

<400> SEQUENCE: 35
acatttgcca gcca                                                        14

<210> SEQ ID NO 36
<211> LENGTH: 14
<212> TYPE: DNA
<213> ORGANISM: Artificial
<220> FEATURE:
<223> OTHER INFORMATION: Synthetic

<400> SEQUENCE: 36
tggctggcaa atgt                                                        14

<210> SEQ ID NO 37
<211> LENGTH: 16
<212> TYPE: DNA
<213> ORGANISM: Artificial
<220> FEATURE:
<223> OTHER INFORMATION: Synthetic

<400> SEQUENCE: 37
tggtggagga tgtggt                                                      16

<210> SEQ ID NO 38
<211> LENGTH: 16
<212> TYPE: DNA
<213> ORGANISM: Artificial
<220> FEATURE:
<223> OTHER INFORMATION: Synthetic
```

```
<400> SEQUENCE: 38
accacatcct ccacca                                                        16

<210> SEQ ID NO 39
<211> LENGTH: 16
<212> TYPE: DNA
<213> ORGANISM: Artificial
<220> FEATURE:
<223> OTHER INFORMATION: Synthetic

<400> SEQUENCE: 39
gctcagttgg ccttct                                                        16

<210> SEQ ID NO 40
<211> LENGTH: 16
<212> TYPE: DNA
<213> ORGANISM: Artificial
<220> FEATURE:
<223> OTHER INFORMATION: Synthetic

<400> SEQUENCE: 40
agaaggccaa ctgagc                                                        16

<210> SEQ ID NO 41
<211> LENGTH: 14
<212> TYPE: DNA
<213> ORGANISM: Artificial
<220> FEATURE:
<223> OTHER INFORMATION: Synthetic

<400> SEQUENCE: 41
atggggcagc tgga                                                          14

<210> SEQ ID NO 42
<211> LENGTH: 14
<212> TYPE: DNA
<213> ORGANISM: Artificial
<220> FEATURE:
<223> OTHER INFORMATION: Synthetic

<400> SEQUENCE: 42
tccagctgcc ccat                                                          14

<210> SEQ ID NO 43
<211> LENGTH: 14
<212> TYPE: DNA
<213> ORGANISM: Artificial
<220> FEATURE:
<223> OTHER INFORMATION: Synthetic

<400> SEQUENCE: 43
tgctctaccg cctg                                                          14

<210> SEQ ID NO 44
<211> LENGTH: 14
<212> TYPE: DNA
<213> ORGANISM: Artificial
<220> FEATURE:
<223> OTHER INFORMATION: Synthetic

<400> SEQUENCE: 44
caggcggtag agca                                                          14

<210> SEQ ID NO 45
<211> LENGTH: 16
```

```
<212> TYPE: DNA
<213> ORGANISM: Artificial
<220> FEATURE:
<223> OTHER INFORMATION: Synthetic

<400> SEQUENCE: 45
ctcctggaac tgctgt                                                    16

<210> SEQ ID NO 46
<211> LENGTH: 16
<212> TYPE: DNA
<213> ORGANISM: Artificial
<220> FEATURE:
<223> OTHER INFORMATION: Synthetic

<400> SEQUENCE: 46
acagcagttc caggag                                                    16

<210> SEQ ID NO 47
<211> LENGTH: 16
<212> TYPE: DNA
<213> ORGANISM: Artificial
<220> FEATURE:
<223> OTHER INFORMATION: Synthetic

<400> SEQUENCE: 47
tcaagtctga gcattc                                                    16

<210> SEQ ID NO 48
<211> LENGTH: 16
<212> TYPE: DNA
<213> ORGANISM: Artificial
<220> FEATURE:
<223> OTHER INFORMATION: Synthetic

<400> SEQUENCE: 48
gaatgctcag acttga                                                    16

<210> SEQ ID NO 49
<211> LENGTH: 14
<212> TYPE: DNA
<213> ORGANISM: Artificial
<220> FEATURE:
<223> OTHER INFORMATION: Synthetic

<400> SEQUENCE: 49
tctgaactca ctgg                                                      14

<210> SEQ ID NO 50
<211> LENGTH: 14
<212> TYPE: DNA
<213> ORGANISM: Artificial
<220> FEATURE:
<223> OTHER INFORMATION: Synthetic

<400> SEQUENCE: 50
ccagtgagtt caga                                                      14

<210> SEQ ID NO 51
<211> LENGTH: 16
<212> TYPE: DNA
<213> ORGANISM: Artificial
<220> FEATURE:
<223> OTHER INFORMATION: Synthetic

<400> SEQUENCE: 51
```

```
tctgtctgtt cctgct                                                    16

<210> SEQ ID NO 52
<211> LENGTH: 16
<212> TYPE: DNA
<213> ORGANISM: Artificial
<220> FEATURE:
<223> OTHER INFORMATION: Synthetic

<400> SEQUENCE: 52
agcaggaaca gacaga                                                    16

<210> SEQ ID NO 53
<211> LENGTH: 14
<212> TYPE: DNA
<213> ORGANISM: Artificial
<220> FEATURE:
<223> OTHER INFORMATION: Synthetic

<400> SEQUENCE: 53
tgctgcttct ggtg                                                      14

<210> SEQ ID NO 54
<211> LENGTH: 14
<212> TYPE: DNA
<213> ORGANISM: Artificial
<220> FEATURE:
<223> OTHER INFORMATION: Synthetic

<400> SEQUENCE: 54
caccagaagc agca                                                      14

<210> SEQ ID NO 55
<211> LENGTH: 16
<212> TYPE: DNA
<213> ORGANISM: Artificial
<220> FEATURE:
<223> OTHER INFORMATION: Synthetic

<400> SEQUENCE: 55
aaaccggctg agagct                                                    16

<210> SEQ ID NO 56
<211> LENGTH: 16
<212> TYPE: DNA
<213> ORGANISM: Artificial
<220> FEATURE:
<223> OTHER INFORMATION: Synthetic

<400> SEQUENCE: 56
agctctcagc cggttt                                                    16

<210> SEQ ID NO 57
<211> LENGTH: 16
<212> TYPE: DNA
<213> ORGANISM: Artificial
<220> FEATURE:
<223> OTHER INFORMATION: Synthetic

<400> SEQUENCE: 57
ctacgaaggc aagatc                                                    16

<210> SEQ ID NO 58
<211> LENGTH: 16
<212> TYPE: DNA
<213> ORGANISM: Artificial
```

```
<220> FEATURE:
<223> OTHER INFORMATION: Synthetic

<400> SEQUENCE: 58
gatcttgcct tcgtag                                                       16

<210> SEQ ID NO 59
<211> LENGTH: 16
<212> TYPE: DNA
<213> ORGANISM: Artificial
<220> FEATURE:
<223> OTHER INFORMATION: Synthetic

<400> SEQUENCE: 59
agctctgagc gcttca                                                       16

<210> SEQ ID NO 60
<211> LENGTH: 16
<212> TYPE: DNA
<213> ORGANISM: Artificial
<220> FEATURE:
<223> OTHER INFORMATION: Synthetic

<400> SEQUENCE: 60
tgaagcgctc agagct                                                       16

<210> SEQ ID NO 61
<211> LENGTH: 16
<212> TYPE: DNA
<213> ORGANISM: Artificial
<220> FEATURE:
<223> OTHER INFORMATION: Synthetic

<400> SEQUENCE: 61
aggaagctga agggac                                                       16

<210> SEQ ID NO 62
<211> LENGTH: 16
<212> TYPE: DNA
<213> ORGANISM: Artificial
<220> FEATURE:
<223> OTHER INFORMATION: Synthetic

<400> SEQUENCE: 62
gtcccttcag cttcct                                                       16

<210> SEQ ID NO 63
<211> LENGTH: 14
<212> TYPE: DNA
<213> ORGANISM: Artificial
<220> FEATURE:
<223> OTHER INFORMATION: Synthetic

<400> SEQUENCE: 63
accttccatc cact                                                         14

<210> SEQ ID NO 64
<211> LENGTH: 14
<212> TYPE: DNA
<213> ORGANISM: Artificial
<220> FEATURE:
<223> OTHER INFORMATION: Synthetic

<400> SEQUENCE: 64
agtggatgga aggt                                                         14
```

```
<210> SEQ ID NO 65
<211> LENGTH: 16
<212> TYPE: DNA
<213> ORGANISM: Artificial
<220> FEATURE:
<223> OTHER INFORMATION: Synthetic

<400> SEQUENCE: 65
aagtgagggt gttcac                                                    16

<210> SEQ ID NO 66
<211> LENGTH: 16
<212> TYPE: DNA
<213> ORGANISM: Artificial
<220> FEATURE:
<223> OTHER INFORMATION: Synthetic

<400> SEQUENCE: 66
gtgaacaccc tcactt                                                    16

<210> SEQ ID NO 67
<211> LENGTH: 15
<212> TYPE: DNA
<213> ORGANISM: Artificial
<220> FEATURE:
<223> OTHER INFORMATION: Synthetic

<400> SEQUENCE: 67
tcctgctttg cagct                                                     15

<210> SEQ ID NO 68
<211> LENGTH: 15
<212> TYPE: DNA
<213> ORGANISM: Artificial
<220> FEATURE:
<223> OTHER INFORMATION: Synthetic

<400> SEQUENCE: 68
agctgcaaag cagga                                                     15

<210> SEQ ID NO 69
<211> LENGTH: 15
<212> TYPE: DNA
<213> ORGANISM: Artificial
<220> FEATURE:
<223> OTHER INFORMATION: Synthetic

<400> SEQUENCE: 69
agctgcaaag cagga                                                     15

<210> SEQ ID NO 70
<211> LENGTH: 15
<212> TYPE: DNA
<213> ORGANISM: Artificial
<220> FEATURE:
<223> OTHER INFORMATION: Synthetic

<400> SEQUENCE: 70
tcctgctttg cagct                                                     15

<210> SEQ ID NO 71
<211> LENGTH: 16
<212> TYPE: DNA
<213> ORGANISM: Artificial
<220> FEATURE:
<223> OTHER INFORMATION: Synthetic
```

<400> SEQUENCE: 71
tgggtcctat gctcct                                                                 16

<210> SEQ ID NO 72
<211> LENGTH: 16
<212> TYPE: DNA
<213> ORGANISM: Artificial
<220> FEATURE:
<223> OTHER INFORMATION: Synthetic

<400> SEQUENCE: 72
aggagcatag gaccca                                                                 16

<210> SEQ ID NO 73
<211> LENGTH: 15
<212> TYPE: DNA
<213> ORGANISM: Artificial
<220> FEATURE:
<223> OTHER INFORMATION: Synthetic

<400> SEQUENCE: 73
tgtctccacc cacgt                                                                  15

<210> SEQ ID NO 74
<211> LENGTH: 15
<212> TYPE: DNA
<213> ORGANISM: Artificial
<220> FEATURE:
<223> OTHER INFORMATION: Synthetic

<400> SEQUENCE: 74
acgtgggtgg agaca                                                                  15

<210> SEQ ID NO 75
<211> LENGTH: 16
<212> TYPE: DNA
<213> ORGANISM: Artificial
<220> FEATURE:
<223> OTHER INFORMATION: Synthetic

<400> SEQUENCE: 75
aaccaggcca atatgt                                                                 16

<210> SEQ ID NO 76
<211> LENGTH: 16
<212> TYPE: DNA
<213> ORGANISM: Artificial
<220> FEATURE:
<223> OTHER INFORMATION: Synthetic

<400> SEQUENCE: 76
acatattggc ctggtt                                                                 16

<210> SEQ ID NO 77
<211> LENGTH: 16
<212> TYPE: DNA
<213> ORGANISM: Artificial
<220> FEATURE:
<223> OTHER INFORMATION: Synthetic

<400> SEQUENCE: 77
ttgcggacaa tcatac                                                                 16

<210> SEQ ID NO 78

```
<211> LENGTH: 16
<212> TYPE: DNA
<213> ORGANISM: Artificial
<220> FEATURE:
<223> OTHER INFORMATION: Synthetic

<400> SEQUENCE: 78
gtatgattgt ccgcaa                                                       16

<210> SEQ ID NO 79
<211> LENGTH: 16
<212> TYPE: DNA
<213> ORGANISM: Artificial
<220> FEATURE:
<223> OTHER INFORMATION: Synthetic

<400> SEQUENCE: 79
ccctgtcagc tgtaaa                                                       16

<210> SEQ ID NO 80
<211> LENGTH: 16
<212> TYPE: DNA
<213> ORGANISM: Artificial
<220> FEATURE:
<223> OTHER INFORMATION: Synthetic

<400> SEQUENCE: 80
tttacagctg acaggg                                                       16

<210> SEQ ID NO 81
<211> LENGTH: 16
<212> TYPE: DNA
<213> ORGANISM: Artificial
<220> FEATURE:
<223> OTHER INFORMATION: Synthetic

<400> SEQUENCE: 81
aagacaggtg gctgct                                                       16

<210> SEQ ID NO 82
<211> LENGTH: 16
<212> TYPE: DNA
<213> ORGANISM: Artificial
<220> FEATURE:
<223> OTHER INFORMATION: Synthetic

<400> SEQUENCE: 82
agcagccacc tgtctt                                                       16

<210> SEQ ID NO 83
<211> LENGTH: 16
<212> TYPE: DNA
<213> ORGANISM: Artificial
<220> FEATURE:
<223> OTHER INFORMATION: Synthetic

<400> SEQUENCE: 83
tgtgaaactg cgggtg                                                       16

<210> SEQ ID NO 84
<211> LENGTH: 16
<212> TYPE: DNA
<213> ORGANISM: Artificial
<220> FEATURE:
<223> OTHER INFORMATION: Synthetic

<400> SEQUENCE: 84
```

```
cacccgcagt ttcaca                                                    16

<210> SEQ ID NO 85
<211> LENGTH: 16
<212> TYPE: DNA
<213> ORGANISM: Artificial
<220> FEATURE:
<223> OTHER INFORMATION: Synthetic

<400> SEQUENCE: 85
tttgactggg tgtatt                                                    16

<210> SEQ ID NO 86
<211> LENGTH: 16
<212> TYPE: DNA
<213> ORGANISM: Artificial
<220> FEATURE:
<223> OTHER INFORMATION: Synthetic

<400> SEQUENCE: 86
aatacaccca gtcaaa                                                    16

<210> SEQ ID NO 87
<211> LENGTH: 16
<212> TYPE: DNA
<213> ORGANISM: Artificial
<220> FEATURE:
<223> OTHER INFORMATION: Synthetic

<400> SEQUENCE: 87
actcagagga gtcttt                                                    16

<210> SEQ ID NO 88
<211> LENGTH: 16
<212> TYPE: DNA
<213> ORGANISM: Artificial
<220> FEATURE:
<223> OTHER INFORMATION: Synthetic

<400> SEQUENCE: 88
aaagactcct ctgagt                                                    16

<210> SEQ ID NO 89
<211> LENGTH: 15
<212> TYPE: DNA
<213> ORGANISM: Artificial
<220> FEATURE:
<223> OTHER INFORMATION: Synthetic

<400> SEQUENCE: 89
atgaaccagt ggcct                                                     15

<210> SEQ ID NO 90
<211> LENGTH: 15
<212> TYPE: DNA
<213> ORGANISM: Artificial
<220> FEATURE:
<223> OTHER INFORMATION: Synthetic

<400> SEQUENCE: 90
aggccactgg ttcat                                                     15

<210> SEQ ID NO 91
<211> LENGTH: 16
<212> TYPE: DNA
```

```
<213> ORGANISM: Artificial
<220> FEATURE:
<223> OTHER INFORMATION: Synthetic

<400> SEQUENCE: 91
aaacatgacc ttccct                                                    16

<210> SEQ ID NO 92
<211> LENGTH: 16
<212> TYPE: DNA
<213> ORGANISM: Artificial
<220> FEATURE:
<223> OTHER INFORMATION: Synthetic

<400> SEQUENCE: 92
agggaaggtc atgttt                                                    16

<210> SEQ ID NO 93
<211> LENGTH: 16
<212> TYPE: DNA
<213> ORGANISM: Artificial
<220> FEATURE:
<223> OTHER INFORMATION: Synthetic

<400> SEQUENCE: 93
agtcgatgct gctaga                                                    16

<210> SEQ ID NO 94
<211> LENGTH: 16
<212> TYPE: DNA
<213> ORGANISM: Artificial
<220> FEATURE:
<223> OTHER INFORMATION: Synthetic

<400> SEQUENCE: 94
tctagcagca tcgact                                                    16

<210> SEQ ID NO 95
<211> LENGTH: 15
<212> TYPE: DNA
<213> ORGANISM: Artificial
<220> FEATURE:
<223> OTHER INFORMATION: Synthetic

<400> SEQUENCE: 95
agtccccgaa gctgt                                                     15

<210> SEQ ID NO 96
<211> LENGTH: 15
<212> TYPE: DNA
<213> ORGANISM: Artificial
<220> FEATURE:
<223> OTHER INFORMATION: Synthetic

<400> SEQUENCE: 96
acagcttcgg ggact                                                     15

<210> SEQ ID NO 97
<211> LENGTH: 15
<212> TYPE: DNA
<213> ORGANISM: Artificial
<220> FEATURE:
<223> OTHER INFORMATION: Synthetic

<400> SEQUENCE: 97
atggagtccc caaga                                                     15
```

<210> SEQ ID NO 98
<211> LENGTH: 15
<212> TYPE: DNA
<213> ORGANISM: Artificial
<220> FEATURE:
<223> OTHER INFORMATION: Synthetic

<400> SEQUENCE: 98
tcttggggac tccat                                                         15

<210> SEQ ID NO 99
<211> LENGTH: 14
<212> TYPE: DNA
<213> ORGANISM: Artificial
<220> FEATURE:
<223> OTHER INFORMATION: Synthetic

<400> SEQUENCE: 99
tggtatcagg ggta                                                          14

<210> SEQ ID NO 100
<211> LENGTH: 14
<212> TYPE: DNA
<213> ORGANISM: Artificial
<220> FEATURE:
<223> OTHER INFORMATION: Synthetic

<400> SEQUENCE: 100
tacccctgat acca                                                          14

<210> SEQ ID NO 101
<211> LENGTH: 16
<212> TYPE: DNA
<213> ORGANISM: Artificial
<220> FEATURE:
<223> OTHER INFORMATION: Synthetic

<400> SEQUENCE: 101
accttcagtg atgtgc                                                        16

<210> SEQ ID NO 102
<211> LENGTH: 16
<212> TYPE: DNA
<213> ORGANISM: Artificial
<220> FEATURE:
<223> OTHER INFORMATION: Synthetic

<400> SEQUENCE: 102
gcacatcact gaaggt                                                        16

<210> SEQ ID NO 103
<211> LENGTH: 16
<212> TYPE: DNA
<213> ORGANISM: Artificial
<220> FEATURE:
<223> OTHER INFORMATION: Synthetic

<400> SEQUENCE: 103
actgtttccc agtttg                                                        16

<210> SEQ ID NO 104
<211> LENGTH: 16
<212> TYPE: DNA
<213> ORGANISM: Artificial
<220> FEATURE:

```
<223> OTHER INFORMATION: Synthetic

<400> SEQUENCE: 104
caaactggga aacagt                                                       16

<210> SEQ ID NO 105
<211> LENGTH: 14
<212> TYPE: DNA
<213> ORGANISM: Artificial
<220> FEATURE:
<223> OTHER INFORMATION: Synthetic

<400> SEQUENCE: 105
atccaaaggc ctcc                                                         14

<210> SEQ ID NO 106
<211> LENGTH: 14
<212> TYPE: DNA
<213> ORGANISM: Artificial
<220> FEATURE:
<223> OTHER INFORMATION: Synthetic

<400> SEQUENCE: 106
ggaggccttt ggat                                                         14

<210> SEQ ID NO 107
<211> LENGTH: 16
<212> TYPE: DNA
<213> ORGANISM: Artificial
<220> FEATURE:
<223> OTHER INFORMATION: Synthetic

<400> SEQUENCE: 107
gaactgaaag accaca                                                       16

<210> SEQ ID NO 108
<211> LENGTH: 16
<212> TYPE: DNA
<213> ORGANISM: Artificial
<220> FEATURE:
<223> OTHER INFORMATION: Synthetic

<400> SEQUENCE: 108
tgtggtcttt cagttc                                                       16

<210> SEQ ID NO 109
<211> LENGTH: 16
<212> TYPE: DNA
<213> ORGANISM: Artificial
<220> FEATURE:
<223> OTHER INFORMATION: Synthetic

<400> SEQUENCE: 109
agcctttgct gtcaat                                                       16

<210> SEQ ID NO 110
<211> LENGTH: 16
<212> TYPE: DNA
<213> ORGANISM: Artificial
<220> FEATURE:
<223> OTHER INFORMATION: Synthetic

<400> SEQUENCE: 110
attgacagca aaggct                                                       16
```

```
<210> SEQ ID NO 111
<211> LENGTH: 16
<212> TYPE: DNA
<213> ORGANISM: Artificial
<220> FEATURE:
<223> OTHER INFORMATION: Synthetic

<400> SEQUENCE: 111
ccctatttat ttgcat                                                    16

<210> SEQ ID NO 112
<211> LENGTH: 16
<212> TYPE: DNA
<213> ORGANISM: Artificial
<220> FEATURE:
<223> OTHER INFORMATION: Synthetic

<400> SEQUENCE: 112
atgcaaataa atagggg                                                   16

<210> SEQ ID NO 113
<211> LENGTH: 14
<212> TYPE: RNA
<213> ORGANISM: Artificial
<220> FEATURE:
<223> OTHER INFORMATION: Synthetic
<220> FEATURE:
<221> NAME/KEY: misc_feature
<222> LOCATION: (1)..(1), (2)..(2), (3)..(3), (12)..(12), (13)..(13),
      (14)..(14)
<223> OTHER INFORMATION: 2-o-Me RNA
<220> FEATURE:
<221> NAME/KEY: misc_feature
<222> LOCATION: (1)..(2), (2)..(3), (3)..(4), (11)..(12), (12)..(13),
      (13)..(14)
<223> OTHER INFORMATION: Phosphorothioate linkage

<400> SEQUENCE: 113
ggcccaggug cauu                                                      14

<210> SEQ ID NO 114
<211> LENGTH: 14
<212> TYPE: DNA
<213> ORGANISM: Artificial
<220> FEATURE:
<223> OTHER INFORMATION: Synthetic
<220> FEATURE:
<223> OTHER INFORMATION: DNA/RNA molecule
<221> NAME/KEY: misc_feature
<222> LOCATION: (1)..(1), (2)..(2), (3)..(3), (12)..(12), (13)..(13),
      (14)..(14)
<223> OTHER INFORMATION: LNA
<220> FEATURE:
<221> NAME/KEY: misc_feature
<222> LOCATION: (1)..(2), (2)..(3), (3)..(4), (4)..(5), (5)..(6),
      (6)..(7)
<223> OTHER INFORMATION: Phosphorothioate linkage
<220> FEATURE:
<221> NAME/KEY: misc_feature
<222> LOCATION: (7)..(8), (8)..(9), (9)..(10), (10)..(11), (11)..(12)
<223> OTHER INFORMATION: Phosphorothioate linkage
<220> FEATURE:
<221> NAME/KEY: misc_feature
<222> LOCATION: (12)..(13), (13)..(14)
<223> OTHER INFORMATION: Phosphorothioate linkage

<400> SEQUENCE: 114
aatgcacgtg ggcc                                                      14

<210> SEQ ID NO 115
<211> LENGTH: 13
```

```
<212> TYPE: RNA
<213> ORGANISM: Artificial
<220> FEATURE:
<223> OTHER INFORMATION: Synthetic
<221> NAME/KEY: misc_feature
<222> LOCATION: (1)..(1), (2)..(2), (3)..(3), (12)..(12), (13)..(13)
<223> OTHER INFORMATION: 2-o-Me RNA
<220> FEATURE:
<221> NAME/KEY: misc_feature
<222> LOCATION: (1)..(2), (2)..(3), (3)..(4), (11)..(12), (12)..(13)
<223> OTHER INFORMATION: Phosphorothioate linkage

<400> SEQUENCE: 115
ugaauaccaa ugc                                                            13

<210> SEQ ID NO 116
<211> LENGTH: 13
<212> TYPE: DNA
<213> ORGANISM: Artificial
<220> FEATURE:
<223> OTHER INFORMATION: Synthetic
<220> FEATURE:
<223> OTHER INFORMATION: DNA/RNA molecule
<221> NAME/KEY: misc_feature
<222> LOCATION: (1)..(1), (11)..(11), (13)..(13)
<223> OTHER INFORMATION: LNA
<220> FEATURE:
<221> NAME/KEY: misc_feature
<222> LOCATION: (2)..(2), (12)..(12)
<223> OTHER INFORMATION: 5-methyl cytosine LNA
<220> FEATURE:
<221> NAME/KEY: misc_feature
<222> LOCATION: (1)..(2), (2)..(3), (3)..(4), (4)..(5), (5)..(6),
      (6)..(7)
<223> OTHER INFORMATION: Phosphorothioate linkage
<220> FEATURE:
<221> NAME/KEY: misc_feature
<222> LOCATION: (7)..(8), (8)..(9), (9)..(10), (10)..(11), (11)..(12)
<223> OTHER INFORMATION: Phosphorothioate linkage
<220> FEATURE:
<221> NAME/KEY: misc_feature
<222> LOCATION: (12)..(13), (13)..(14)
<223> OTHER INFORMATION: Phosphorothioate linkage

<400> SEQUENCE: 116
gcattggtat tca                                                            13

<210> SEQ ID NO 117
<211> LENGTH: 13
<212> TYPE: DNA
<213> ORGANISM: Artificial
<220> FEATURE:
<223> OTHER INFORMATION: Synthetic

<400> SEQUENCE: 117
acgtgcattg ctc                                                            13

<210> SEQ ID NO 118
<211> LENGTH: 13
<212> TYPE: DNA
<213> ORGANISM: Artificial
<220> FEATURE:
<223> OTHER INFORMATION: Synthetic

<400> SEQUENCE: 118
gagcaatgca cgt                                                            13

<210> SEQ ID NO 119
<211> LENGTH: 13
<212> TYPE: DNA
<213> ORGANISM: Artificial
```

```
<220> FEATURE:
<223> OTHER INFORMATION: Synthetic

<400> SEQUENCE: 119
cacgtgcatt gct                                                         13

<210> SEQ ID NO 120
<211> LENGTH: 13
<212> TYPE: DNA
<213> ORGANISM: Artificial
<220> FEATURE:
<223> OTHER INFORMATION: Synthetic

<400> SEQUENCE: 120
agcaatgcac gtg                                                         13

<210> SEQ ID NO 121
<211> LENGTH: 13
<212> TYPE: DNA
<213> ORGANISM: Artificial
<220> FEATURE:
<223> OTHER INFORMATION: Synthetic

<400> SEQUENCE: 121
ccacgtgcat tgc                                                         13

<210> SEQ ID NO 122
<211> LENGTH: 13
<212> TYPE: DNA
<213> ORGANISM: Artificial
<220> FEATURE:
<223> OTHER INFORMATION: Synthetic

<400> SEQUENCE: 122
gcaatgcacg tgg                                                         13

<210> SEQ ID NO 123
<211> LENGTH: 13
<212> TYPE: DNA
<213> ORGANISM: Artificial
<220> FEATURE:
<223> OTHER INFORMATION: Synthetic

<400> SEQUENCE: 123
cccacgtgca ttg                                                         13

<210> SEQ ID NO 124
<211> LENGTH: 13
<212> TYPE: DNA
<213> ORGANISM: Artificial
<220> FEATURE:
<223> OTHER INFORMATION: Synthetic

<400> SEQUENCE: 124
caatgcacgt ggg                                                         13

<210> SEQ ID NO 125
<211> LENGTH: 13
<212> TYPE: DNA
<213> ORGANISM: Artificial
<220> FEATURE:
<223> OTHER INFORMATION: Synthetic

<400> SEQUENCE: 125
gcccacgtgc att                                                         13
```

```
<210> SEQ ID NO 126
<211> LENGTH: 13
<212> TYPE: DNA
<213> ORGANISM: Artificial
<220> FEATURE:
<223> OTHER INFORMATION: Synthetic

<400> SEQUENCE: 126
aatgcacgtg ggc                                                      13

<210> SEQ ID NO 127
<211> LENGTH: 13
<212> TYPE: DNA
<213> ORGANISM: Artificial
<220> FEATURE:
<223> OTHER INFORMATION: Synthetic

<400> SEQUENCE: 127
ggcccacgtg cat                                                      13

<210> SEQ ID NO 128
<211> LENGTH: 13
<212> TYPE: DNA
<213> ORGANISM: Artificial
<220> FEATURE:
<223> OTHER INFORMATION: Synthetic

<400> SEQUENCE: 128
atgcacgtgg gcc                                                      13

<210> SEQ ID NO 129
<211> LENGTH: 13
<212> TYPE: DNA
<213> ORGANISM: Artificial
<220> FEATURE:
<223> OTHER INFORMATION: Synthetic

<400> SEQUENCE: 129
aggcccacgt gca                                                      13

<210> SEQ ID NO 130
<211> LENGTH: 13
<212> TYPE: DNA
<213> ORGANISM: Artificial
<220> FEATURE:
<223> OTHER INFORMATION: Synthetic

<400> SEQUENCE: 130
tgcacgtggg cct                                                      13

<210> SEQ ID NO 131
<211> LENGTH: 13
<212> TYPE: DNA
<213> ORGANISM: Artificial
<220> FEATURE:
<223> OTHER INFORMATION: Synthetic

<400> SEQUENCE: 131
aaggcccacg tgc                                                      13

<210> SEQ ID NO 132
<211> LENGTH: 13
<212> TYPE: DNA
<213> ORGANISM: Artificial
<220> FEATURE:
<223> OTHER INFORMATION: Synthetic
```

```
<400> SEQUENCE: 132
gcacgtgggc ctt                                                  13

<210> SEQ ID NO 133
<211> LENGTH: 14
<212> TYPE: DNA
<213> ORGANISM: Artificial
<220> FEATURE:
<223> OTHER INFORMATION: Synthetic

<400> SEQUENCE: 133
cacgtgcatt gctc                                                 14

<210> SEQ ID NO 134
<211> LENGTH: 14
<212> TYPE: DNA
<213> ORGANISM: Artificial
<220> FEATURE:
<223> OTHER INFORMATION: Synthetic

<400> SEQUENCE: 134
gagcaatgca cgtg                                                 14

<210> SEQ ID NO 135
<211> LENGTH: 14
<212> TYPE: DNA
<213> ORGANISM: Artificial
<220> FEATURE:
<223> OTHER INFORMATION: Synthetic

<400> SEQUENCE: 135
ccacgtgcat tgct                                                 14

<210> SEQ ID NO 136
<211> LENGTH: 14
<212> TYPE: DNA
<213> ORGANISM: Artificial
<220> FEATURE:
<223> OTHER INFORMATION: Synthetic

<400> SEQUENCE: 136
agcaatgcac gtgg                                                 14

<210> SEQ ID NO 137
<211> LENGTH: 14
<212> TYPE: DNA
<213> ORGANISM: Artificial
<220> FEATURE:
<223> OTHER INFORMATION: Synthetic

<400> SEQUENCE: 137
cccacgtgca ttgc                                                 14

<210> SEQ ID NO 138
<211> LENGTH: 14
<212> TYPE: DNA
<213> ORGANISM: Artificial
<220> FEATURE:
<223> OTHER INFORMATION: Synthetic

<400> SEQUENCE: 138
gcaatgcacg tggg                                                 14

<210> SEQ ID NO 139
```

```
<211> LENGTH: 14
<212> TYPE: DNA
<213> ORGANISM: Artificial
<220> FEATURE:
<223> OTHER INFORMATION: Synthetic

<400> SEQUENCE: 139
gcccacgtgc attg                                                     14

<210> SEQ ID NO 140
<211> LENGTH: 14
<212> TYPE: DNA
<213> ORGANISM: Artificial
<220> FEATURE:
<223> OTHER INFORMATION: Synthetic

<400> SEQUENCE: 140
caatgcacgt gggc                                                     14

<210> SEQ ID NO 141
<211> LENGTH: 14
<212> TYPE: DNA
<213> ORGANISM: Artificial
<220> FEATURE:
<223> OTHER INFORMATION: Synthetic

<400> SEQUENCE: 141
ggcccacgtg catt                                                     14

<210> SEQ ID NO 142
<211> LENGTH: 14
<212> TYPE: DNA
<213> ORGANISM: Artificial
<220> FEATURE:
<223> OTHER INFORMATION: Synthetic

<400> SEQUENCE: 142
aatgcacgtg ggcc                                                     14

<210> SEQ ID NO 143
<211> LENGTH: 14
<212> TYPE: DNA
<213> ORGANISM: Artificial
<220> FEATURE:
<223> OTHER INFORMATION: Synthetic

<400> SEQUENCE: 143
aggcccacgt gcat                                                     14

<210> SEQ ID NO 144
<211> LENGTH: 14
<212> TYPE: DNA
<213> ORGANISM: Artificial
<220> FEATURE:
<223> OTHER INFORMATION: Synthetic

<400> SEQUENCE: 144
atgcacgtgg gcct                                                     14

<210> SEQ ID NO 145
<211> LENGTH: 14
<212> TYPE: DNA
<213> ORGANISM: Artificial
<220> FEATURE:
<223> OTHER INFORMATION: Synthetic

<400> SEQUENCE: 145
```
aaggcccacg tgca                                                      14

<210> SEQ ID NO 146
<211> LENGTH: 14
<212> TYPE: DNA
<213> ORGANISM: Artificial
<220> FEATURE:
<223> OTHER INFORMATION: Synthetic

<400> SEQUENCE: 146
tgcacgtggg cctt                                                      14

<210> SEQ ID NO 147
<211> LENGTH: 15
<212> TYPE: DNA
<213> ORGANISM: Artificial
<220> FEATURE:
<223> OTHER INFORMATION: Synthetic

<400> SEQUENCE: 147
ccacgtgcat tgctc                                                     15

<210> SEQ ID NO 148
<211> LENGTH: 15
<212> TYPE: DNA
<213> ORGANISM: Artificial
<220> FEATURE:
<223> OTHER INFORMATION: Synthetic

<400> SEQUENCE: 148
gagcaatgca cgtgg                                                     15

<210> SEQ ID NO 149
<211> LENGTH: 15
<212> TYPE: DNA
<213> ORGANISM: Artificial
<220> FEATURE:
<223> OTHER INFORMATION: Synthetic

<400> SEQUENCE: 149
cccacgtgca ttgct                                                     15

<210> SEQ ID NO 150
<211> LENGTH: 15
<212> TYPE: DNA
<213> ORGANISM: Artificial
<220> FEATURE:
<223> OTHER INFORMATION: Synthetic

<400> SEQUENCE: 150
agcaatgcac gtggg                                                     15

<210> SEQ ID NO 151
<211> LENGTH: 15
<212> TYPE: DNA
<213> ORGANISM: Artificial
<220> FEATURE:
<223> OTHER INFORMATION: Synthetic

<400> SEQUENCE: 151
gcccacgtgc attgc                                                     15

<210> SEQ ID NO 152
<211> LENGTH: 15
<212> TYPE: DNA

```
<213> ORGANISM: Artificial
<220> FEATURE:
<223> OTHER INFORMATION: Synthetic

<400> SEQUENCE: 152
gcaatgcacg tgggc                                                15

<210> SEQ ID NO 153
<211> LENGTH: 15
<212> TYPE: DNA
<213> ORGANISM: Artificial
<220> FEATURE:
<223> OTHER INFORMATION: Synthetic

<400> SEQUENCE: 153
ggcccacgtg cattg                                                15

<210> SEQ ID NO 154
<211> LENGTH: 15
<212> TYPE: DNA
<213> ORGANISM: Artificial
<220> FEATURE:
<223> OTHER INFORMATION: Synthetic

<400> SEQUENCE: 154
caatgcacgt gggcc                                                15

<210> SEQ ID NO 155
<211> LENGTH: 15
<212> TYPE: DNA
<213> ORGANISM: Artificial
<220> FEATURE:
<223> OTHER INFORMATION: Synthetic

<400> SEQUENCE: 155
aggcccacgt gcatt                                                15

<210> SEQ ID NO 156
<211> LENGTH: 15
<212> TYPE: DNA
<213> ORGANISM: Artificial
<220> FEATURE:
<223> OTHER INFORMATION: Synthetic

<400> SEQUENCE: 156
aatgcacgtg ggcct                                                15

<210> SEQ ID NO 157
<211> LENGTH: 15
<212> TYPE: DNA
<213> ORGANISM: Artificial
<220> FEATURE:
<223> OTHER INFORMATION: Synthetic

<400> SEQUENCE: 157
aaggcccacg tgcat                                                15

<210> SEQ ID NO 158
<211> LENGTH: 15
<212> TYPE: DNA
<213> ORGANISM: Artificial
<220> FEATURE:
<223> OTHER INFORMATION: Synthetic

<400> SEQUENCE: 158
atgcacgtgg gcctt                                                15
```

<210> SEQ ID NO 159
<211> LENGTH: 16
<212> TYPE: DNA
<213> ORGANISM: Artificial
<220> FEATURE:
<223> OTHER INFORMATION: Synthetic

<400> SEQUENCE: 159
cccacgtgca ttgctc                                                   16

<210> SEQ ID NO 160
<211> LENGTH: 16
<212> TYPE: DNA
<213> ORGANISM: Artificial
<220> FEATURE:
<223> OTHER INFORMATION: Synthetic

<400> SEQUENCE: 160
gagcaatgca cgtggg                                                   16

<210> SEQ ID NO 161
<211> LENGTH: 16
<212> TYPE: DNA
<213> ORGANISM: Artificial
<220> FEATURE:
<223> OTHER INFORMATION: Synthetic

<400> SEQUENCE: 161
gcccacgtgc attgct                                                   16

<210> SEQ ID NO 162
<211> LENGTH: 16
<212> TYPE: DNA
<213> ORGANISM: Artificial
<220> FEATURE:
<223> OTHER INFORMATION: Synthetic

<400> SEQUENCE: 162
agcaatgcac gtgggc                                                   16

<210> SEQ ID NO 163
<211> LENGTH: 16
<212> TYPE: DNA
<213> ORGANISM: Artificial
<220> FEATURE:
<223> OTHER INFORMATION: Synthetic

<400> SEQUENCE: 163
ggcccacgtg cattgc                                                   16

<210> SEQ ID NO 164
<211> LENGTH: 16
<212> TYPE: DNA
<213> ORGANISM: Artificial
<220> FEATURE:
<223> OTHER INFORMATION: Synthetic

<400> SEQUENCE: 164
gcaatgcacg tgggcc                                                   16

<210> SEQ ID NO 165
<211> LENGTH: 16
<212> TYPE: DNA
<213> ORGANISM: Artificial
<220> FEATURE:

```
<223> OTHER INFORMATION: Synthetic

<400> SEQUENCE: 165
aggcccacgt gcattg                                                    16

<210> SEQ ID NO 166
<211> LENGTH: 16
<212> TYPE: DNA
<213> ORGANISM: Artificial
<220> FEATURE:
<223> OTHER INFORMATION: Synthetic

<400> SEQUENCE: 166
caatgcacgt gggcct                                                    16

<210> SEQ ID NO 167
<211> LENGTH: 16
<212> TYPE: DNA
<213> ORGANISM: Artificial
<220> FEATURE:
<223> OTHER INFORMATION: Synthetic

<400> SEQUENCE: 167
aaggcccacg tgcatt                                                    16

<210> SEQ ID NO 168
<211> LENGTH: 16
<212> TYPE: DNA
<213> ORGANISM: Artificial
<220> FEATURE:
<223> OTHER INFORMATION: Synthetic

<400> SEQUENCE: 168
aatgcacgtg ggcctt                                                    16

<210> SEQ ID NO 169
<211> LENGTH: 17
<212> TYPE: DNA
<213> ORGANISM: Artificial
<220> FEATURE:
<223> OTHER INFORMATION: Synthetic

<400> SEQUENCE: 169
gcccacgtgc attgctc                                                   17

<210> SEQ ID NO 170
<211> LENGTH: 17
<212> TYPE: DNA
<213> ORGANISM: Artificial
<220> FEATURE:
<223> OTHER INFORMATION: Synthetic

<400> SEQUENCE: 170
gagcaatgca cgtgggc                                                   17

<210> SEQ ID NO 171
<211> LENGTH: 17
<212> TYPE: DNA
<213> ORGANISM: Artificial
<220> FEATURE:
<223> OTHER INFORMATION: Synthetic

<400> SEQUENCE: 171
ggcccacgtg cattgct                                                   17
```

<210> SEQ ID NO 172
<211> LENGTH: 17
<212> TYPE: DNA
<213> ORGANISM: Artificial
<220> FEATURE:
<223> OTHER INFORMATION: Synthetic

<400> SEQUENCE: 172
agcaatgcac gtgggcc                                                  17

<210> SEQ ID NO 173
<211> LENGTH: 17
<212> TYPE: DNA
<213> ORGANISM: Artificial
<220> FEATURE:
<223> OTHER INFORMATION: Synthetic

<400> SEQUENCE: 173
aggcccacgt gcattgc                                                  17

<210> SEQ ID NO 174
<211> LENGTH: 17
<212> TYPE: DNA
<213> ORGANISM: Artificial
<220> FEATURE:
<223> OTHER INFORMATION: Synthetic

<400> SEQUENCE: 174
gcaatgcacg tgggcct                                                  17

<210> SEQ ID NO 175
<211> LENGTH: 17
<212> TYPE: DNA
<213> ORGANISM: Artificial
<220> FEATURE:
<223> OTHER INFORMATION: Synthetic

<400> SEQUENCE: 175
aaggcccacg tgcattg                                                  17

<210> SEQ ID NO 176
<211> LENGTH: 17
<212> TYPE: DNA
<213> ORGANISM: Artificial
<220> FEATURE:
<223> OTHER INFORMATION: Synthetic

<400> SEQUENCE: 176
caatgcacgt gggcctt                                                  17

<210> SEQ ID NO 177
<211> LENGTH: 18
<212> TYPE: DNA
<213> ORGANISM: Artificial
<220> FEATURE:
<223> OTHER INFORMATION: Synthetic

<400> SEQUENCE: 177
ggcccacgtg cattgctc                                                 18

<210> SEQ ID NO 178
<211> LENGTH: 18
<212> TYPE: DNA
<213> ORGANISM: Artificial
<220> FEATURE:
<223> OTHER INFORMATION: Synthetic

```
<400> SEQUENCE: 178
gagcaatgca cgtgggcc                                                18

<210> SEQ ID NO 179
<211> LENGTH: 18
<212> TYPE: DNA
<213> ORGANISM: Artificial
<220> FEATURE:
<223> OTHER INFORMATION: Synthetic

<400> SEQUENCE: 179
aggcccacgt gcattgct                                                18

<210> SEQ ID NO 180
<211> LENGTH: 18
<212> TYPE: DNA
<213> ORGANISM: Artificial
<220> FEATURE:
<223> OTHER INFORMATION: Synthetic

<400> SEQUENCE: 180
agcaatgcac gtgggcct                                                18

<210> SEQ ID NO 181
<211> LENGTH: 18
<212> TYPE: DNA
<213> ORGANISM: Artificial
<220> FEATURE:
<223> OTHER INFORMATION: Synthetic

<400> SEQUENCE: 181
aaggcccacg tgcattgc                                                18

<210> SEQ ID NO 182
<211> LENGTH: 18
<212> TYPE: DNA
<213> ORGANISM: Artificial
<220> FEATURE:
<223> OTHER INFORMATION: Synthetic

<400> SEQUENCE: 182
gcaatgcacg tgggcctt                                                18

<210> SEQ ID NO 183
<211> LENGTH: 19
<212> TYPE: DNA
<213> ORGANISM: Artificial
<220> FEATURE:
<223> OTHER INFORMATION: Synthetic

<400> SEQUENCE: 183
aggcccacgt gcattgctc                                               19

<210> SEQ ID NO 184
<211> LENGTH: 19
<212> TYPE: DNA
<213> ORGANISM: Artificial
<220> FEATURE:
<223> OTHER INFORMATION: Synthetic

<400> SEQUENCE: 184
gagcaatgca cgtgggcct                                               19

<210> SEQ ID NO 185
<211> LENGTH: 19
```

```
<212> TYPE: DNA
<213> ORGANISM: Artificial
<220> FEATURE:
<223> OTHER INFORMATION: Synthetic

<400> SEQUENCE: 185
aaggcccacg tgcattgct                                                19

<210> SEQ ID NO 186
<211> LENGTH: 19
<212> TYPE: DNA
<213> ORGANISM: Artificial
<220> FEATURE:
<223> OTHER INFORMATION: Synthetic

<400> SEQUENCE: 186
agcaatgcac gtgggcctt                                                19

<210> SEQ ID NO 187
<211> LENGTH: 20
<212> TYPE: DNA
<213> ORGANISM: Artificial
<220> FEATURE:
<223> OTHER INFORMATION: Synthetic

<400> SEQUENCE: 187
aaggcccacg tgcattgctc                                               20

<210> SEQ ID NO 188
<211> LENGTH: 20
<212> TYPE: DNA
<213> ORGANISM: Artificial
<220> FEATURE:
<223> OTHER INFORMATION: Synthetic

<400> SEQUENCE: 188
gagcaatgca cgtgggcctt                                               20

<210> SEQ ID NO 189
<211> LENGTH: 16
<212> TYPE: RNA
<213> ORGANISM: Artificial
<220> FEATURE:
<223> OTHER INFORMATION: Synthetic
<221> NAME/KEY: misc_feature
<222> LOCATION: (1)..(1), (2)..(2), (3)..(3), (14)..(14), (15)..(15),
      (16)..(16)
<223> OTHER INFORMATION: 2-o-Me RNA
<220> FEATURE:
<221> NAME/KEY: misc_feature
<222> LOCATION: (1)..(2), (2)..(3), (3)..(4), (13)..(14), (14)..(15),
      (15)..(16)
<223> OTHER INFORMATION: Phosphorothioate linkage

<400> SEQUENCE: 189
cccacgugca uugcuc                                                   16

<210> SEQ ID NO 190
<211> LENGTH: 16
<212> TYPE: DNA
<213> ORGANISM: Artificial
<220> FEATURE:
<223> OTHER INFORMATION: Synthetic
<220> FEATURE:
<223> OTHER INFORMATION: DNA/RNA molecule
<221> NAME/KEY: misc_feature
<222> LOCATION: (1)..(1), (2)..(2), (3)..(3), (14)..(14), (15)..(15),
      (16)..(16)
<223> OTHER INFORMATION: LNA
```

-continued

```
<220> FEATURE:
<221> NAME/KEY: misc_feature
<222> LOCATION: (1)..(2), (2)..(3), (3)..(4), (4)..(5), (5)..(6),
      (6)..(7)
<223> OTHER INFORMATION: Phosphorothioate linkage
<220> FEATURE:
<221> NAME/KEY: misc_feature
<222> LOCATION: (7)..(8), (8)..(9), (9)..(10), (10)..(11), (11)..(12)
<223> OTHER INFORMATION: Phosphorothioate linkage
<220> FEATURE:
<221> NAME/KEY: misc_feature
<222> LOCATION: (12)..(13), (13)..(14), (14)..(15), (15)..(16)
<223> OTHER INFORMATION: Phosphorothioate linkage

<400> SEQUENCE: 190
gagcaatgca cgtggg                                                   16

<210> SEQ ID NO 191
<211> LENGTH: 17
<212> TYPE: RNA
<213> ORGANISM: Artificial
<220> FEATURE:
<223> OTHER INFORMATION: Synthetic
<221> NAME/KEY: misc_feature
<222> LOCATION: (1)..(1), (2)..(2), (3)..(3), (15)..(15), (16)..(16),
      (17)..(17)
<223> OTHER INFORMATION: 2-o-Me RNA
<220> FEATURE:
<221> NAME/KEY: misc_feature
<222> LOCATION: (1)..(2), (2)..(3), (3)..(4), (14)..(15), (15)..(16),
      (16)..(17)
<223> OTHER INFORMATION: Phosphorothioate linkage

<400> SEQUENCE: 191
gcccacgugc auugcuc                                                  17

<210> SEQ ID NO 192
<211> LENGTH: 17
<212> TYPE: DNA
<213> ORGANISM: Artificial
<220> FEATURE:
<223> OTHER INFORMATION: Synthetic
<220> FEATURE:
<223> OTHER INFORMATION: DNA/RNA molecule
<221> NAME/KEY: misc_feature
<222> LOCATION: (1)..(1), (2)..(2), (3)..(3), (15)..(15), (16)..(16)
<223> OTHER INFORMATION: LNA
<220> FEATURE:
<221> NAME/KEY: misc_feature
<222> LOCATION: (17)..(17)
<223> OTHER INFORMATION: 5-methyl cytosine LNA
<220> FEATURE:
<221> NAME/KEY: misc_feature
<222> LOCATION: (1)..(2), (2)..(3), (3)..(4), (4)..(5), (5)..(6),
      (6)..(7)
<223> OTHER INFORMATION: Phosphorothioate linkage
<220> FEATURE:
<221> NAME/KEY: misc_feature
<222> LOCATION: (7)..(8), (8)..(9), (9)..(10), (10)..(11), (11)..(12)
<223> OTHER INFORMATION: Phosphorothioate linkage
<220> FEATURE:
<221> NAME/KEY: misc_feature
<222> LOCATION: (12)..(13), (13)..(14), (14)..(15), (15)..(16),
      (16)..(17)
<223> OTHER INFORMATION: Phosphorothioate linkage

<400> SEQUENCE: 192
gagcaatgca cgtgggc                                                  17

<210> SEQ ID NO 193
<211> LENGTH: 18
<212> TYPE: RNA
<213> ORGANISM: Artificial
```

```
<220> FEATURE:
<223> OTHER INFORMATION: Synthetic
<221> NAME/KEY: misc_feature
<222> LOCATION: (1)..(1), (2)..(2), (3)..(3), (16)..(16), (17)..(17),
      (18)..(18)
<223> OTHER INFORMATION: 2-o-Me RNA
<220> FEATURE:
<221> NAME/KEY: misc_feature
<222> LOCATION: (1)..(2), (2)..(3), (3)..(4), (15)..(16), (16)..(17),
      (17)..(18)
<223> OTHER INFORMATION: Phosphorothioate linkage

<400> SEQUENCE: 193
ggcccacgug cauugcuc                                                  18

<210> SEQ ID NO 194
<211> LENGTH: 18
<212> TYPE: DNA
<213> ORGANISM: Artificial
<220> FEATURE:
<223> OTHER INFORMATION: Synthetic
<220> FEATURE:
<223> OTHER INFORMATION: DNA/RNA molecule
<221> NAME/KEY: misc_feature
<222> LOCATION: (1)..(1), (2)..(2), (3)..(3), (15)..(15), (16)..(16)
<223> OTHER INFORMATION: LNA
<220> FEATURE:
<221> NAME/KEY: misc_feature
<222> LOCATION: (17)..(17), (18)..(18)
<223> OTHER INFORMATION: 5-methyl cytosine LNA
<220> FEATURE:
<221> NAME/KEY: misc_feature
<222> LOCATION: (1)..(2), (2)..(3), (3)..(4), (4)..(5), (5)..(6),
      (6)..(7)
<223> OTHER INFORMATION: Phosphorothioate linkage
<220> FEATURE:
<221> NAME/KEY: misc_feature
<222> LOCATION: (7)..(8), (8)..(9), (9)..(10), (10)..(11), (11)..(12)
<223> OTHER INFORMATION: Phosphorothioate linkage
<220> FEATURE:
<221> NAME/KEY: misc_feature
<222> LOCATION: (12)..(13), (13)..(14), (14)..(15), (15)..(16),
      (16)..(17)
<223> OTHER INFORMATION: Phosphorothioate linkage
<220> FEATURE:
<221> NAME/KEY: misc_feature
<222> LOCATION: (17)..(18)
<223> OTHER INFORMATION: Phosphorothioate linkage

<400> SEQUENCE: 194
gagcaatgca cgtgggcc                                                  18
```

NUCLEIC ACID COMPLEX FOR REGULATING IHH EXPRESSION

CROSS-REFERENCE TO RELATED APPLICATIONS

This application is a 371 of PCT/JP2020/011018, filed Mar. 13, 2020, which claims the benefit of Japanese Patent Application No. 2019-047703, filed Mar. 14, 2019.

TECHNICAL FIELD

The present invention relates to a nucleic acid complex comprising a heteroduplex oligonucleotide (HDO) for regulating expression of the Indian hedgehog gene (hereafter, referred to as the "IHH gene"). The present invention also relates to an IHH-specific inhibitor. In addition, the present invention relates to a therapeutic agent for fibrosis containing an inhibitor of an IHH gene transcription product.

BACKGROUND ART

Hedgehog is a morphogenic signaling pathway that controls progenitor cell fate and tissue construction during embryogenesis and reactivation of Hedgehog occurs during liver injury in adult. Hedgehog (Hh) is a signaling pathway that regulates critical cell fate decisions, including proliferation, apoptosis, migration, and differentiation, and it modulates wound healing responses in a number of adult tissues, including the liver (Non-Patent Literature 1).

Liver fibrosis is characterized by deposition of excessive extracellular matrix (ECM). A major cell type involved therewith is a hepatic stem cell (HSC). ECM includes a complicated mixture of proteins that accelerate cell proliferation, migration, and differentiation. An ECM constituent playing such role is Matrigel glycophosphoprotein; i.e., osteopontin (OPN), which is also known as a secreted phosphoprotein 1 (Non-Patent Literature 2).

A hepatic stem cell (HSC) plays a key role in liver fibrosis. When hedgehog signaling components Ihh, Smo, Ptc, Gli2, and Gli3 were expressed in HSC, hedgehog siRNA vectors targeting Ihh, Smo, and Gli2 were constructed, the vectors were transfected into HSC, and target gene expression levels were then lowered. It was found that HSC activation and collagen secretion could be regulated by hedgehog signaling (Non-Patent Literature 3).

Nonalcoholic steatohepatitis (NASH) is a major cause of liver diseases in the world. However, the molecular foundation of the mechanism of progression of benign adiposity into NASH is not completely understood, and identification of therapeutic targets is limited. An expression level of a transcription regulatory factor TAZ (WWTR1) is significantly higher in human and mouse NASH liver than in normal or fatty liver. As a result of promotion of TAZ factor expression in fat cells, in addition, NASH features including fibrosis were increased. It should be noted that TAZ silencing in liver cells of mouse models of NASH prevented or reversed hepatitis, hepatic cell death, and fibrosis but it did not prevent or reverse adiposis. Thus, a TAZ factor was found to contribute to a critical process of progression to adiposis and NASH (Non-Patent Literature 4).

However, pathogenic processes of such liver diseases and molecular mechanisms corresponding to integration of such processes have not yet been substantially elucidated. Non-Patent Literature 2 and Non-Patent Literature 3 demonstrate that hepatic stem cell (HSC) activation plays a key role in NASH fibrosis. While many factors for HSC activation in case of NASH have been proposed, research in this field has not been completed, and a therapeutic strategy that can be approved by FDA has not yet been established (Non-Patent Literature 5).

PRIOR ART LITERATURES

Patent Literatures

Patent Literature 1: Tabas et al., WO 2017/184586 (PCT/US2017/028109)

Non-Patent Literatures

Non-Patent Literature 1: Alessia Omenetti et al., J. Hepatol., 54 (2): 366-373, 2011
Non-Patent Literature 2: James Pritchett et al., HEPATOLOGY, Vol. 56, No. 3, 1108-1116, 2012
Non-Patent Literature 3: Tao Li et al., Int. J. Clin. Exp. Pathol., 8 (11): 14574-14579, 2015
Non-Patent Literature 4: Angulo P. et al., Semin Liver Dis., 35 (2): 132-45, 2015
Non-Patent Literature 5: Wang X. et al., Cell Metabolism 24: 848-862, 2016

SUMMARY OF THE INVENTION

Objects of the Invention

Examples of agents used for treatment of fibrosis include therapeutic agents comprising antibiotics, such as steroids, and therapeutic agents of idiopathic pulmonary fibrosis (IPF), such as Pirfenidone and Nintedanib.

Pirfenidone is an antifibrotic agent. The major action mechanism thereof is to suppress transforming growth factor-$\beta$ (TGF-$\beta$) production. TGF-$\beta$ controls a process "epithelial mesenchymal transition" by which type II alveolar epithelial cells are differentiated into fibroblasts and myofibroblasts to accelerate fibrosis. Pirfenidone blocks the pathway thereof to exert antifibrotic effects. Other known mechanisms of Pirfenidone include mechanisms of suppressing factors associated with fibrosis or inflammation, such as basic-fibroblast growth factor (b-FGF), stroma cell derived factor-1$\alpha$ (SDF-1$\alpha$), and interferon-$\gamma$ (IFN-$\gamma$).

Nintedanib is an antifibrotic agent, which is a small molecule tyrosine kinase inhibitor. It acts on the vascular endothelial growth factor receptors (VEGFR) 1 to 3, fibroblast growth factor receptors (FGFR), and platelet derived growth factor receptors (PDGFR). While Nintedanib was first developed as a therapeutic agent for solid cancer, it was found to exert inhibitory activity on fibroblast growth and effects of fibrosis prevention. Thus, Nintedanib was applied in a clinical setting as a therapeutic agent for IPF.

While antifibrotic agents comprising low-molecular compounds as described above exist, therapeutic agents having novel action mechanisms are desired.

In the past, IHH inhibitors were not used for treatment of fibrosis and use thereof for such application was not suggested.

IHH proteins are secretory proteins of the hedgehog family. There is a region in intron 1 of the IHH gene to which the transcription factor TAZ binds, and IHH gene expression is positively regulated by the transcription factor TAZ through the region mentioned above (Patent Literature 1; Non-Patent Literature 4).

The present inventors considered that TAZ would be a NASH fibrosis aggravating factor and the IHH gene would mediate such aggravating action. In addition, the IHH gene is secreted from liver cells, it activates hepatic stellate cells, and the IHH gene is secreted from activated stellate cells. On the basis thereof, the present inventors considered that the autocrine or paracrine activity of the IHH gene would be enhanced in the case of fibrosis and the clinical state of fibrosis would further be advanced. Since the hedgehog family may be associated with advancement of the clinical state correlated with hepatic fibrosis, an inhibitor of the IHH gene, which is a member of the hedgehog family, is expected to be useful for elucidation of IHH gene functions, and such inhibitor is expected to suppress or delay progression of the clinical state of fibrosis. In addition, IHH gene inhibitors are useful for treatment, prevention, amelioration, or suppression or delaying of progression of inflammatory diseases or fibrotic diseases in, for example, renal, pulmonary, and dermal tissue or organs, in addition to the liver.

The present invention provides an IHH gene inhibitor. As the IHH gene inhibitor, the present invention provides a nucleic acid complex comprising a heteroduplex oligonucleotide (HDO) that regulate IHH gene expression.

Solutions

The present inventors had advanced research on genes associated with animal fibrosis. As a result, they discovered that a novel gene; i.e., the IHH gene, is associated with fibrosis. The present invention discloses, as solutions, a nucleic acid complex for decreasing expression of mRNA and proteins; i.e., IHH gene transcription products. More specifically, the present invention discloses an IHH gene inhibitor and a method for inhibiting IHH gene expression.

The IHH gene inhibitor is useful for a patient who is in need of treatment, prevention, amelioration, or delaying of progression of fibrosis and fibrotic diseases.

Specifically, the present invention is as described below.
[1] A nucleic acid complex consisting of an oligonucleotide of 12 to 30 nucleotides, wherein the oligonucleotide has a nucleic acid base sequence complementary to an IHH gene transcription product.
[2] The nucleic acid complex according to [1], wherein the oligonucleotide is a single-stranded oligonucleotide.
[3] The nucleic acid complex according to [1], which is a heteroduplex oligonucleotide consisting of an antisense strand consisting of the oligonucleotide and a nucleic acid strand complementary to the antisense strand.
[4] The nucleic acid complex according to any of [1] to [3], wherein the oligonucleotide comprises at least 1 modified nucleotide.
[5] The nucleic acid complex according to any of [1] to [4], wherein the oligonucleotide comprises at least 1 phosphorothioate oligonucleotide.
[6] The nucleic acid complex according to any of [1] to [5], wherein the oligonucleotide comprises at least 1 phosphodiester oligonucleotide.
[7] The nucleic acid complex according to [5], wherein the oligonucleotide is phosphorothioate oligonucleotide.
[8] The nucleic acid complex according to any of [1] to [7], wherein the oligonucleotide comprises a modified nucleic acid base.
[9] The nucleic acid complex according to [8], wherein the modified nucleic acid base is 5-methylcytosine, 2'-MOE, BNA, LNA, or AmNA.
[10] The nucleic acid complex according to any of [3] to [9], wherein the nucleic acid strand complementary to the antisense strand is RNA.
[11] The nucleic acid complex according to any of [1] to [10], wherein the oligonucleotide comprises:
  a gap region consisting of a plurality of nucleic acids;
  a 5'-wing region consisting of a plurality of nucleic acids; and
  a 3'-wing region consisting of a plurality of nucleic acids.
[12] The nucleic acid complex according to any of [1] to [11], wherein the nucleic acid base sequence of the oligonucleotide consists of a base sequence complementary to an oligonucleotide consisting of 12 to 30 continuous nucleotides in the IHH gene sequence as shown in SEQ ID NO: 1 or 2.
[13] The nucleic acid complex according to [12], wherein the nucleic acid base sequence of the oligonucleotide consists of any sequence as shown in SEQ ID NO: 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, or 112.
[14] The nucleic acid complex according to [13], wherein the nucleic acid base sequence of the oligonucleotide consists of a sequence as shown in SEQ ID NO: 26.
[15] The nucleic acid complex according to any of [1] to [11], wherein the nucleic acid base sequence of the oligonucleotide consists of any sequence as shown in SEQ ID NO: 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 178, 180, 182, 184, 186, or 188.
[16] The nucleic acid complex according to [15], wherein the nucleic acid base sequence of the oligonucleotide consists of a sequence as shown in SEQ ID NO: 160, 170, or 178.
[17] A pharmaceutical composition containing an IHH-specific inhibitor, which comprises the nucleic acid complex according to any of [1] to [16].
[18] A therapeutic agent of fibrosis containing an IHH-specific inhibitor, which comprises the nucleic acid complex according to [1].
[19] A therapeutic agent of Nash containing an IHH-specific inhibitor, which comprises the nucleic acid complex according to any of [1] to [16].
[20] A therapeutic agent of hepatic fibrosis containing an IHH-specific inhibitor, which comprises the nucleic acid complex according to any of [1] to [16].
[21] A therapeutic agent of renal fibrosis containing an IHH-specific inhibitor, which comprises the nucleic acid complex according to any of [1] to [16].
[22] A therapeutic agent of pancreatic fibrosis containing an IHH-specific inhibitor, which comprises the nucleic acid complex according to any of [1] to [16].
[23] A therapeutic agent of pulmonary fibrosis containing an IHH-specific inhibitor, which comprises the nucleic acid complex according to any of [1] to [16].
[24] A therapeutic agent of dermal fibrosis containing an IHH-specific inhibitor, which comprises the nucleic acid complex according to any of [1] to [16].
[25] A nucleic acid complex having a nucleic acid base sequence comprising 12 to 30 oligonucleotides and at least 8 continuous nucleic acid bases in the nucleic acid base sequence as shown in any of SEQ ID Nos: 1 to 50.

This description includes part or all of the content as disclosed in the description and/or drawings of Japanese Patent Application No. 2019-047703, which is a priority document of the present application.

Effects of the Invention

The nucleic acid complex according to the present invention comprising an oligonucleotide consisting of 12 to 30 nucleotides, which has a nucleic acid base sequence complementary to an IHH gene transcription product, can inhibit IHH gene expression and it can be used for treatment of fibrosis.

BRIEF DESCRIPTION OF THE DRAWINGS

FIG. 2-1 shows a human IHH gene coding sequence.

FIG. 2-2 shows a mouse IHH gene coding sequence.

FIG. 3-1 shows a chart demonstrating primary screening of human and mouse IHH gene coding sequences (Ren-1-1 to -31).

FIG. 3-2 shows a chart demonstrating primary screening of human and mouse IHH gene coding sequences (Ren-1-32 to -55).

FIG. 13-1 shows the influence of Toc-Ren-1-12-27 HDO on fibrosis marker (A: COL1A1; and B: CTGF) gene expression in NASH pathological mouse models prepared by feeding an MCD diet.

FIG. 13-2 shows the influence of Toc-Ren-1-12-27 HDO on fibrosis marker (A: TGFB1; and B: TIMP) gene expression in NASH pathological mouse models prepared by feeding an MCD diet.

FIG. 13-3 shows the influence of Toc-Ren-1-12-27 HDO on fibrosis marker (ACTA2) gene expression in NASH pathological mouse models prepared by feeding an MCD diet.

EMBODIMENTS OF THE INVENTION

Figure 1:
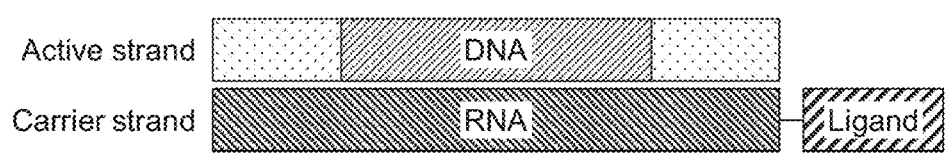
FIG. 1 shows an HDO structure.

Hereafter, the present invention is described in detail.

The present invention relates to a nucleic acid complex comprising an oligonucleotide consisting of 12 to 30 nucleotides, wherein the oligonucleotide has a nucleic acid base sequence complementary to an Indian hedgehog (IHH) gene transcription product. A nucleic acid having a nucleic acid base sequence complementary to an IHH gene transcription product acts as an antisense nucleic acid on the IHH gene transcription product. Specifically, it acts as an IHH-gene-specific inhibitor, and it has activity of suppressing the target IHH gene expression level or the general transcription product level by the antisense effects.

The IHH gene transcription product is mRNA transcribed from genome DNA that encodes the IHH gene, and mRNA that is not subjected to nucleotide modification and an mRNA precursor that is not subjected to splicing are within the scope thereof. In general, a "transcription product" may be any RNA that is synthesized by DNA-dependent RNA polymerase.

In a particular embodiment, an oligonucleotide constituting a nucleic acid complex is a single-stranded oligonucleotide. Specifically, it is a single-stranded antisense oligonucleotide (ASO).

In a particular embodiment, a nucleic acid complex is a heteroduplex oligonucleotide (HDO) consisting of an antisense strand consisting of an oligonucleotide and a sense strand, which is a nucleic acid strand complementary to the antisense strand, and the antisense strand is annealed to the nucleic acid sense strand. The antisense strand is referred to as the first nucleic acid strand, and the sense strand is referred to as the second nucleic acid strand, according to need. Such nucleic acid complex is referred to as a duplex oligonucleotide complex.

In a particular embodiment, a nucleic acid complex may be a single-stranded oligonucleotide when it is prepared, and the nucleic acid complex may comprise an antisense strand consisting of a DNA nucleotide or DNA nucleotide analog, a linker sequence consisting of 3 to 10 nucleotides, and a sense strand consisting of an RNA nucleotide or RNA nucleotide analog complementary to the antisense strand. The nucleic acid complex as described above is referred to as a single-stranded heteroduplex oligonucleotide (ss-HDO). For example, it is an oligonucleotide consisting of a X-L-Y structure described in WO 2017/131124 A1, and the X-L-Y structure comprises a nucleotide X serving as an antisense strand, a nucleotide Y serving as a strand complementary to the antisense strand, and a nucleotide L serving as a linker. When such single-stranded oligonucleotide is used as a pharmaceutical composition, single-molecule annealing takes place between an antisense strand and a strand complementary to the antisense strand via a linker in physiological saline, a solvent used for an aqueous injection preparation, a non-aqueous injection preparation, a suspended injection preparation, or a solid injection preparation, the blood, or the plasma to forma double-stranded structure. When such nucleic acid complex acts as a pharmaceutical composition, it undergoes single-molecule annealing to form a double-stranded structure. Thus, it is a duplex oligonucleotide complex.

A basic configuration of a heteroduplex oligonucleotide (HDO) to serve as a pharmaceutical composition comprising the IHH-specific inhibitor according to the present invention is as described below. Specifically, HDO is composed of 2 strands: i.e., an antisense strand composed of active DNAs (an active strand) and a sense strand mainly composed of RNA having a sequence complementary to the active strand (i.e., a carrier strand) (FIG. 1). In addition, HDO comprises a ligand structure in its sense strand. Because of such configuration, a pharmaceutical composition containing an IHH-specific inhibitor is highly stable in the human blood, and it is efficiently delivered to a target tissue in accordance with ligand properties. After HDO reached inside the cells, an RNA strand is removed immediately with the aid of RNase H. The liberated DNA strand forms a new double-stranded structure with mRNA, mRNA is degraded by the action of intracellular RNase H, and the knockdown activity is then exerted.

In a particular embodiment, a nucleic acid complex comprises 12 to 30 oligonucleotides, and the oligonucleotide has a nucleic acid base sequence complementary to an IHH gene transcription product.

An oligonucleotide, which is an antisense strand of the nucleic acid complex according to the present invention, targets mRNA, which is an IHH gene transcription product. The nucleotide sequence of the antisense strand is complementary to a partial sequence of the nucleotide sequence of the human IHH gene or a partial sequence of the nucleotide sequence of the mouse IHH gene, and it is preferably complementary to a partial sequence of the nucleotide sequence of the human IHH gene. SEQ ID NO: 1 shows the nucleotide sequence of the human IHH gene, and SEQ ID NO: 2 shows the nucleotide sequence of the mouse IHH gene. Specifically, a nucleic acid base sequence consisting of the oligonucleotide of 12 to 30 nucleotides of the present invention and having a nucleic acid base sequence complementary to an IHH transcription product is complementary to a partial sequence of the nucleotide sequence of the human IHH gene or a partial sequence of the nucleotide sequence of the mouse IHH gene.

Specifically, the nucleic acid base sequence of the oligonucleotide may comprise any sequence as shown in, for example, SEQ ID NO: 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, or 112. In particular, a nucleic acid base sequence consisting of a sequence as shown in SEQ ID NO: 19, 24, 26, 28, 76, 78, 84, or 86 is preferable, and a nucleic acid base sequence consisting of a sequence as shown in SEQ ID NO: 26 is more preferable.

The sense strand sequence (SEQ ID NO: 25) of the sequence as shown in SEQ ID NO: 26 is a sequence comprising nucleotides 598 to 611 (14 nucleotide length) of the nucleotide sequence as shown in SEQ ID NO: 1. A sequence complementary to a sense strand of 13 to 20 nucleotide length that starts from nucleotide 603 or 596 of the nucleotide sequence as shown in SEQ ID NO: 1 may be a nucleic acid base sequence of the oligonucleotide.

Specifically, the nucleic acid base sequence of the oligonucleotide may comprise any sequence as shown in, for example, SEQ ID NO: 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 178, 180, 182, 184, 186, or 188. In particular, a nucleic acid base sequence consisting of a sequence as shown in SEQ ID NO: 160, 170, or 178 is preferable.

Hereafter, DHO is described in detail. A single-stranded oligonucleotide can be prepared on the basis of the description concerning the antisense strand provided below and used.

The first nucleic acid strand has properties (i) to (iv) below:

(i) the first nucleic acid strand comprises nucleotides and optionally nucleotide analogs and comprises 8 to 100 such nucleotides and nucleotide analogs in total;

(ii) when the first nucleic acid strand hybridizes to a transcription product, it comprises at least 4 continuous nucleotides recognized by RNase H;

(iii) the first nucleic acid strand comprises at least 1 non-naturally-occurring nucleotide; and (iv) the first nucleic acid strand hybridizes to the transcription product.

The second nucleic acid strand has any of properties (i) to (iii) below:

(i) the second nucleic acid strand comprises RNA nucleotides and optionally nucleotide analogs and DNA nucleotides;

(ii) the second nucleic acid strand comprises DNA nucleotides and/or nucleotide analogs; or (iii) the second nucleic acid strand comprises PNA nucleotides.

The term "antisense effects" used herein refers to suppression of the target gene expression or target transcription product level caused by, for example, hybridization between a target transcription product (an RNA sense strand) and a DNA strand complementary to the partial sequence or a strand generally designed to exert antisense effects. The term may refer to inhibition of translation that can be caused by covering the transcription product with a hybridization product or the suppression as described above that can be caused by the effects of splicing function conversion such as exon skipping and/or degradation of the transcription product upon recognition of the hybridized region.

The term "complimentary" used herein refers to a correlation such that a so-called Watson-click base pairing (natural base pairing) or non-Watson-click base pairing (Hoogsteen base pairing or the like) can be formed via hydrogen bond. When a sufficient number of nucleic acid bases in an antisense strand can form hydrogen bonds with corresponding nucleic acid bases in the target nucleic acid, desirable effects are achieved because the antisense strand is complementary to the target nucleic acid (e.g., antisense inhibition of a target nucleic acid of the IHH gene). Nucleic acid bases that are noncomplementary between the antisense strand and the IHH gene are acceptable provided that the antisense strand can specifically hybridize to the target nucleic acid. In addition, an antisense compound can hybridize to 1 or more segments of a Tau nucleic acid. Thus, intervening or adjacent fragments are not involved in hybridization events (e.g., a loop, mismatch, or hairpin structure). The antisense strand is complementary to the sequence of mRNA encoding the IHH gene. At a sufficient extent of complementarity, an antisense strand can bind to mRNA encoding the IHH gene. For example, an extent of complementarity may be 80% or higher, 90% or higher, 95% or higher, 96% or higher, 97% or higher, 98% or higher, or 99% or higher. An extent of complementarity may be 100%. There may be approximately 0 to 4 mismatches.

In a particular embodiment, the antisense strand provided herein or a particular region thereof exhibits complementarity of 80% to 100%, preferably 90% to 100%, more preferably 95% to 100%, or 100% to a Tau nucleic acid, a target region, a target segment, or a particular region thereof. An extent of complementarity of the antisense strand to the target nucleic acid can be determined in accordance with a conventional technique.

For example, 16 out of 20 nucleic acid bases in the antisense strand are complementary to the target region. Thus, the antisense strand specifically hybridizing thereto exhibits complementarity of 80%. In this example, complementary nucleic acid bases can be aggregated or scattered in the remaining noncomplementary nucleic acid bases, and such noncomplementary nucleic acid bases are not necessarily adjacent to each other or to the complementary nucleic acid bases. In an antisense strand of 18 nucleic acid base length comprising 2 regions completely complementary to the target nucleic acid and 4 noncomplementary nucleic acid bases adjacent to the 2 complementary regions, for example, 14 nucleic acid bases are complementary to the target nucleic acid region. That is, such antisense strand exhibits complementarity of 77.8% relative to the entire region and thus is within the scope of the present invention. An extent of complementarity of the antisense strand relative to the target nucleic acid region can be determined by, for example, the BLAST program known in the art.

In an embodiment, a first nucleic acid strand is an antisense nucleic acid that is complementary to a target transcription product, such as a transcription product of a target gene. When the first nucleic acid strand hybridizes to the transcription product, such nucleic acid has a region comprising at least 4 continuous nucleotides.

The term "nucleic acid" used herein may refer to a monomer nucleotide, and the term may refer to an oligonucleotide composed of a plurality of monomers. The term "nucleic acid strand" is also used to refer to an oligonucleotide. The entire nucleic acid strand or a part thereof may be prepared via chemical synthesis with the use of an automated synthesizer, or it may be prepared via enzyme treatment with the use of a polymerase, a ligase, or a restriction enzyme, although a method of preparation is not limited thereto.

The length of the first nucleic acid strand is not particularly limited, and the number of bases is 12 to 30, 12 to 25, or 13 to 20. In general, the length of the strand may be selected in accordance with the strength of antisense effects attained by the nucleic acid strand on the target, the cost, the synthesis yield, and other factors.

The length of the second nucleic acid strand may be the same as that of the first nucleic acid strand. In such a case, the number of bases is 12 to 30, 12 to 25, or 13 to 20. The length of the second nucleic acid strand may be shorter or longer by several to a dozen bases than that of the first nucleic acid strand.

The "at least 4 continuous nucleotides recognized by RNase H" is generally a region comprising 4 to 20, 5 to 16, or 6 to 12 continuous nucleotides. Such region can be composed of nucleotides recognized by RNase H that cleaves the RNA strand when hybridized to an RNA nucleotide, such as a naturally-occurring DNA. Preferable nucleotides such as modified DNA nucleotides and other bases are known in the art. A nucleotide having a hydroxy group at position 2' such as RNA nucleotide is known to be unsuitable. Regarding the application to the region comprising "at least 4 continuous nucleotides," a person skilled in the art would readily determine compatibility of the nucleotides.

In an embodiment, the first nucleic acid strand comprises "nucleotides and optionally nucleotide analogs." This indicates that the first nucleic acid strand may comprise DNA nucleotides and RNA nucleotides and may further comprise optionally nucleotide analogs.

The term "DNA nucleotide" used herein refers to a DNA nucleotide that exists in nature or a DNA nucleotide with a modified base, sugar, or phosphate binding subunit. In the same manner, the term "RNA nucleotide" used herein refers to an RNA nucleotide that exists in nature or an RNA nucleotide with a modified base, sugar, or phosphate binding subunit. Modification of a modified base, sugar, or phosphate binding subunit is addition of a substituent or substitution of a substituent in a subunit. The term does not indicate that the entire subunit would be substituted with different chemical groups. From the viewpoint of high resistance to a DNA-degrading enzyme or the like, DNAs in the entire region comprising nucleotides or apart thereof may be modified nucleotides. Examples of modification include: 5-methylation, 5-fluorination, 5-bromation, 5-iodization, and N4-methylation of cytosine; 5-demethylation, 5-fluorination, 5-bromation, and 5-iodization of thymidine; N6-methylation and 8-bromation of adenine; N2-methylation and 8-bromation of guanine; phosphorothioation, methylphosphonation, methylthiophosphonation, chiral-methylphosphonation, phosphorodithioation, phosphoroamidation, 2-O-methylation, 2'-methoxyethalation (MOE), 2-aminopropylation (AP), and 2'-fluorination. From the viewpoint of excellent dynamics, phosphorothiation is preferable. Such modification may be provided in combinations of two or more on the same DNA. As described below, an RNA nucleotide may be modified to exert similar effects.

In some embodiments, the number or position of modified DNA(s) may affect the antisense effects exerted by the duplex oligonucleotide according to the present invention. While such embodiments vary depending on target gene sequences or other factors, a person skilled in the art can determine the number or position of modified DNA(s) with reference to the literatures concerning the antisense method described below. When the assayed antisense effects of the modified duplex oligonucleotide complex are not significantly lowered compared with those of the duplex oligonucleotide complex before modification (e.g., the assayed value for the modified duplex oligonucleotide complex is 30% or more of the assayed value for the duplex oligonucleotide complex before modification), such modification can be evaluated effective. The antisense effects can be adequately assayed in the manner described below. For example, a test nucleic acid compound is introduced into a cell, and the target gene expression level (e.g., the mRNA level, the cDNA level, or the protein level) in the cell that is suppressed by the antisense effects exerted by the test nucleic acid compound is then assayed via a conventional technique as described in the examples below, such as Northern blotting, quantitative PCR, or Western blotting.

The "nucleotide analog" is a nucleotide that does not exist in nature. In a base, sugar, or phosphate binding subunit of a nucleotide, 2 or more substituents are added, 2 or more substituents in the subunit are substituted, or the entire subunit is substituted with different chemical groups. An example of an analog involving substitution of 2 or more substituents is a bridged nucleic acid. A bridged nucleic acid is a nucleotide analog comprising a crosslinking unit added thereto on the basis of substitution at 2 sites in a sugar ring. A typical example is a nucleotide analog in which carbon at position 2' is bound to carbon at position 4'. In an embodiment, the first nucleic acid strand further comprises a nucleotide analog to enhance the affinity to a partial sequence of a target gene transcription product and/or resistance to a nucleic acid-degrading enzyme. A "nucleotide analog" may be any nucleotide, provided that its affinity to a partial sequence of a target gene transcription product and/or resistance to a nucleic acid-degrading enzyme are enhanced via modification (e.g., crosslinking or substitution). Examples thereof that are preferably used in the antisense method are disclosed in JP H10-304889 A, WO 2005/021570, JP H10-195098 A, JP 2002-521310 A, WO 2007/143315, WO 2008/043753, WO 2008/029619, and WO 2008/049085 (hereafter, such literatures are also referred to as "the literatures concerning the antisense method"). Specific examples include the nucleic acids disclosed in the literatures mentioned above: hexitol nucleic acid (HNA), cyclohexene nucleic acid (CeNA), peptide nucleic acid (PNA), glycol nucleic acid (GNA), threose nucleic acid (TNA), morpholinonucleic acid, tricyclo-DNA (tcDNA), 2'-O-methylated nucleic acid, 2'-MOE (2'-O-methoxyethylated) nucleic acid, 2'-AP (2'-O-aminopropylated) nucleic acid, 2-fluorinated nucleic acid, 2'F-arabinonucleic acid (2'-F-ANA), and BNA (bridged nucleic acid).

In an embodiment, BNA may be a ribonucleotide or deoxyribonucleotide in which carbon at position 2' is bridged with carbon at position 4' with the aid of 2 or more atoms. Examples of bridged nucleic acids are known in the art. An example of a BNA subgroup is BNA in which carbon at position 2' is bridged with carbon at position 4' with the aid of 4'-$(CH_2)_p$—O-2', 4'—$(CH_2)_p$—S-2', 4'—$(CH_2)_p$—OCO-2', and 4'-$(CH_2)_n$—$N(R_3)$—O—$(CH_2)_m$-2' (wherein p, m, and n are each an integer of 1 to 4, 0 to 2, and 1 to 3; and $R_3$ represents a hydrogen atom, an alkyl group, an alkenyl group, a cycloalkyl group, an aryl group, an aralkyl group, an acyl group, a sulfonyl group, and a unit substituent (e.g., a fluorescence or chemiluminescence label molecule, a functional group having nucleic acid cleavage activity, or intracellular or nuclear transfer signal peptide)). In an embodiment, BNA comprises a substituent of carbon at position 3' ($OR_2$) and a substituent of carbon at position 5' ($OR_1$), wherein $OR_1$ and $OR_2$ are typically hydrogen atoms, $OR_1$ and $OR_2$ may be the same with or different from each other, and $OR_1$ and $OR_2$ may be each a hydroxyl protective group in nucleic acid synthesis, an alkyl group, an alkenyl group, a cycloalkyl group, an aryl group, an aralkyl group, an acyl group, a sulfonyl group, a silyl group, a phosphoric acid group, a phosphoric acid group protected with a protective group of nucleic acid synthesis, or —$P(R_4)R_5$ (wherein $R_4$ and $R_5$ may be the same with or different from each other and $R_4$ and $R_5$ each represent a hydroxyl group, a hydroxyl group protected with a protective group of nucleic acid synthesis, a mercapto group, a mercapto group protected with a protective group of nucleic acid synthesis, an amino group, an alkoxy group having 1 to 5 carbon atoms, an alkylthio group having 1 to 5 carbon atoms, a cyanoalkoxy group having 1 to 6 carbon atoms, or an amino group substituted with an alkyl group having 1 to 5 carbon atoms). Examples of BNAs include α-L-methyleneoxy(4'-$CH_2$—O-2')BNA or β-D-methyleneoxy(4'-$CH_2$—O-2')BNA also referred to as LNA™ (a locked nucleic acid, 2',4'-BNA), ethyleneoxy(4'-$(CH_2)_2$—O-2')BNA, β-D-thio (4'-$CH_2$—S-2')BNA, and aminoxy(4'-$CH_2$—O—$N(R_3)$-2')BNA also referred to as ENA, oxyamino(4'-$CH_2$—$N(R_3)$—O-2')BNA, 2',4'-$BNA^{COC}$, 3' amino-2',4'-BNA, and 5'-methyl BNA also referred to as 2',4'-$BNA^{NC}$, (4'-CH($CH_3$)—O-2')BNA also referred to as cEt-BNA, (4'-CH($CH_2OCH_3$)—O-2')BNA also referred to as cMOE-BNA, amide BNA(4'-C(O)—N(R)-2')BNA (R=H, Me) also referred to as AmNA, and other BNAs known in the art.

A modified nucleic acid according to an embodiment may be modified at its base site. Examples of modification include: 5-methylation, 5-fluorination, 5-bromation, 5-iodization, and N4-methylation of cytosine; 5-demethylation, 5-fluorination, 5-bromation, and 5-iodization of thymidine; N6-methylation and 8-bromation of adenine; and N2-methylation and 8-bromation of guanine. A modified nucleic acid according to another embodiment may be modified at its phosphodiester binding site. Examples of modification of the phosphodiester binding site include phosphorothioation, methylphosphonation, methylthiophosphonation, chiralmethylphosphonation, phosphorodithioation, and phosphoroamidation. From the viewpoint of excellent dynamics, phosphorothiation is adopted. Such modification of a base site or that of a phosphodiester binding site may be provided in combinations of two or more on the same nucleic acid.

In general, modified nucleotides and modified nucleotide analogs are not limited to those exemplified herein. Many modified nucleotides and modified nucleotide analogs are known in the art. For example, the description of U.S. Pat.

No. 8,299,039 of Tachas et al., in particular, the description in the sections 17 to 22, can be adopted as the embodiments of the present application.

A person skilled in the art can adequately select nucleotide analogs from among such modified nucleic acids in view of antisense effects, affinity to a partial sequence of the target gene transcription product, resistance to a nucleic acid degrading enzyme, and other conditions. In an embodiment, a nucleotide analog is LNA represented by Formula (1) below.

[Formula 1]

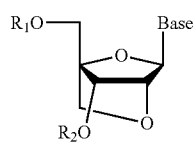

In Formula (1), "Base" represents an optionally substituted aromatic heterocyclic or aromatic hydrocarbon ring group, such as a base site of a natural nucleoside (a purine base or pyrimidine base) or a base site of a non-natural (modified) nucleoside. Examples of modification at a base site are as described above.

$R_1$ and $R_2$ may be the same with or different from each other and each represent a hydrogen atom, a hydroxyl protective group in nucleic acid synthesis, an alkyl group, an alkenyl group, a cycloalkyl group, an aryl group, an aralkyl group, an acyl group, a sulfonyl group, a silyl group, a phosphoric acid group, a phosphoric acid group protected with a protective group of nucleic acid synthesis, or —P($R_4$)$R_5$ (wherein $R_4$ and $R_5$ may be the same with or different from each other and each represent a hydroxyl group, a hydroxyl group protected with a protective group of nucleic acid synthesis, a mercapto group, a mercapto group protected with a protective group of nucleic acid synthesis, an amino group, an alkoxy group having 1 to 5 carbon atoms, an alkylthio group having 1 to 5 carbon atoms, a cyanoalkoxy group having 1 to 6 carbon atoms, or an amino group substituted with an alkyl group having 1 to 5 carbon atoms).

While a compound represented by the chemical formula above is a nucleoside, a form of such nucleoside comprising a phosphoric acid group bound thereto (i.e., a nucleotide) is within the scope of "LNA" according to an embodiment and general BNA. Specifically, BNA, such as LNA, is integrated as a nucleotide into a nucleic acid strand comprising a duplex oligonucleotide complex.

In an embodiment, a "wing region comprising a nucleotide analog consisting of a plurality of nucleic acids" is provided in a position (or positions) closer to the 5' terminus and/or the 3' terminus of a region consisting of a plurality of nucleic acids including the at least 4 continuous DNA nucleotides (hereafter, it may be referred to as a "DNA gap region").

A region comprising a nucleotide analog provided at the 5' terminus of the DNA gap region (hereafter, it may be referred to as a "5' wing region") and a region comprising a nucleotide analog provided at the 3' terminus of the DNA gap region (hereafter, it may be referred to as a "3' wing region") are independently of each other, it would be sufficient if such region comprises at least one nucleotide analog mentioned in the literature concerning the antisense method, and such region may further comprise a naturally-occurring nucleic acid (DNA or RNA) other than the nucleotide analog. The 5' wing region and the 3' wing region each generally comprise 1 to 10 bases, 1 to 7 bases, 1 to 5 bases, or 2 to 5 bases.

In the 5' wing region and the 3' wing region, in addition, the type, the number, and the position of a nucleotide analog and a naturally-occurring nucleotide may affect, for example, antisense effects exerted by a duplex oligonucleotide complex according to an embodiment. Thus, a preferable embodiment can vary depending on a sequence or the like. A person skilled in the art would generally be able to determine a preferable embodiment with reference to the literature concerning the antisense method. As with the region comprising "at least 4 continuous DNA nucleotides," the modification of interest can be evaluated preferable if the antisense effects of the modified duplex oligonucleotide are not lowered to a significant extent compared with those of the duplex oligonucleotide before modification.

An antisense strand to mRNA of the IHH gene comprising a modified oligonucleotide can be composed of a 5' wing region (a 5' wing site) consisting of 1 to 10 bases, a gap region consisting of 8 to 25 bases, and a 3' wing region (a 3' wing site) consisting of 1 to bases. An antisense strand can comprise, for example, a 2-10-2 motif and a 3-10-3 motif. The first numeral in the motif indicates the number of bases in the 5' wing region, the second numeral indicates the number of bases in the gap region, and the third numeral indicates the number of bases in the 3' wing region.

In the conventional antisense method involving the selective use of RNA or LNA, translation was inhibited by binding to a target mRNA, although the effects attained by such method were generally insufficient. According to the antisense method involving the selective use of DNA, in contrast, a double-stranded structure consisting of DNA and RNA is formed upon binding to a target gene. Accordingly, mRNA is targeted by RNase H and cleaved. While higher inhibitory effects could be expected on target gene expression, actual effects were insufficient because of a weak binding to the target gene.

In the first nucleic acid strand, accordingly, DNA comprising at least 4 bases is provided in the middle, and LNAs (or other BNAs) capable of strongly binding to RNA (i.e., a target transcription product) are provided at both terminuses, and such complex strand would accelerate cleavage of target RNA performed by RNase H. "DNA the length of which is 4 bases" is not limited to a DNA nucleotide. When the first nucleic acid strand hybridizes to a transcription product, the first nucleic acid strand is intended to comprise at least 4 continuous nucleotides recognized by RNase H. In an embodiment, antisense effects resulting from formation of a heteroduplex strand with the target transcription product are very high. For this reason, a wing region comprising modified nucleic acids provided in sites closer to the 5' terminus and the 3' terminus of a region comprising at least 4 continuous nucleotides recognized by RNase H preferably comprise any nucleotide analogs when the first nucleic acid strand hybridizes to the transcription product. The nucleotide analog may be BNA, such as LNA.

In an embodiment, the second nucleic acid strand is a nucleic acid that is complementary to the first nucleic acid strand. It is not necessary that the nucleotide sequence of the second nucleic acid strand is completely complementary to the nucleotide sequence of the first nucleic acid strand. Sufficient complementarity is 70% or higher, preferably 80% or higher, and more preferably 90% or higher (e.g., 95%, 96%, 97%, 98%, or 99% or higher complementarity).

The second nucleic acid strand is an oligonucleotide consisting of at least 1 type of nucleic acid selected from the group consisting of RNA, DNA, PNA (peptide nucleic acid), and BNA (e.g., LNA). More specifically, the second nucleic acid strand comprises: (i) an RNA nucleotide, optionally an nucleotide analog, and optionally a DNA nucleotide; (ii) a DNA nucleotide and/or a nucleotide analog; or (iii) a PNA nucleotide.

When the second nucleic acid strand is described as "comprising . . . an RNA nucleotide, optionally an nucleotide analog, and optionally a DNA nucleotide," the second nucleic acid strand comprises an RNA nucleotide, it may comprise optionally an nucleotide analog, and it may further comprise optionally a DNA nucleotide. When the second nucleic acid strand is described as "comprising . . . a DNA nucleotide and/or a nucleotide analog," the second nucleic acid strand may comprise either or both of a DNA nucleotide and a nucleotide analog. When the second nucleic acid strand is described as "comprising . . . a PNA nucleotide," the second nucleic acid strand may be composed of a PNA nucleotide.

However, a duplex oligonucleotide complex according to an embodiment is recognized by RNase H in a cell, the second nucleic acid strand is degraded, and the first nucleic acid strand can exert antisense effects easily. On the basis thereof, the second nucleic acid strand comprises RNA. Since functional molecules such as peptides are easily bound to a duplex oligonucleotide complex according to an embodiment, the second nucleic acid strand may be PNA.

The term "RNA nucleotide" used herein refers to an RNA nucleotide existing in nature or an RNA nucleotide with a modified base, sugar, or phosphate binding subunit. Modification of a modified base, sugar, or phosphate binding subunit is addition of a substituent or substitution of one member in a subunit. Modification of a subunit does not indicate substitution of the entire subunit with different chemical groups.

All or some of nucleic acids in the second nucleic acid strand may be modified nucleotides because of high resistance to nucleic acid-degrading enzymes such as RNA-degrading enzymes. Examples of modification include: 5-methylation, 5-fluorination, 5-bromation, 5-iodization, and N4-methylation of cytosine; 5-demethylation, 5-fluorination, 5-bromation, and 5-iodization of thymidine; N6-methylation and 8-bromation of adenine; N2-methylation and 8-bromation of guanine, phosphorothioation, methylphosphonation, methylthiophosphonation, chiral-methylphosphonation, phosphorodithioation, phosphoroamidation, 2-O-methylation, 2'-methoxyethalation (MOE), 2'-aminopropylation (AP), and 2'-fluorination. While an RNA nucleotide in which a uracil base has been substituted with a thymidine base may be used, phosphorothioation may be adopted from the viewpoint of excellent drug kinetics. Such modification may be performed in combinations of two or more on the same nucleic acid. As adopted in the examples below, for example, phosphorothioation and 2'-O-methylation may be performed on the same RNA so as to impart resistance to cleavage by an enzyme. If an RNA nucleotide is expected or desired to be cleaved by RNase H, however, either phosphorothioation or 2'-O-methylation may be performed.

The number or position of modification may affect the antisense effects exerted by the duplex oligonucleotide according to an embodiment. Accordingly, there are preferable embodiments concerning the number of nucleotide analogs and positions of modification in the second nucleic acid strand. Since such preferable embodiments vary depending on the type, the sequence, and other conditions concerning the nucleic acids to be modified, preferable embodiments can be identified by assaying antisense effects of the modified duplex oligonucleotide as with the case of the first nucleic acid strand. According to a preferable embodiment, degradation of the second nucleic acid strand by an RNA-degrading enzyme such as RNase A is suppressed, and the second nucleic acid strand is degraded by RNase H in a particular cell while the second nucleic acid strand is delivered to a nucleus in a particular cell. Thus, the second nucleic acid strand is likely to exert antisense effects. In this respect, the second nucleic acid strand is RNA, a region complementary to a region comprising nucleotide analogs of the first nucleic acid strand (i.e., the 5' wing region and/or 3' wing region) is composed of modified nucleic acids or nucleotide analogs, and the modification or analogs described above have effects of suppressing degradation by an enzyme such as an RNA-degrading enzyme. In an embodiment, such modification may be 2-O-methylation and/or phosphorothioation performed on RNA. In such a case, the entire region complementary to the region comprising nucleotide analogs of the first nucleic acid strand may be modified, or a part of a region complementary to the region comprising modified nucleic acids of the first nucleic acid strand may be modified. As long as a modified region comprises the part of the region described above, such modified region may be longer or shorter than a region comprising modified nucleic acids of the first nucleic acid strand.

In a duplex oligonucleotide complex according to an embodiment, a functional part may be bound to the second nucleic acid strand. A functional part may be bound to the second nucleic acid strand directly or indirectly via other substance. In an embodiment, a functional part is preferably bound to the second nucleic acid strand directly by means of, for example, covalent binding, ion binding, or hydrogen binding. In order to achieve more stable binding, covalent binding is more preferable.

In an embodiment, a "functional part" can impart functions of interest without particular limitation to the duplex oligonucleotide complex and/or the nucleic acid strand to which the functional part binds. Examples of functions of interest include labeling functions, purification functions, and functions of delivery to a target. Examples of parts to which labeling functions are to be imparted include compounds such as a fluorescent protein and luciferase. Examples of parts to which purification functions are to be imparted include compounds such as biotin, avidin, His-tag peptide, GST-tag peptide, and FLAG-tag peptide.

In order to efficiently deliver the first nucleic acid strand to the target site with high specificity and effectively suppress target gene expression with the aid of the nucleic acid, as a functional part, a molecule having activity of delivering the duplex oligonucleotide complex according to an embodiment to the target site is preferably bound to the second nucleic acid strand.

An example of a part having "functions of delivery to a target" is a lipid since it can efficiently deliver a duplex oligonucleotide complex according to an embodiment to the liver or other organ with high specificity. Examples of lipids include lipids, such as cholesterol and fatty acid (e.g., vitamin E (tocopherols and tocotrienols), vitamin A, and vitamin D), fat-soluble vitamin such as vitamin K (e.g., acylcarnitine), an intermediate metabolite such as acyl-CoA, a glycolipid, a glyceride, and a derivative of any thereof. In an embodiment, use of cholesterol and vitamin E (tocopherols and tocotrienols) is particularly preferable because of higher safety. In an embodiment, a "functional part" may be a sugar (e.g., glucose or sucrose) since it can efficiently deliver the duplex oligonucleotide of the present invention to the brain with high specificity. In an embodiment, a "functional part" may be a peptide or protein of a receptor ligand, an antibody, and/or a fragment thereof since it can bind to various proteins on the cell surfaces of organs and efficiently deliver a duplex oligonucleotide complex according to an embodiment to the organs with high specificity.

While preferable and typical examples of the duplex oligonucleotide complex were described in the embodiments above, the duplex oligonucleotide according to such embodiments are not limited to the typical examples above. In some embodiments, in addition, a person skilled in the art can adequately select a known method to prepare the first nucleic acid strand, the second nucleic acid strand, and the third nucleic acid strand. For example, nucleotide sequences of nucleic acids are designed based on the information on the nucleotide sequence of a target transcription product (or the nucleotide sequence of a target gene, according to need), the nucleotide sequences are synthesized using a commercially available automated nucleic acid synthesizer (e.g., Applied Biosystems or Beckman), and the resulting oligonucleotides are then purified using an reversed column or the like to prepare nucleic acids. The nucleic acids thus prepared are mixed in an adequate buffer, denatured at approximately 90° C. to 98° C. for several minutes (e.g., 5 minutes), and annealed at approximately 30° C. to 70° C. for approximately 1 to 8 hours. Thus, duplex oligonucleotide complexes according to several embodiments can be prepared. A duplex oligonucleotide complex to which a functional part has bound can be prepared by subjecting a nucleic acid species to which the functional part had bound to synthesis, purification, and annealing as described above. Thus, the duplex oligonucleotide complex can be prepared. Many methods for allowing a functional part to bind to a nucleic acid are well known in the art.

Preferable embodiments of the duplex oligonucleotide according to the present invention were described above. The "second nucleic acid strands" according to some embodiments are excellent in that it can efficiently deliver the antisense nucleic acid to the target site without deteriorating antisense effects. Accordingly, the duplex oligonucleotides according to some embodiments are not limited to the embodiments described above. For example, the present invention can provide an embodiment comprising the antisense nucleic acid described below instead of the first nucleic acid strand.

The present invention provides a duplex oligonucleotide complex having activity of suppressing target gene expression by antisense effects, which comprises (i) an antisense nucleic acid complementary to a target gene transcription product that does not comprise DNA and (ii) a nucleic acid complementary to the nucleic acid as defined in (i).

In an embodiment, specifically, the antisense nucleic acid has RNase H-independent antisense effects. The term "RNase H-independent antisense effects" refers to activity of suppressing target gene expression caused by inhibiting translation caused by hybridization between the target gene transcription product (an RNA sense strand) and a nucleic acid strand complementary to a partial sequence thereof or effects of splicing function conversion such as exon skipping.

A "nucleic acid that does not comprise DNA" is an antisense nucleic acid that does not comprise naturally-occurring DNA or modified DNA, and an example thereof is a nucleic acid consisting of PNA or morpholinonucleic acid. As with the case of the first nucleic acid strand or the second nucleic acid strand, all or some of "nucleic acids that do not comprise DNAs" are highly resistant to a nucleic acid-degrading enzyme. Thus, it may be composed of modified nucleotides. Examples of modification are as presented above, and modification may be performed in combinations of two or more on the same nucleic acid. As with the first nucleic acid strand described above, preferable embodiments concerning the number of modified nucleic acids or the position of modification can be identified by assaying antisense effects of the modified duplex oligonucleotide.

It is not necessary that the nucleotide sequence of the "nucleic acid that does not comprise DNA" is completely complementary to a nucleotide sequence of a nucleic acid complementary to the aforementioned nucleic acid or a nucleotide sequence of a target gene transcription product. An extent of complementarity may be 70% or higher, preferably 80% or higher, and more preferably 90% or higher (e.g., 95%, 96%, 97%, 98%, or 99% or higher).

While the chain length of the "nucleic acid that does not comprise DNA" is not particularly limited, the number of bases is generally 10 to 35, preferably 12 to 25, and more preferably 13 to 20.

A composition comprising the duplex oligonucleotide complex according to any of some embodiments can be prepared in the form of a pharmaceutical product in accordance with a conventional pharmaceutical method. Such composition can be used in the form of, for example, a capsule, a tablet, a pill, a liquid, a powder, granules, fine grains, a film-coated agent, a pellette, a troche, a sublingual formulation, a masticatory formulation, a buccal tablet, a paste, a syrup, a suspension, an elixir, an emulsion, an endermic liniment, an ointment, a plaster, a poultices, a transdermal formulation, a lotion, an inhalant, an aerosol, an injection preparation, or a suppository for enteral (oral) or nonenteral administration.

Such composition can be used in adequate combination with a carrier that is pharmacologically acceptable or acceptable for a food or beverage product. Specific examples include sterilized water, physiological saline, vegetable oil, a solvent, a base, an emulsifier, a suspending agent, a surfactant, a pH modifier, a stabilizer, a flavoring agent, an aromatic agent, an excipient, a vehicle, a preservative, a binder, a diluent, an isotonizing agent, a soothing agent, a filler, a disintegrator, a buffer, a coating agent, a lubricant, a coloring agent, a sweetening agent, a thickener, a corrigent, a solubilizer, and other additives.

When manufacturing a pharmaceutical preparation, as described in Non-Patent Literature 1, the duplex oligonucleotide complexes according to some embodiments comprising lipids, as functional parts, bound thereto may form composites with lipoproteins, such as chylomicron or a chylomicron remnants. In order to enhance efficiency for enteral administration, the duplex oligonucleotide complex may form a composite with, in addition to the lipoprotein, a substance having activity of increasing permeability of the large intestinal epithelium (e.g., medium chain fatty acid, long chain unsaturated fatty acid, or a derivative thereof (salt, ester, or ether) and a surfactant (a nonionic surfactant or anionic surfactant) (i.e., mixed micelle or emulsion)).

Preferable administration routes of the composition according to some embodiments are not particularly limited, and enteral (oral) or nonenteral routes may be adopted. Specific examples include intravenous administration, intraarterial administration, intraperitoneal administration, subcutaneous administration, intracutaneous administration, tracheobronchial administration, rectal administration, intramuscular administration, and transfusion.

The composition according to some embodiments can be used for animal targets including humans. Animals other than humans are not particularly limited, and targets can be various livestock animals, fowls, pet animals, and experimental animals.

When the compositions according to some embodiments are administered or ingested, the amount of administration or ingestion may be adequately determined in accordance with, for example, age, body weight, symptoms, and health conditions of a target, and a composition type (e.g., a pharmaceutical product or food or beverage product). An effective amount of the composition according to an embodiment to be ingested is preferably 0.001 mg/kg/day to 50 mg/kg/day in terms of nucleotides.

The present invention encompasses a therapeutic agent of fibrosis comprising an IHH-specific inhibitor or an inhibitor of an IHH gene transcription product.

By inhibiting the IHH gene with the use of the IHH-specific inhibitor of the present invention, the expression levels of the COL1A1 gene, the CTGF gene, and the ADGRE1 gene are decreased, and the expression levels of the TGFB1 gene and the CCL2 gene are increased.

Diseases to which the pharmaceutical composition comprising the IHH-specific inhibitor of the present invention is applicable as a therapeutic agent are mainly inflammatory diseases including hepatic, renal, pancreatic, pulmonary, and dermal fibrosis. Examples of hepatic fibrosis include fatty liver, alcoholic steatohepatitis (ASH), non-alcoholic fatty liver disease (NAFLD), non-alcoholic steatohepatitis (NASH), chronic hepatitis, liver cirrhosis, and viral, autoimmune, cholangiolitic, metabolic, congestive, drug-induced, infectious, and other liver diseases. Examples of renal fibrosis include kidney fibrosis, nephrogenic systemic fibrosis (NSF), and kidney fibroma. An example of pancreatic fibrosis is cystic fibrosis (CF).

Examples of pulmonary fibrosis include pulmonary fibrosis, interstitial pulmonary fibrosis, acute diffuse interstitial pulmonary fibrosis, and idiopathic pulmonary fibrosis (IPF). Examples of dermal fibrosis include skin fibrosis disease, scleroderma, systemic scleroderma, localized scleroderma, collagen disease, and dermatofibroma.

EXAMPLES

The present invention is described in greater detail with reference to the following examples, although the present invention is not limited to these examples.

[Example 1] Primary Screening

Information on human IHH gene and mouse IHH gene coding sequences was obtained from the NCBI website (https://www.ncbi.nlm.nih.gov/), and 55 antisense oligonucleotides (ASOs) were designed based on the human IHH gene coding sequence: NCBI Reference Sequence: NM_002181.3 (SEQ ID NO: 1) and the mouse IHH gene coding sequence: NCBI Reference Sequence: NM_010544.3 (SEQ ID NO: 2) (sense strand) shown in FIG. 2. Table 1 shows sequence information. Table 1 shows the sequences in the human IHH gene coding sequences or the mouse IHH gene coding sequences as the sense oligonucleotides and sequences complementary thereto are shown as the antisense oligonucleotides. Mouse Hepa1-6 cell lines were sowed on a commercially available 24-well plate at $1 \times 10^5$ cells/ml/well and cultured in a $CO_2$ incubator for 24 hours. On the following day, ASOs (20 nM each) were transfected using Lipofectamine 2000 (Thermo Fisher Scientific) and cultured in a $CO_2$ incubator for 48 hours. Total RNA was extracted from each well of the 24-well plate after culture using the RNeasy Mini Kit (QIAGEN). Thereafter, reverse transcription and quantitative PCR were carried out using the Rotor Gene Probe RT-PCR Kit (QIAGEN) and the Rotor-Gene Q (QIAGEN). In reverse transcription and quantitative PCR, mouse IHH and mouse GAPDH primers and probes selected from the TaqMan Gene Expression Assays (Thermo Fisher Scientific) were used, Ct values of mouse IHH and mouse GAPDH were measured, and mRNA expression levels were then calculated via relative quantification based on the $\Delta\Delta Ct$ method.

Figures 1, 3:
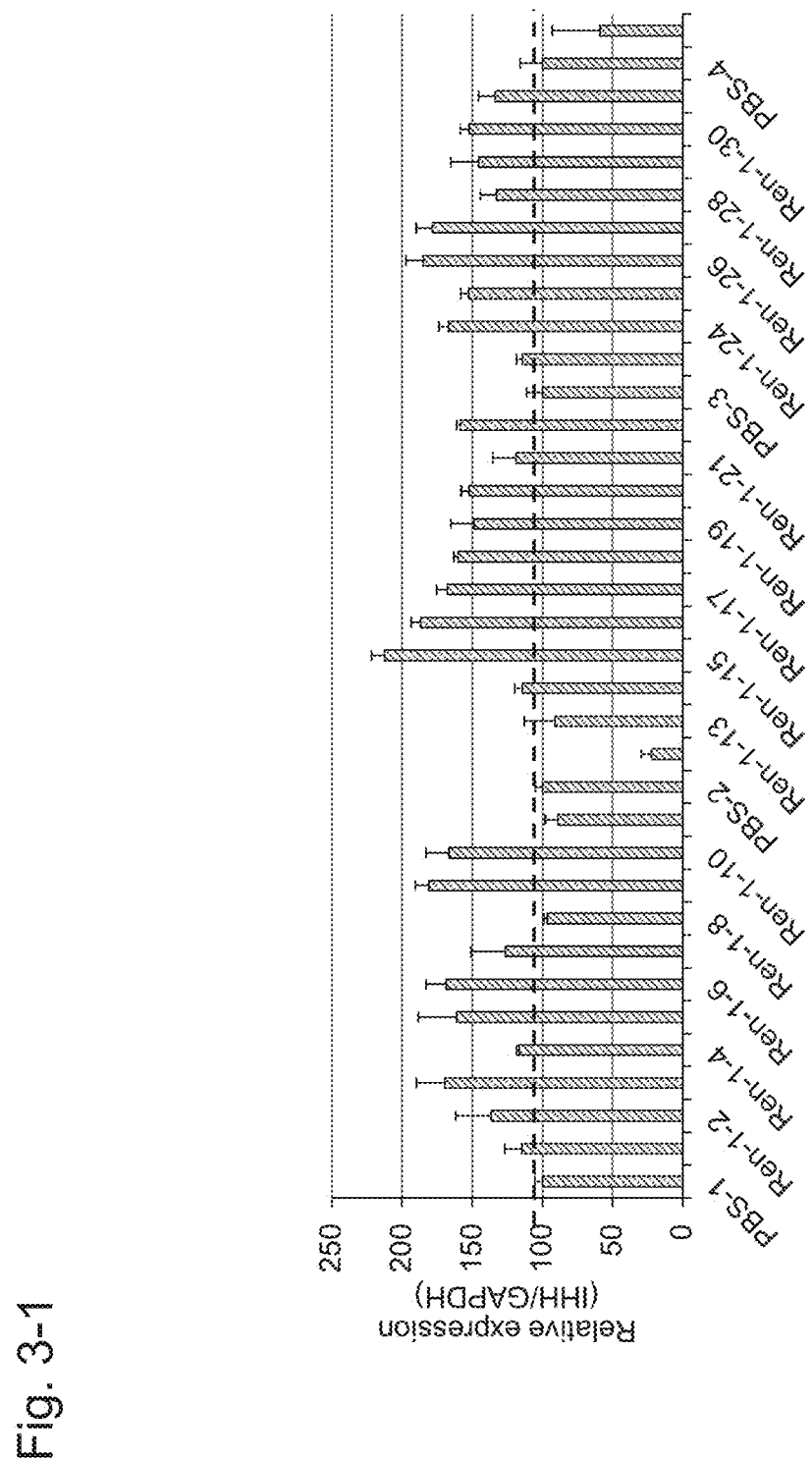
Figures 2, 3:
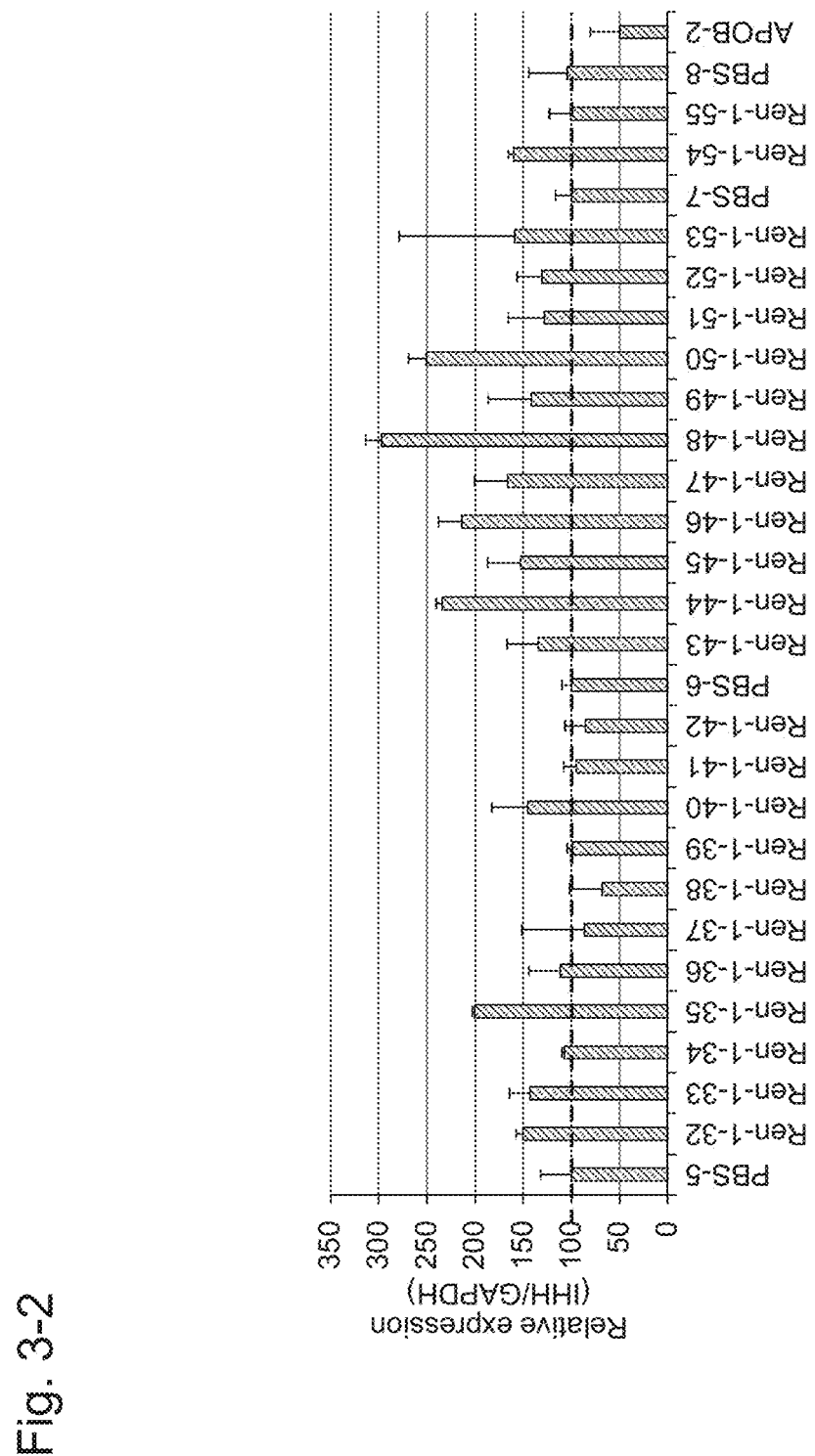

The 55 ASOs obtained in the manner described above (Ren-1-1 to -55) were subjected to IHH gene knockdown screening. The results are shown in FIGS. 3-1 and 3-2. FIG. 3-1 shows the results of screening of Ren-1-1 to -31 and FIG. 3-2 shows the results of screening of Ren-1-32 to -55. PBS-1 to 8 are negative controls and APOB-1 to 2 are antisense nucleic acids used as positive controls. Sequence information was obtained from the literature (Nat. Commun., Aug. 10, 2015; 6: 7969). As shown in FIGS. 3-1 and 3-2, No. 12 (Ren-1-12) exhibited knockdown effects of 78% (FIGS. 3-1 and 3-2).

TABLE 1

ASO sequences designed from the IHH gene

| No. | Sense strand | SEQ ID NO | Antisense strand | SEQ ID NO | Length | Motif | Species specificity | GC content (%) | Tm (° C.) |
|---|---|---|---|---|---|---|---|---|---|
| 1 | ATGGGAGAATTTTG | 3 | CAAAATTCTCCCAT | 4 | 14 | 3-8-3 | Human/mouse | 36 | 56 |
| 2 | TACAAGCAGTTCAG | 5 | CTGAACTGCTTGTA | 6 | 14 | 3-8-3 | Human/mouse | 43 | 63 |
| 3 | GAGAAGACCCTGGG | 7 | CCCAGGGTCTTCTC | 8 | 14 | 3-8-3 | Human/mouse | 64 | 70 |
| 4 | GACATCATCTTCAAGG | 9 | CCTTGAAGATGATGTC | 10 | 16 | 3-10-3 | Human/mouse | 44 | 62 |
| 5 | AGGACGAGGAGAACA | 11 | TGTTCTCCTCGTCCT | 12 | 15 | 3-9-3 | Human/mouse | 53 | 66 |

TABLE 1-continued

ASO sequences designed from the IHH gene

| | | | | | | | | |
|---|---|---|---|---|---|---|---|---|
| 6 | GTGGCAGCTGTCTC | 13 | GAGACAGCTGCCAC | 14 | 14 | 3-8-3 | Human/mouse | 64 | 71 |
| 7 | GTGGCTGACCACCA | 15 | TGGTGGTCAGCCAC | 16 | 14 | 3-8-3 | Human/mouse | 64 | 73 |
| 8 | ATGTTTTGGTCTTT | 17 | AAAGACCAAAACAT | 18 | 14 | 3-8-3 | Human/mouse | 29 | 55 |
| 9 | AATAAGTATGGACTGC | 19 | GCAGTCCATACTTATT | 20 | 16 | 3-10-3 | Human/mouse | 38 | 60 |
| 10 | CCACTGGGCATGTC | 21 | GACATGCCCAGTGG | 22 | 14 | 3-8-3 | Human/mouse | 64 | 71 |
| 11 | ACTGGGTGTATTACGA | 23 | TCGTAATACACCCAGT | 24 | 16 | 3-10-3 | Human/mouse | 44 | 64 |
| 12 | GGCCCACGTGCATT | 25 | AATGCACGTGGGCC | 26 | 14 | 3-8-3 | Human/mouse | 56 | 72 |
| 13 | TATTTAAGTTGTTAGA | 27 | TCTAACAACTTAAATA | 28 | 16 | 3-10-3 | Human/mouse | 19 | 53 |
| 14 | ATGGGGAGGATGG | 29 | CCATCCTCCCCCAT | 30 | 14 | 3-8-3 | Human/mouse | 63 | 69 |
| 15 | ATTTTCCTGGACCG | 31 | CGGTCCAGGAAAAT | 32 | 14 | 3-8-3 | Human/mouse | 56 | 62 |
| 16 | AGGTCATCGAGACTCA | 33 | TGAGTCTCGATGACCT | 34 | 16 | 3-10-3 | Human/mouse | 50 | 70 |
| 17 | ACATTTGCCAGCCA | 35 | TGGCTGGCAAATGT | 36 | 14 | 3-8-3 | Human/mouse | 50 | 70 |
| 18 | TGGTGGAGGATGTGGT | 37 | ACCACATCCTCCACCA | 38 | 16 | 3-10-3 | Human/mouse | 56 | 72 |
| 19 | GCTCAGTTGGCCTTCT | 39 | AGAAGGCCAACTGAGC | 40 | 16 | 3-10-3 | Human/mouse | 56 | 70 |
| 20 | ATGGGGCAGCTGGA | 41 | TCCAGCTGCCCCAT | 42 | 14 | 3-8-3 | Human/mouse | 64 | 74 |
| 21 | TGCTCTACCGCCTG | 43 | CAGGCGGTAGAGCA | 44 | 14 | 3-8-3 | Human/mouse | 64 | 74 |
| 22 | CTCCTGGAACTGCTGT | 45 | ACAGCAGTTCCAGGAG | 46 | 16 | 3-10-3 | Human/mouse | 56 | 72 |
| 23 | TCAAGTCTGAGCATTC | 47 | GAATGCTCAGACTTGA | 48 | 16 | 3-10-3 | Mouse | 44 | 64 |
| 24 | TCTGAACTCACTGG | 49 | CCAGTGAGTTCAGA | 50 | 14 | 3-8-3 | Mouse | 56 | 67 |
| 25 | TCTGTCTGTTCCTGCT | 51 | AGCAGGAACAGACAGA | 52 | 16 | 3-10-3 | Mouse | 50 | 69 |
| 26 | TGCTGCTTCTGGTG | 53 | CACCAGAAGCAGCA | 54 | 14 | 3-8-3 | Mouse | 57 | 69 |
| 27 | AAACCGGCTGAGAGCT | 55 | AGCTCTCAGCCGGTTT | 56 | 16 | 3-10-3 | Mouse | 56 | 71 |
| 28 | CTACGAAGGCAAGATC | 57 | GATCTTGCCTTCGTAG | 58 | 16 | 3-10-3 | Mouse | 50 | 66 |
| 29 | AGCTCTGAGCGCTTCA | 59 | TGAAGCGCTCAGAGCT | 60 | 16 | 3-10-3 | Mouse | 56 | 72 |
| 30 | AGGAAGCTGAAGGGAC | 61 | GTCCCTTCAGCTTCCT | 62 | 16 | 3-10-3 | Mouse | 56 | 69 |
| 31 | ACCTTCCATCCACT | 63 | AGTGGATGGAAGGT | 64 | 14 | 3-8-3 | Mouse | 50 | 65 |
| 32 | AAGTGAGGGTGTTCAC | 65 | GTGAACACCCTCACTT | 66 | 16 | 3-10-3 | Mouse | 50 | 69 |
| 33 | TCCTGCTTTGCAGCT | 67 | AGCTGCAAAGCAGGA | 68 | 15 | 3-9-3 | Mouse | 53 | 71 |
| 34 | AGCTGCAAAGCAGGA | 69 | TCCTGCTTTGCAGCT | 70 | 15 | 3-9-3 | Mouse | 53 | 69 |
| 35 | TGGGTCCTATGCTCCT | 71 | AGGAGCATAGGACCCA | 72 | 16 | 3-10-3 | Mouse | 56 | 73 |

TABLE 1-continued

ASO sequences designed from the IHH gene

| | | | | | | | | | |
|---|---|---|---|---|---|---|---|---|---|
| 36 | TGTCTCCACCCACGT | 73 | ACGTGGGTGGAGACA | 74 | 15 | 3-9-3 | Mouse | 60 | 69 |
| 37 | AACCAGGCCAATATGT | 75 | ACATATTGGCCTGGTT | 76 | 16 | 3-10-3 | Mouse | 44 | 64 |
| 38 | TTGCGGACAATCATAC | 77 | GTATGATTGTCCGCAA | 78 | 16 | 3-10-3 | Mouse | 44 | 63 |
| 39 | CCCTGTCAGCTGTAAA | 79 | TTTACAGCTGACAGGG | 80 | 16 | 3-10-3 | Mouse | 50 | 72 |
| 40 | AAGACAGTGGCTGCT | 81 | AGCAGCCACCTGTCTT | 82 | 16 | 3-10-3 | Mouse | 56 | 72 |
| 41 | TGTGAAACTGCGGGTG | 83 | CACCCGCAGTTTCACA | 84 | 16 | 3-10-3 | Mouse | 56 | 72 |
| 42 | TTTGACTGGGTGTATT | 85 | AATACACCCAGTCAAA | 86 | 16 | 3-10-3 | Mouse | 38 | 59 |
| 43 | ACTCAGAGGAGTCTTT | 87 | AAAGACTCCTCTGAGT | 88 | 16 | 3-10-3 | Mouse | 44 | 62 |
| 44 | ATGAACCAGTGGCCT | 89 | AGGCCACTGGTTCAT | 90 | 15 | 3-9-3 | Mouse | 53 | 69 |
| 45 | AAACATGACCTTCCCT | 91 | AGGGAAGGTCATGTTT | 92 | 16 | 3-10-3 | Mouse | 44 | 70 |
| 46 | AGTCGATGCTGCTAGA | 93 | TCTAGCAGCATCGACT | 94 | 16 | 3-10-3 | Mouse | 50 | 68 |
| 47 | AGTCCCCGAAGCTGT | 95 | ACAGCTTCGGGGACT | 96 | 15 | 3-9-3 | Mouse | 60 | 71 |
| 48 | ATGGAGTCCCCAAGA | 97 | TCTTGGGGACTCCAT | 98 | 15 | 3-9-3 | Mouse | 53 | 66 |
| 49 | TGGTATCAGGGGTA | 99 | TACCCCTGATACCA | 100 | 14 | 3-8-3 | Mouse | 50 | 65 |
| 50 | ACCTTCAGTGATGTGC | 101 | GCACATCACTGAAGGT | 102 | 16 | 3-10-3 | Mouse | 50 | 66 |
| 51 | ACTGTTTCCCAGTTTG | 103 | CAAACTGGGAAACAGT | 104 | 16 | 3-10-3 | Mouse | 44 | 64 |
| 52 | ATCCAAAGGCCTCC | 105 | GGAGGCCTTTGGAT | 106 | 14 | 3-8-3 | Mouse | 56 | 70 |
| 53 | GAACTGAAAGACCACA | 107 | TGTGGTCTTTCAGTTC | 108 | 16 | 3-10-3 | Mouse | 44 | 66 |
| 54 | AGCCTTTGCTGTCAAT | 109 | ATTGACAGCAAAGGCT | 110 | 16 | 3-10-3 | Mouse | 44 | 67 |
| 55 | CCCTATTTATTTGCAT | 111 | ATGCAAATAAATAGGG | 112 | 16 | 3-10-3 | Mouse | 31 | 62 |

| No. | Human NM_002181.3 start site | Human NM_002181.3 stop site | Mouse NM_10544.3 start site | Mouse NM_10544.3 stop site | Ren No. |
|---|---|---|---|---|---|
| 1 | 2001 | 2014 | 2405 | 2418 | Ren-1-1 |
| 2 | 194 | 207 | 603 | 616 | Ren-1-2 |
| 3 | 221 | 234 | 630 | 643 | Ren-1-3 |
| 4 | 311 | 326 | 720 | 735 | Ren-1-4 |
| 5 | 324 | 338 | 733 | 747 | Ren-1-5 |
| 6 | 998 | 1011 | 1407 | 1420 | Ren-1-6 |
| 7 | 1100 | 1113 | 1509 | 1522 | Ren-1-7 |
| 8 | 2018 | 2031 | 2422 | 2435 | Ren-1-8 |
| 9 | 530 | 545 | 939 | 954 | Ren-1-9 |
| 10 | 1256 | 1269 | 1665 | 1678 | Ren-1-10 |
| 11 | 576 | 591 | 985 | 1000 | Ren-1-11 |
| 12 | 598 | 611 | 1007 | 1020 | Ren-1-12 |
| 13 | 2053 | 2068 | 2452 | 2467 | Ren-1-13 |
| 14 | 743 | 756 | 1152 | 1165 | Ren-1-14 |
| 15 | 782 | 795 | 1191 | 1204 | Ren-1-15 |
| 16 | 822 | 837 | 1231 | 1246 | Ren-1-16 |

TABLE 1-continued

ASO sequences designed from the IHH gene

| | | | | | |
|---|---|---|---|---|---|
| 17 | 926 | 939 | 1335 | 1348 | Ren-1-17 |
| 18 | 1065 | 1080 | 1474 | 1489 | Ren-1-18 |
| 19 | 1118 | 1133 | 1527 | 1542 | Ren-1-19 |
| 20 | 1162 | 1175 | 1571 | 1584 | Ren-1-20 |
| 21 | 1209 | 1222 | 1618 | 1631 | Ren-1-21 |
| 22 | 1304 | 1319 | 1714 | 1729 | Ren-1-22 |
| 23 | | | 1027 | 1042 | Ren-1-23 |
| 24 | | | 788 | 801 | Ren-1-24 |
| 25 | | | 493 | 508 | Ren-1-25 |
| 26 | | | 511 | 524 | Ren-1-26 |
| 27 | | | 1211 | 1226 | Ren-1-27 |
| 28 | | | 656 | 671 | Ren-1-28 |
| 29 | | | 678 | 693 | Ren-1-29 |
| 30 | | | 1685 | 1700 | Ren-1-30 |
| 31 | | | 1656 | 1669 | Ren-1-31 |
| 32 | | | 1589 | 1604 | Ren-1-32 |
| 33 | | | 1494 | 1508 | Ren-1-33 |
| 34 | | | 1508 | 1494 | Ren-1-34 |
| 35 | | | 1436 | 1451 | Ren-1-35 |
| 36 | | | 1415 | 1429 | Ren-1-36 |
| 37 | | | 1354 | 1369 | Ren-1-37 |
| 38 | | | 1294 | 1309 | Ren-1-38 |
| 39 | | | 1114 | 1129 | Ren-1-39 |
| 40 | | | 1053 | 1068 | Ren-1-40 |
| 41 | | | 830 | 845 | Ren-1-41 |
| 42 | | | 984 | 996 | Ren-1-42 |
| 43 | | | 874 | 889 | Ren-1-43 |
| 44 | | | 813 | 827 | Ren-1-44 |
| 45 | | | 2179 | 2194 | Ren-1-45 |
| 46 | | | 2084 | 2099 | Ren-1-46 |
| 47 | | | 376 | 390 | Ren-1-47 |
| 48 | | | 345 | 359 | Ren-1-48 |
| 49 | | | 1372 | 1385 | Ren-1-49 |
| 50 | | | 1173 | 1188 | Ren-1-50 |
| 51 | | | 1553 | 1568 | Ren-1-51 |
| 52 | | | 1735 | 1748 | Ren-1-52 |
| 53 | | | 2145 | 2160 | Ren-1-53 |
| 54 | | | 2221 | 2236 | Ren-1-54 |
| 55 | | | 2375 | 2390 | Ren-1-55 |

All the sequences shown in the "Antisense strand" column in the table comprise phosphorothhioate (PS) bonds between nucleotides. Boldfaced nucleotides include LNA modification. For example, "3-8-3" shown in the "Motif" column indicates an antisense nucleic acid composed of 14-mer nucleic acid bases; 3 LNA modified nucleic acids, 8 unmodified nucleic acids, and 3 LNA modified nucleic acids (including PS modification between nucleotides). In the "Species specificity" column, "Human/mouse" indicates that an antisense nucleic acid is completely matched between a human and a mouse, and "Mouse" indicates that an antisense nucleic acid is completely matched with a mouse sequence but is not completely matched with a human sequence. The GC content was calculated with reference to the website (http://www.ngrl.co.jp/tools/0217oligocalc.htm). The Tm value of the LNA modified antisense nucleic acid was calculated with reference to the website (https://www.exiqon.com/ls/pages/exiqontmpredictiontool.aspx). Sequence information on the human and mouse coding regions was obtained from the NCBI website (https://www.ncbi.nlm.nih.gov/).

Figure 4:
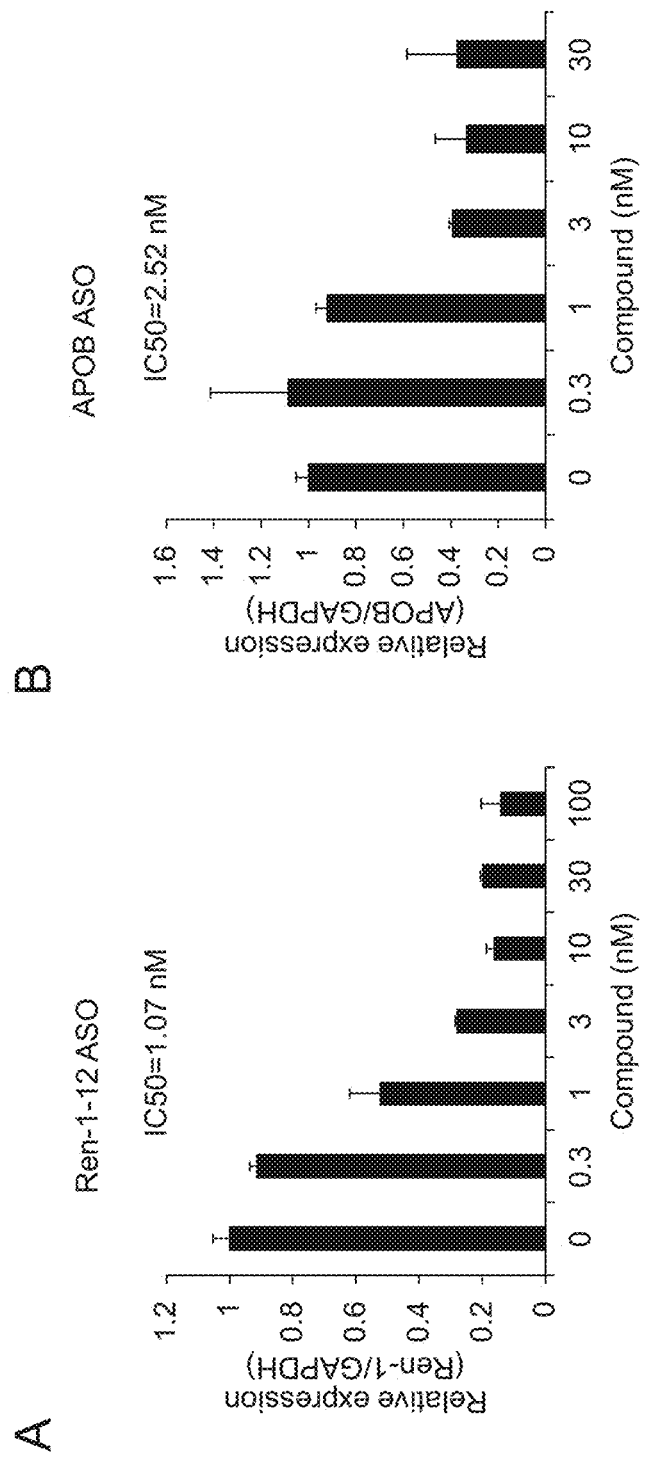
FIG. 4 shows a chart demonstrating calculation of IC50 values for knockdown activity of Ren-1-12 ASO.

[Example 2] Calculation of IC50 Value for Activity of Ren-1-12 ASO for IHH Gene Knockdown Concerning the Ren-1-12 found in the screening conducted in Example 1, the IC50 value for IHH gene knockdown activity was determined. Experiment was performed basically in the same manner as in Example 1. As a result, the IC50 value of Ren-1-12 for knockdown activity was determined to be 1.07 nM, and that for the control APOB ASO was determined to be 2.52 nM (FIG. 4 A, B). Effectiveness of the APOB sequence employed herein has been confirmed in vivo according to the literature information (Nat. Commun., Aug. 10, 2015; 6: 7969). In the in vitro knockdown test performed in the present experiment, IHH gene knockdown activity of Ren-1-12 ASO was apparently higher than that of the control APOB ASO. This indicates that effectiveness of the sequence can be expected in vivo.

[Example 3] IHH Gene Knockdown Activity of Toc-Ren-1-12 HDO in Liver

Figure 5:
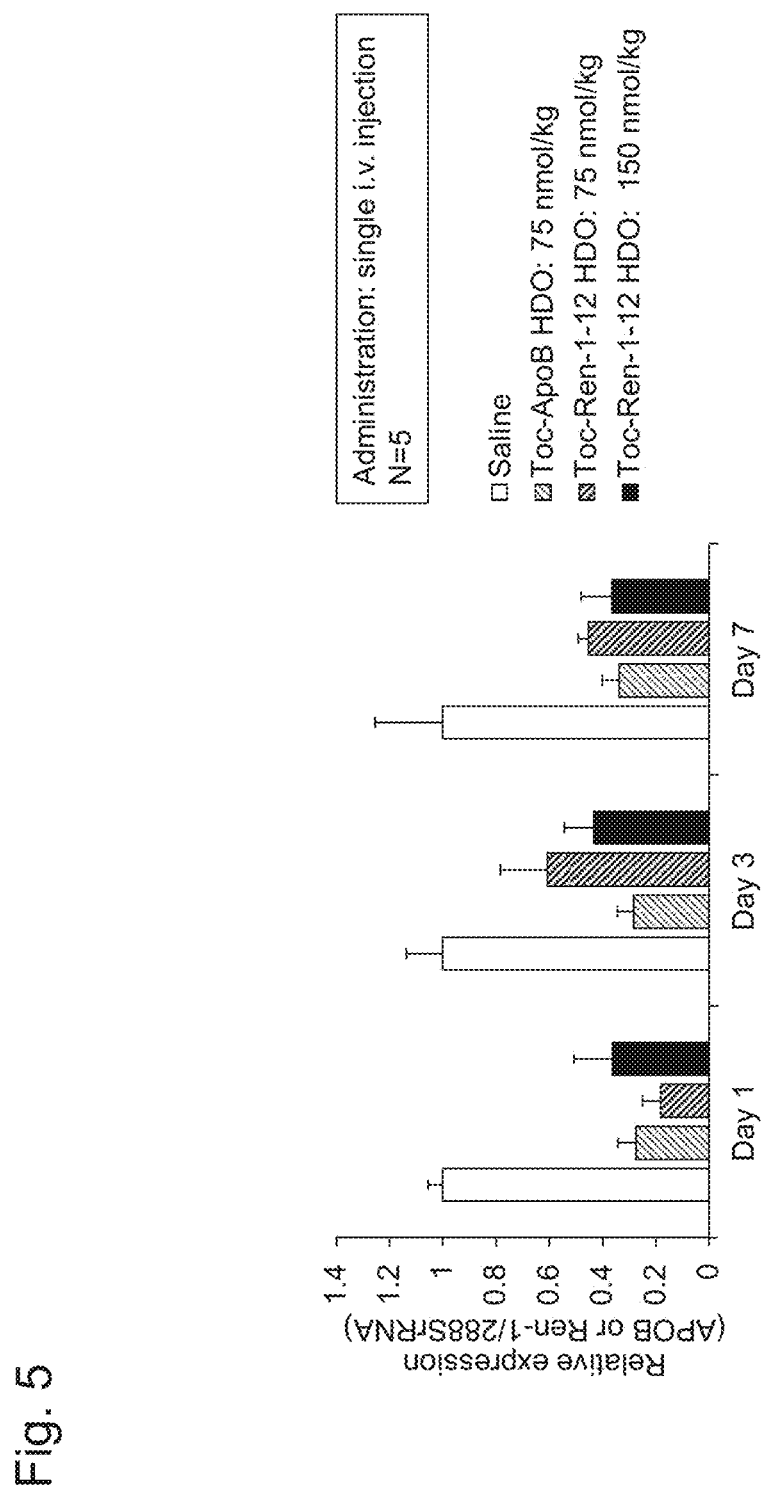
FIG. 5 shows a chart demonstrating IHH gene knockdown activity after single administration of Toc-Ren-1-12 HDO in mice.

An extent of knockdown activity exerted by Ren-1-12 ASO found in the screening conducted in Example 1 in the mouse liver was inspected. In the in vivo test, a heteroduplex structure having a sense strand complementary to the antisense strand was designed from Ren-1-12 ASO, and tocopherol (Toc) was added as a ligand to the sense strand to prepare HDO (Table 2). As a positive control, Toc-APOB HDO (Table 2) was used. Total RNA was extracted from the mouse liver using the RNeasy Mini Kit (QIAGEN). Thereafter, reverse transcription and quantitative PCR were carried out using the Rotor Gene Probe RT-PCR Kit (QIAGEN) and the Rotor-Gene Q (QIAGEN). In reverse transcription and quantitative PCR, mouse IHH and mouse 18SrRNA primers and probes selected from the TaqMan Gene Expression Assays (Thermo Fisher Scientific) were used, Ct values of mouse IHH and mouse 18SrRNA were measured, and mRNA expression levels were then calculated via relative quantification based on the $\Delta\Delta Ct$ method. The IHH gene knockdown effects were inspected 1, 3, and 7 days after single i.v. administration of Toc-Ren-1-12 HDO and Toc-APOB HDO in the manner described above. As a result, Toc-Ren-1-12 HDO was found to exert knockdown activity substantially equivalent to that of Toc-APOB HDO 7 days after administration (FIG. 5). Toc-APOB HDO has already been reported to be usable for in vivo drug efficacy evaluation (Nat. Commun., Aug. 10, 2015; 6: 7969). This indicates that Toc-Ren-1-12 HDO is a nucleic acid complex that may be sufficiently used for in vivo drug efficacy evaluation.

TABLE 2

Toc-Ren-1-12 HDO sequence and Toc-APOB HDO sequence

| Sequence | | Ligand | Sequence (5'→3') | SEQ ID NO |
|---|---|---|---|---|
| Toc-Ren-1-12 HDO | Sense strand | Toc | G(M)^G(M)^C(M)^CCACGUGC^A(M)^U(M)^U(M) | 113 |
| | Antisense strand | | A(L)^A(L)^T(L)^g^c^a^c^g^t^g^g^G(L)^5(L)^5(L) | 114 |
| Toc-APOB HDO | Sense strand | Toc | U(M)^G(M)^A(M)^AUACCAAU^G(M)^C(M) | 115 |
| | Antisense strand | | G(L)^5(L)^a^t^t^g^g^t^a^t^T(L)^5(L)^A(L) | 116 | n: DNA;
N: RNA;
N(L): LNA modification [A(L), T(L), G(L), mC: 5(L)];
^: phosphorothioate modification;
N(M): 2'-O-methyl modified RNA [A(M),G(M),C(M),U(M)]

[Example 4] Secondary Screening

Figure 6:
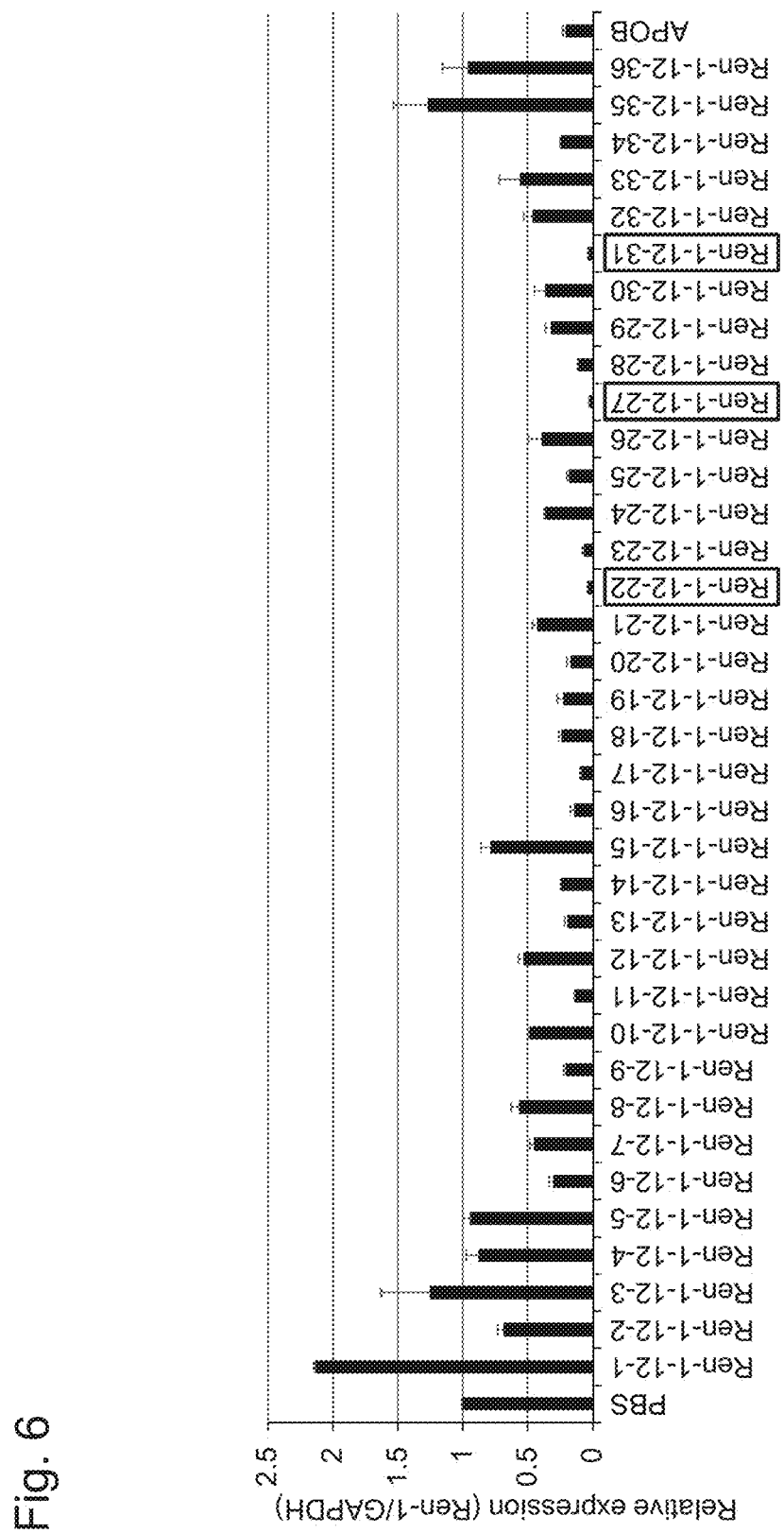
FIG. 6 shows a chart demonstrating secondary screening of sequences in the vicinity of Ren-1-12.

On the basis of Ren-1-12 found in the screening conducted in Example 1, additional 36 ASOs were designed. While the Ren-1-12 sense strand sequence comprises nucleotides 598 to 611 in the nucleotide sequence as shown in SEQ ID NO: 1 (14 nucleotides), the sequences of the 36 ASO sequences were each designed to start from a nucleotide between nucleotides 603 and 596 in the nucleotide sequence as shown in SEQ ID NO: 1 and has 13 to 20 nucleotide length. The results are shown in Table 3. FIG. 6 shows the results of IHH gene knockdown screening of the 36 sequences (Ren-1-12-1 to Ren-1-12-36) performed in the same manner as in Example 1. The results of secondary screening demonstrate that 3 sequences; i.e., Ren-1-12-22, Ren-1-12-27, and Ren-1-12-31, have particularly high knockdown activity.

TABLE 3

36 ASO sequences designed from the region in the vicinity of Ren-1-12 selected via primary screening

| No. | Sense strand | SEQ ID NO | Antisense strand | SEQ ID NO | Length | Motif | Species specificity | GC content (%) | Tm (° C.) |
|---|---|---|---|---|---|---|---|---|---|
| 1 | ACGTGCATTGCTC | 117 | GAGCAATGCACGT | 118 | 13 | 2-8-3 | Human/mouse | 54 | 64 |
| 2 | CACGTGCATTGCT | 119 | AGCAATGCACGTG | 120 | 13 | 2-8-3 | Human/mouse | 54 | 66 |
| 3 | CCACGTGCATTGC | 121 | GCAATGCACGTGG | 122 | 13 | 2-8-3 | Human/mouse | 62 | 70 |
| 4 | CCCACGTGCATTG | 123 | CAATGCACGTGGG | 124 | 13 | 2-8-3 | Human/mouse | 62 | 71 |
| 5 | GCCCACGTGCATT | 125 | AATGCACGTGGGC | 126 | 13 | 2-8-3 | Human/mouse | 62 | 66 |
| 6 | GGCCCACGTGCAT | 127 | ATGCACGTGGGCC | 128 | 13 | 2-8-3 | Human/mouse | 69 | 71 |
| 7 | AGGCCCACGTGCA | 129 | TGCACGTGGGCCT | 130 | 13 | 2-8-3 | Human/mouse | 69 | 72 |
| 8 | AAGGCCCACGTGC | 131 | GCACGTGGGCCTT | 132 | 13 | 2-8-3 | Human/mouse | 69 | 71 |
| 9 | CACGTGCATTGCTC | 133 | GAGCAATGCACGTG | 134 | 14 | 3-8-3 | Human/mouse | 57 | 70 |
| 10 | CCACGTGCATTGCT | 135 | AGCAATGCACGTGG | 136 | 14 | 3-8-3 | Human/mouse | 57 | 74 |
| 11 | CCCACGTGCATTGC | 137 | GCAATGCACGTGGG | 138 | 14 | 3-8-3 | Human/mouse | 64 | 75 |
| 12 | GCCCACGTGCATTG | 139 | CAATGCACGTGGGC | 140 | 14 | 3-8-3 | Human/mouse | 64 | 72 |
| 13 | GGCCCACGTGCATT | 141 | AATGCACGTGGGCC | 142 | 14 | 3-8-3 | Human/mouse | 56 | 72 |
| 14 | AGGCCCACGTGCAT | 143 | ATGCACGTGGGCCT | 144 | 14 | 3-8-3 | Human/mouse | 64 | 74 |
| 15 | AAGGCCCACGTGCA | 145 | TGCACGTGGGCCTT | 146 | 14 | 3-8-3 | Human/mouse | 64 | 76 |
| 16 | CCACGTGCATTGCTC | 147 | GAGCAATGCACGTGG | 148 | 15 | 3-9-3 | Human/mouse | 60 | 76 |
| 17 | CCCACGTGCATTGCT | 149 | AGCAATGCACGTGGG | 150 | 15 | 3-9-3 | Human/mouse | 60 | 77 |
| 18 | GCCCACGTGCATTGC | 151 | GCAATGCACGTGGGC | 152 | 15 | 3-9-3 | Human/mouse | 67 | 75 |
| 19 | GGCCCACGTGCATTG | 153 | CAATGCACGTGGGCC | 154 | 15 | 3-9-3 | Human/mouse | 67 | 73 |
| 20 | AGGCCCACGTGCATT | 155 | AATGCACGTGGGCCT | 156 | 15 | 3-9-3 | Human/mouse | 60 | 73 |
| 21 | AAGGCCCACGTGCAT | 157 | ATGCACGTGGGCCTT | 158 | 15 | 3-9-3 | Human/mouse | 60 | 74 |
| 22 | CCCACGTGCATTGCTC | 159 | GAGCAATGCACGTGGG | 160 | 16 | 3-10-3 | Human/mouse | 63 | 78 |
| 23 | GCCCACGTGCATTGCT | 161 | AGCAATGCACGTGGGC | 162 | 16 | 3-10-3 | Human/mouse | 63 | 76 |
| 24 | GGCCCACGTGCATTGC | 163 | GCAATGCACGTGGGCC | 164 | 16 | 30-10-3 | Human/mouse | 69 | 76 |

TABLE 3-continued

36 ASO sequences designed from the region in the vicinity of Ren-1-12 selected via primary screening

| No. | Seq 1 | | Seq 2 | | | | | | |
|---|---|---|---|---|---|---|---|---|---|
| 25 | AGGCCCACGTGCATTG | 165 | CAATGCACGTGGGCCT | 166 | 16 | 3-10-3 | Human/mouse | 63 | 75 |
| 26 | AAGGCCCACGTGCATT | 167 | AATGCACGTGGGCTT | 168 | 16 | 3-10-3 | Human/mouse | 56 | 73 |
| 27 | GCCCACGTGCATTGCTC | 169 | GAGCAATGCACGTGGGC | 170 | 17 | 3-11-3 | Human/mouse | 65 | 78 |
| 28 | GGCCCACGTGCATTGCT | 171 | AGCAATGCACGTGGCC | 172 | 17 | 3-11-3 | Human/mouse | 65 | 78 |
| 29 | AGGCCCACGTGCATTGC | 173 | GCAATGCACGTGGGCCT | 174 | 17 | 3-11-3 | Human/mouse | 65 | 77 |
| 30 | AAGGCCCACGTGCATTG | 175 | CAATGCACGTGGGCTT | 176 | 17 | 3-11-3 | Human/mouse | 59 | 74 |
| 31 | GGCCCACGTGCATTGCTC | 177 | GAGCAATGCACGTGGCC | 178 | 18 | 3-12-3 | Human/mouse | 67 | 78 |
| 32 | AGGCCCACGTGCATTGCT | 179 | AGCAATGCACGTGGGCCT | 180 | 18 | 3-12-3 | Human/mouse | 61 | 78 |
| 33 | AAGGCCCACGTGCATTGC | 181 | GCAATGCACGTGGGCTT | 182 | 18 | 3-12-3 | Human/mouse | 61 | 77 |
| 34 | AGGCCCACGTGCATTGCTC | 183 | GAGCAATGCACGTGGGCCT | 184 | 19 | 3-13-3 | Human/mouse | 63 | 79 |
| 35 | AAGGCCCACGTGCATTGCT | 185 | AGCAATGCACGTGGGCTT | 186 | 19 | 3-13-3 | Human/mouse | 58 | 77 |
| 36 | AAGGCCCACGTGCATTGCTC | 187 | GAGCAATGCACGTGGGCCT | 188 | 20 | 3-14-3 | Human/mouse | 60 | 78 |

| No. | Human NM_002181.3 start site | Human NM_002181.3 stop site | Mouse NM_10544.3 start site | Mouse NM_10544.3 stop site | Ren No. |
|---|---|---|---|---|---|
| 1 | 603 | 615 | 1012 | 1024 | Ren-1-12-1 |
| 2 | 602 | 614 | 1011 | 1023 | Ren-1-12-2 |
| 3 | 601 | 613 | 1010 | 1022 | Ren-1-12-3 |
| 4 | 600 | 612 | 1009 | 1021 | Ren-1-12-4 |
| 5 | 599 | 611 | 1008 | 1020 | Ren-1-12-5 |
| 6 | 598 | 610 | 1007 | 1019 | Ren-1-12-6 |
| 7 | 597 | 609 | 1006 | 1018 | Ren-1-12-7 |
| 8 | 596 | 608 | 1005 | 1017 | Ren-1-12-8 |
| 9 | 602 | 615 | 1011 | 1024 | Ren-1-12-9 |
| 10 | 601 | 614 | 1010 | 1023 | Ren-1-12-10 |
| 11 | 600 | 613 | 1009 | 1022 | Ren-1-12-11 |
| 12 | 599 | 612 | 1008 | 1021 | Ren-1-12-12 |
| 13 | 598 | 611 | 1007 | 1020 | Ren-1-12-13 |
| 14 | 597 | 610 | 1006 | 1019 | Ren-1-12-14 |

TABLE 3-continued

36 ASO sequences designed from the region in the vicinity of Ren-1-12 selected via primary screening

| | | | | | |
|---|---|---|---|---|---|
| 15 | 596 | 609 | 1005 | 1018 | Ren-1-12-15 |
| 16 | 601 | 615 | 1010 | 1024 | Ren-1-12-16 |
| 17 | 600 | 614 | 1009 | 1023 | Ren-1-12-17 |
| 18 | 599 | 613 | 1008 | 1022 | Ren-1-12-18 |
| 19 | 598 | 612 | 1007 | 1021 | Ren-1-12-19 |
| 20 | 597 | 611 | 1006 | 1020 | Ren-1-12-20 |
| 21 | 596 | 610 | 1005 | 1019 | Ren-1-12-21 |
| 22 | 600 | 615 | 1009 | 1024 | Ren-1-12-22 |
| 23 | 599 | 614 | 1008 | 1023 | Ren-1-12-23 |
| 24 | 598 | 613 | 1007 | 1022 | Ren-1-12-24 |
| 25 | 597 | 612 | 1006 | 1021 | Ren-1-12-25 |
| 26 | 596 | 611 | 1005 | 1020 | Ren-1-12-26 |
| 27 | 599 | 615 | 1008 | 1024 | Ren-1-12-27 |
| 28 | 598 | 614 | 1007 | 1023 | Ren-1-12-28 |
| 29 | 597 | 613 | 1006 | 1022 | Ren-1-12-29 |
| 30 | 596 | 612 | 1005 | 1021 | Ren-1-12-30 |
| 31 | 598 | 615 | 1007 | 1024 | Ren-1-12-31 |
| 32 | 597 | 614 | 1006 | 1023 | Ren-1-12-32 |
| 33 | 596 | 613 | 1005 | 1022 | Ren-1-12-33 |
| 34 | 597 | 615 | 1006 | 1024 | Ren-1-12-34 |
| 35 | 596 | 614 | 1005 | 1023 | Ren-1-12-35 |
| 36 | 596 | 615 | 1005 | 1024 | Ren-1-12-36 |

All the sequences shown in the "Antisense strand" column in the table comprise phosphorothhioate (PS) bonds between nucleotides. Boldfaced nucleotides include LNA modification. For example, "3-8-3" shown in the "Motif" column indicates an antisense nucleic acid composed of 14-mer nucleic acid bases; 3 LNA modified nucleic acids, 8 unmodified nucleic acids, and 3 LNA modified nucleic acids (including PS modification between nucleotides). In the "Species specificity" column, "Human/mouse" indicates that an antisense nucleic acid is completely matched between a human and a mouse, and "Mouse" indicates that an antisense nucleic acid is completely matched with a mouse sequence but is not completely matched with a human sequence. The GC content was calculated with reference to the website (http://www.ngrl.co.jp/tools/0217oligocalc.htm). The Tm value of the LNA modified antisense nucleic acid was calculated with reference to the website (https://www.exiqon.com/ls/pages/exiqontmpredictiontool.aspx). Sequence information on the human and mouse coding regions was obtained from the NCBI website (https://www.ncbi.nlm.nih.gov/).

Figure 7:
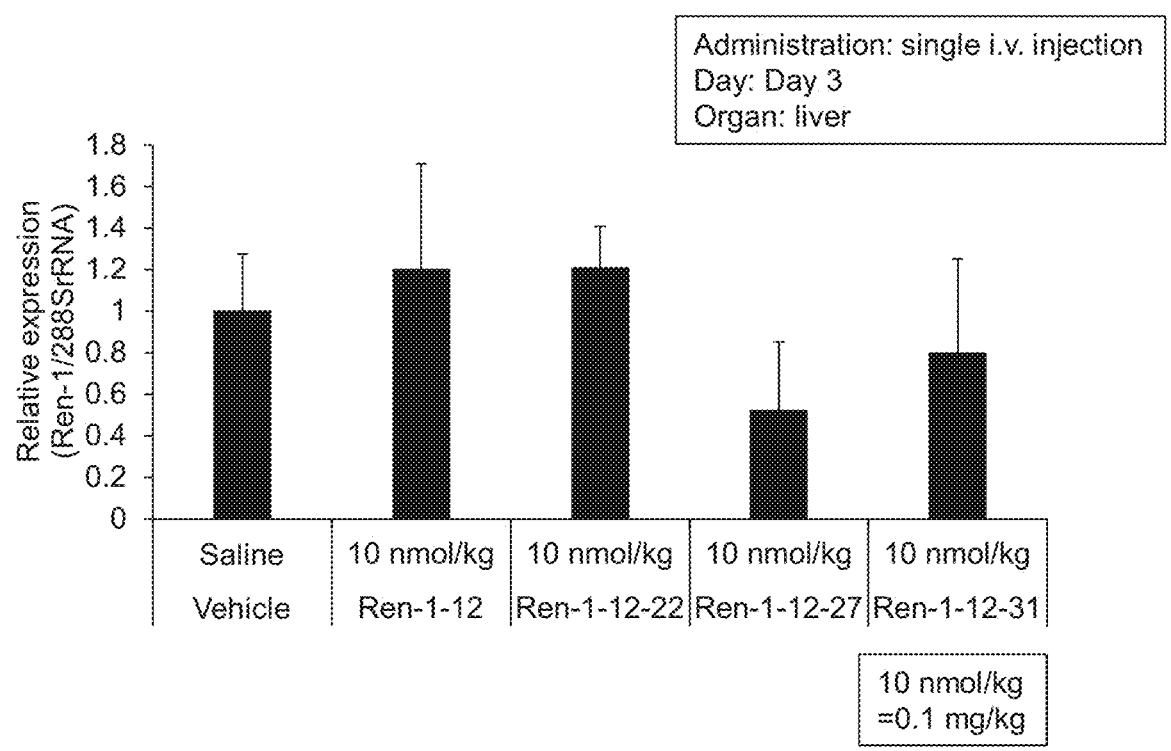
FIG. 7 shows a chart demonstrating IHH gene knockdown activity in the liver upon single i.v. administration of Toc-Ren-1-12-22, -27, and -31 HODs each to normal mice.
Figure 9:
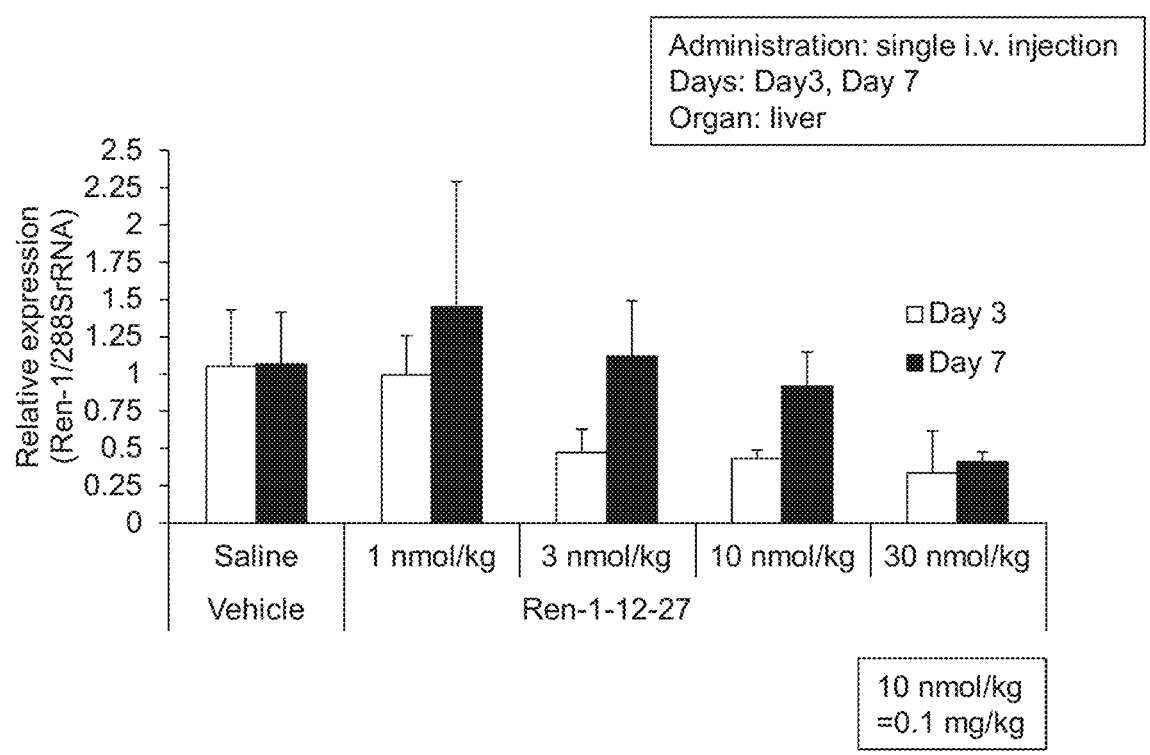
FIG. 9 shows a chart demonstrating changes in IHH gene knockdown activity in the liver upon single i.v. administration of Toc-Ren-1-12-27 HDO to normal mice with the elapse of time on Day 3 and Day 7.

[Example 5] Comparison of IHH Gene Knockdown Activity in Liver Upon Single i.v. Administration of HDOSs; Toc-Ren-1-12-22, -27, and -31, to Normal Mice In order to determine the sequence that can be subjected to drug efficacy evaluation in NASH pathological models from among the 3 sequences selected in Example 4; i.e., Ren-1-12-22, -27, and -31, Toc-Ren-1-12-22, -27, and -31 HDOs (Table 4) were intravenously administered once at a dose of 10 nmol/kg to normal mice, and knockdown activity was compared 3 days after administration. As a result, Ren-1-12-27 was found to exhibit the highest knockdown efficiency (48%) (FIG. 7). On the basis of the results above, Ren-1-12-27 was employed for drug efficacy evaluation in NASH pathological models.

of approximately 60% to 70% at a dose of 30 nmol/kg from 3 days to 7 days after administration as shown in FIG. 9. In the case of evaluation in NASH pathological models, accordingly, Ren-1-12-27 was administered at a dose of 30 nmol/kg once a week.

[Example 8] Calculation of IC50 Value of Ren-1 ASO for IHH Gene Knockdown Activity in Mouse Hepa 1-6 Cells Among the ASOs found to exhibit high knockdown activity in Example 4, the IC50 values of the top 19 specimens were calculated. The results are shown in Table 5. In the secondary screening performed in Example 4, Ren-1-12-22, 27, and 31 exhibited particularly high knockdown activity. When the IC50 values were actually calculated, Ren-1-12-34 was found to exhibit the highest IC50 value.

TABLE 4

Toc-Ren-1-12 HDO sequence and Toc-APOB HDO sequence

| Sequence | | Ligand | Sequence (5'→3') | SEQ ID NO |
|---|---|---|---|---|
| Toc-Ren-1-12-22 HDO | Sense strand | Toc | C(M)^C(M)^C(M)^ACGUGCAUUG^C(M)^U(M)^C(M) | 189 |
| | Antisense strand | | G(L)^A(L)^G(L)^c^a^a^t^g^c^a^c^g^t^G(L)^G(L)^G(L) | 190 |
| Toc-Ren-1-12-27 HDO | Sense strand | Toc | G(M)^C(M)^C(M)^CACGUGCAUUG^C(M)^U(M)^C(M) | 191 |
| | Antisense strand | | G(L)^A(L)^G(L)^c^a^a^t^g^c^a^c^g^t^g^G(L)^G(L)^5(L) | 192 |
| Toc-Ren-1-12-31 HDO | Sense strand | Toc | G(M)^G(M)^C(M)^CCACGUGCAUUG^C(M)^U(M)^C(M) | 193 |
| | Antisense strand | | G(L)^A(L)^G(L)^c^a^a^t^g^c^a^c^g^t^g^g^G(L)^5(L)^5(L) | 194 | n: DNA;
N: RNA;
N(L): LNA modification [A(L), T(L), G(L),
mC: 5(L)];
^: phosphorothioate modification;
N(M): 2'-O-methyl modified RNA [A(M),G(M),C(M),U(M)]

Figure 8:
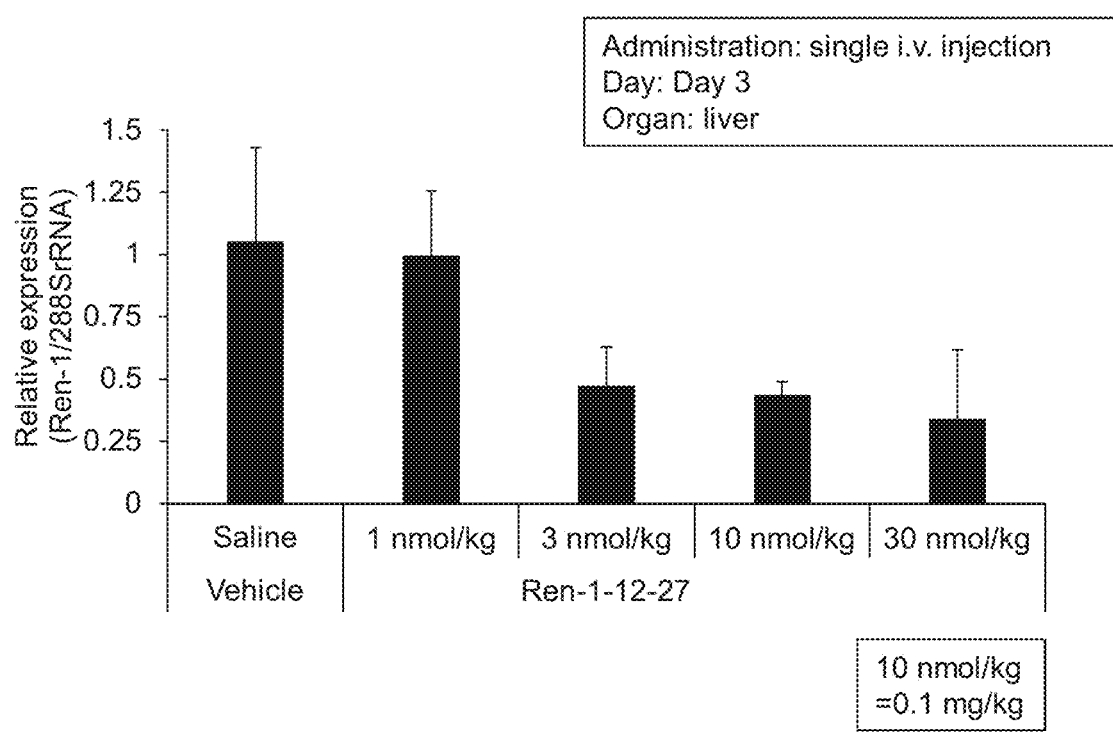
FIG. 8 shows a chart demonstrating dose-dependency of IHH gene knockdown activity in the liver upon single i.v. administration of Toc-Ren-1-12-27 HDO to normal mice.

[Example 6] Dose Dependency of IHH Gene Knockdown Activity in Liver Upon Single i.v. Administration of Toc-Ren-1-12-27 HDO to Normal Mice Toc-Ren-1-12-27 HDO that was found to exhibit the highest knockdown activity in Example 5 was administered intravenously once at a dose of 1, 3, 10, and 30 nmol/kg, and IHH gene knockdown activity was inspected 3 days after administration. As a result, Ren-1-12-27 was found to exhibit dose-dependent knockdown activity as shown in FIG. 8 (55% inhibition at 3 nmol/kg, 57% inhibition at 10 nmol/kg, and 72% inhibition at 30 nmol/kg).

[Example 7] Comparison of Changes in IHH Gene Knockdown Activity with the Elapse of Time in Liver Upon Single i.v. Administration of Toc-Ren-1-12-27 HDO to Normal Mice Between Day 3 and Day 7

In Example 5, dose dependency of knockdown activity of Toc-Ren-1-12-27 HDO in the liver was evaluated 3 days after administration, and IHH gene knockdown activity was further inspected 7 days after administration. As a result, Ren-1-12-27 was found to maintain knockdown efficiency

TABLE 5

IC50 value of ASO exhibiting strong IHH gene knockdown activity in mouse Hepa 1-6 cells

| Ren No. | IC50 (nM) |
|---|---|
| Ren-1-12-34 | 0.46 |
| Ren-1-12-27 | 0.58 |
| Ren-1-12-22 | 0.59 |
| Ren-1-12-31 | 0.74 |
| Ren-1-12-17 | 0.77 |
| Ren-1-12-20 | 0.78 |
| Ren-1-12-11 | 0.81 |
| Ren-1-12-13 | 0.94 |
| Ren-1-12-14 | 0.98 |
| Ren-1-12-16 | 1.1 |
| Ren-1-12-25 | 1.14 |
| Ren-1-12-18 | 1.36 |
| Ren-1-12-23 | 1.44 |
| Ren-1-12-6 | 1.46 |
| Ren-1-12-19 | 1.66 |
| Ren-1-12-29 | 1.73 |
| Ren-1-12-28 | 2.28 |
| Ren-1-12-30 | 2.79 |
| Ren-1-12-24 | 3.91 |

[Example 9] Influence of Toc-Ren-1-12-27 HDO on IHH Gene Expression in NASH Pathological Mouse Models Prepared with Methionine-Choline-Deficient Diet (MCD Diet)

Six-week-old female C57BL/6J mice were purchased from Charles River Laboratories Japan, Inc. A methionine-choline-deficient diet (an MCD diet) and a control diet (a regular diet) were purchased from Research Diets, Inc. At the outset, C57BL/6J mice were divided into a vehicle (physiological saline) administration group (the V group) and a Toc-Ren-1-12-27 HDO (30 nmol (0.3 mg)/kg) administration group (the I (IHH) group), and the V group and the I (IHH) group were each divided into an MCD diet group (the M group) and a normal diet group (the N group). Specifically, mice subjected to the experiment were divided into the following 4 groups: (1) the vehicle administration/normal diet group (the VN group); (2) the vehicle administration/MCD diet group (the VM group); (3) the Toc-Ren-1-12-27 HDO (30 nmol (0.3 mg)/kg) administration/normal diet group (the IN group); and (4) the Toc-Ren-1-12-27 HDO (30 nmol (0.3 mg)/kg) administration/MCD diet group (the IM group). Feeding was initiated 1 week before the first administration (Day 0), and administration of vehicles and Toc-Ren-1-12-27 HDO was initiated on Day 0 and performed once a week for 5 weeks. Sampling was performed once a week, mouse body weight was measured, blood was collected from the heart in a heparin-containing tube, a liver tissue sample was obtained, and the liver weight was then measured. Activity of the enzyme escaped from the liver in the blood (ALT), the blood triglyceride level, and the blood cholesterol level in the serum samples were measured with the use of transaminase CII-Test Wako (FUJIFILM Wako Pure Chemical Corporation), LabAssay™ triglyceride (FUJIFILM Wako Pure Chemical Corporation), and LabAssay™ cholesterol (FUJIFILM Wako Pure Chemical Corporation). Expression levels of various liver genes (i.e., IHH, COL1A1, CTGF, ADGRE1, ACTA2, TGFB1, CCL2, TIMP1, and TNF) were measured in the manner described below. Total RNA was extracted from the mouse liver using the ReliaPrep™ RNA Tissue Miniprep System (Promega). Reverse transcription was performed using the PrimeScript™ RT Master Mix (TaKaRa Bio). Quantitative PCR was performed using the Luna Universal qPCR Master Mix (NEB) and StepOnePlus-01 (Thermo Fisher Scientific). Gene primers and probes were selected from the TaqMan Gene Expression Assay reagents designed for each gene (Thermo Fisher Scientific), Ct values of mouse genes and mouse 18SrRNA were measured, and the mRNA expression levels were calculated by the relative quantification method based on the $\Delta\Delta Ct$ method. Statistic processing was performed via 3-way analysis of variance (3-way ANOVA), and a risk of less than 5% was designated significant.

Figure 10:
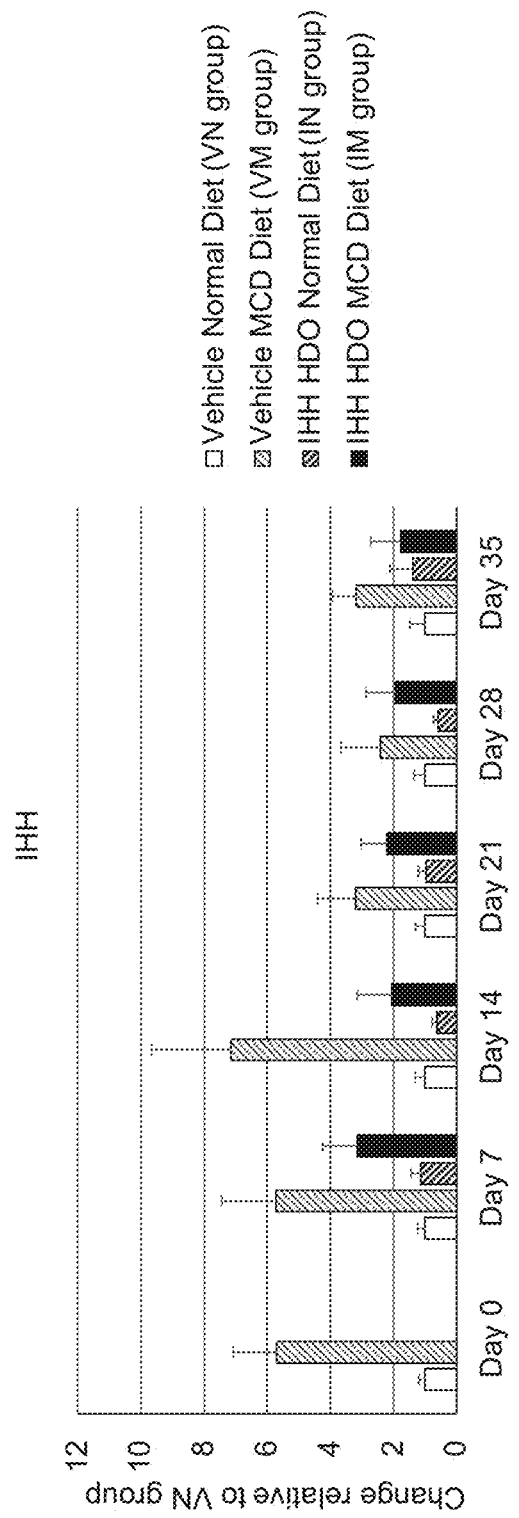
FIG. 10 shows the influence of Toc-Ren-1-12-27 HDO on IHH gene expression in NASH pathological mouse models prepared by feeding a methionine-choline-deficient (MCD) diet (an MCD diet).

To the NASH pathological mouse models prepared by feeding an MCD diet, a vehicle or Toc-Ren-1-12-27 HDO was administered once a week for 5 weeks, and the influence of administration on IHH gene expression was inspected. As a result, as shown in FIG. 10, IHH gene expression levels were significantly increased on Days 0, 7, and 14, and the IHH gene expression levels observed in the IM group were significantly higher than those in the VM group.

Figure 11:
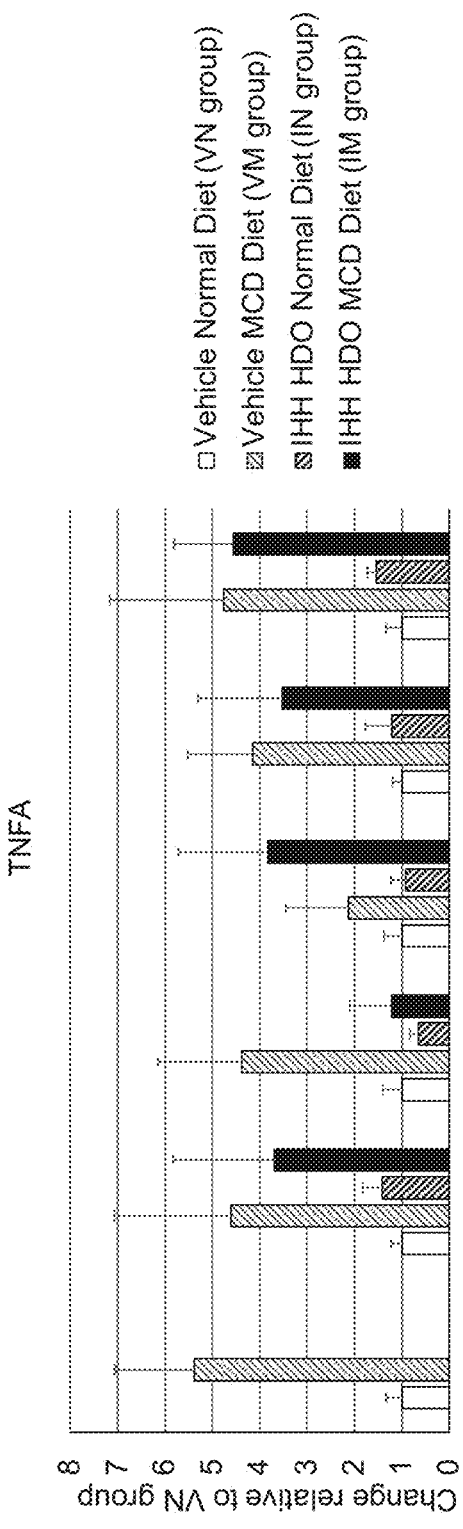
FIG. 11 shows the influence of Toc-Ren-1-12-27 HDO on inflammatory marker (A: TNFA; and B: CCL2) gene expression in NASH pathological mouse models prepared by feeding an MCD diet.
Figure 11:
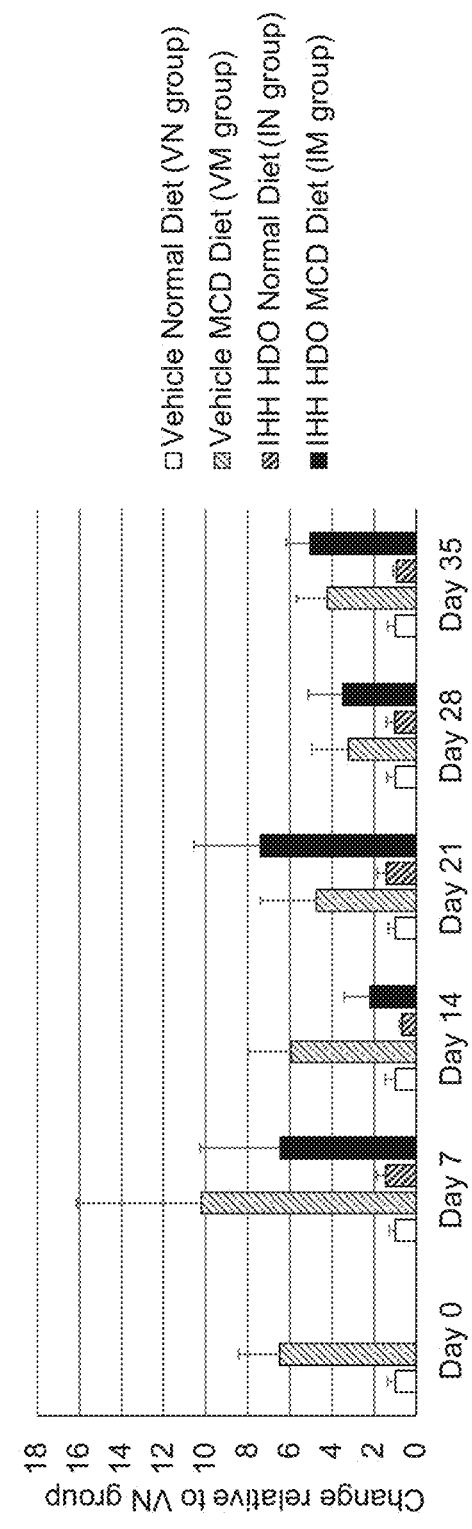

[Example 10] Influence of Toc-Ren-1-12-27 HDO on Inflammatory Marker (TNFA and CCL2) Gene Expression in NASH Pathological Mouse Models Prepared by Feeding MCD Diet To the NASH pathological mouse models prepared by feeding an MCD diet, a vehicle or Toc-Ren-1-12-27 HDO was administered once a week for 5 weeks, and the influence of administration on inflammatory marker (TNFA and CCL2) gene expression in the mice was inspected. As a result, as shown in FIG. 11 A and FIG. 11 B, TNFA and CCL2 gene expression levels observed in the VM group were significantly higher than those in the VN group, and the TNFA and CCL2 gene expression levels observed in the IM group on Day 14 were significantly lower than those in the VM group.

Figure 12:
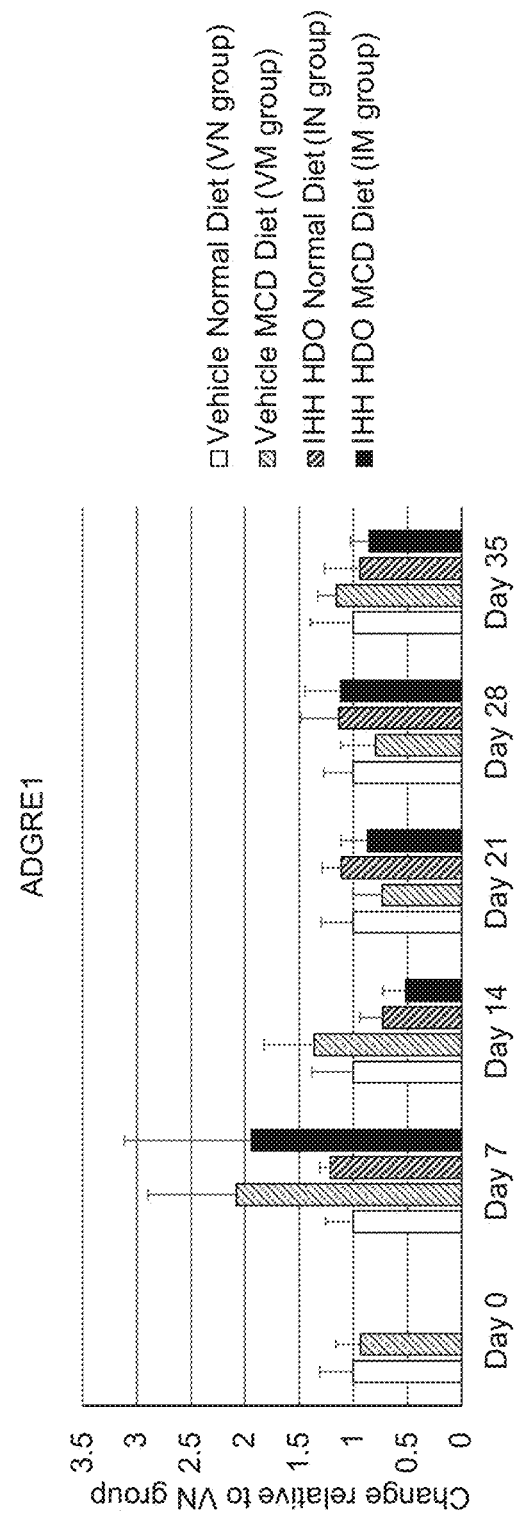
FIG. 12 shows the influence of Toc-Ren-1-12-27 HDO on macrophage marker (ADGRE1) gene expression in NASH pathological mouse models prepared by feeding an MCD diet.

[Example 11] Influence of Toc-Ren-1-12-27 HDO on Macrophage Marker (ADGRE1) Gene Expression in NASH Pathological Mouse Models Prepared by Feeding MCD Diet To the NASH pathological mouse models prepared by feeding an MCD diet, a vehicle or Toc-Ren-1-12-27 HDO was administered once a week for 5 weeks, and the influence of administration on ADGRE1 gene expression in the mice was inspected. As a result, as shown in FIG. 12, the ADGRE1 expression level was observed to decrease on Day 14.

Figures 1, 13:
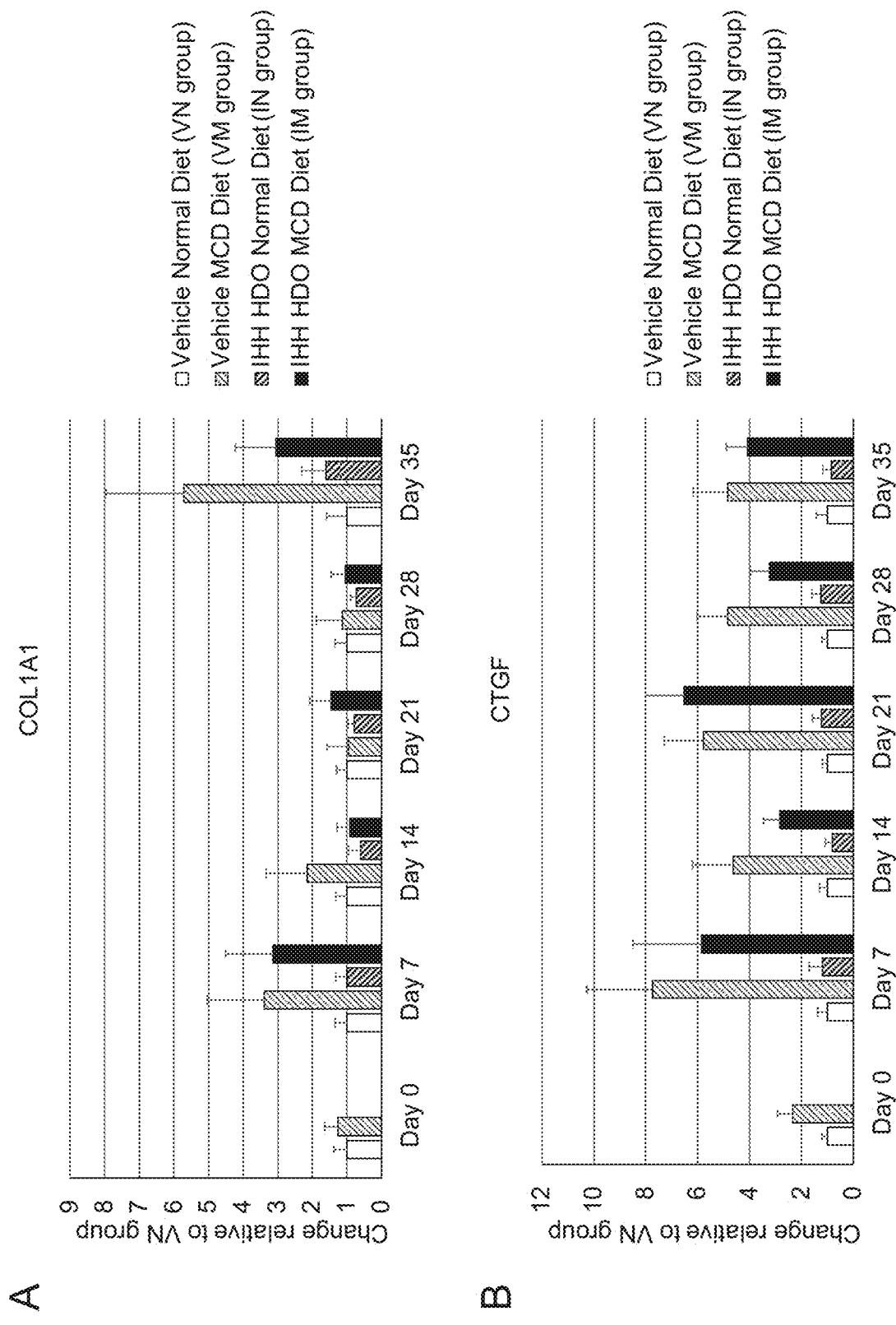
Figures 3, 13:
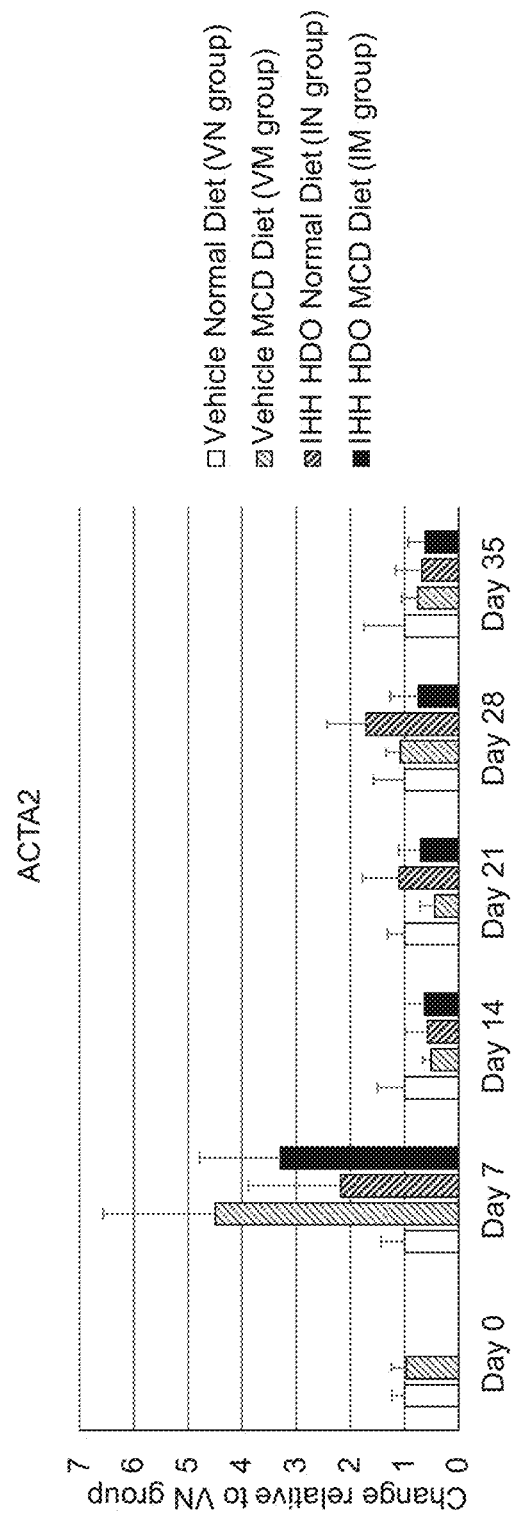

[Example 12] Influence of Toc-Ren-1-12-27 HDO on Fibrosis Marker (COL1A1, CTGF, TGFB1, TIMP, and ACTA2) Gene Expression in NASH Pathological Mouse Models Prepared by Feeding MCD Diet To the NASH pathological mouse models prepared by feeding an MCD diet, a vehicle or Toc-Ren-1-12-27 HDO was administered once a week for 5 weeks, and the influence of administration on fibrosis marker (COL1A1, CTGF, TGFB1, TIMP, and ACTA2) gene expression in the mice was inspected. As a result, as shown in FIG. 13-1A, the COL1A1 gene expression level was significantly increased on Day 7, and the COL1A1 gene expression level was significantly decreased on Day 35 (P<0.05). While CTGF gene expression was observed to have decreased on Day 14 and Day 28 as shown in FIG. 13-1B, an extent of decrease was not significant. While TGFB1 gene expression was observed to have decreased on Day 14 and Day 35 as shown in FIG. 13-2A, an extent of decrease was not significant. As shown in FIG. 13-2B and FIG. 13-3, TIMP and ACTA2 expression levels were not decreased throughout the observation period.

Figure 14:
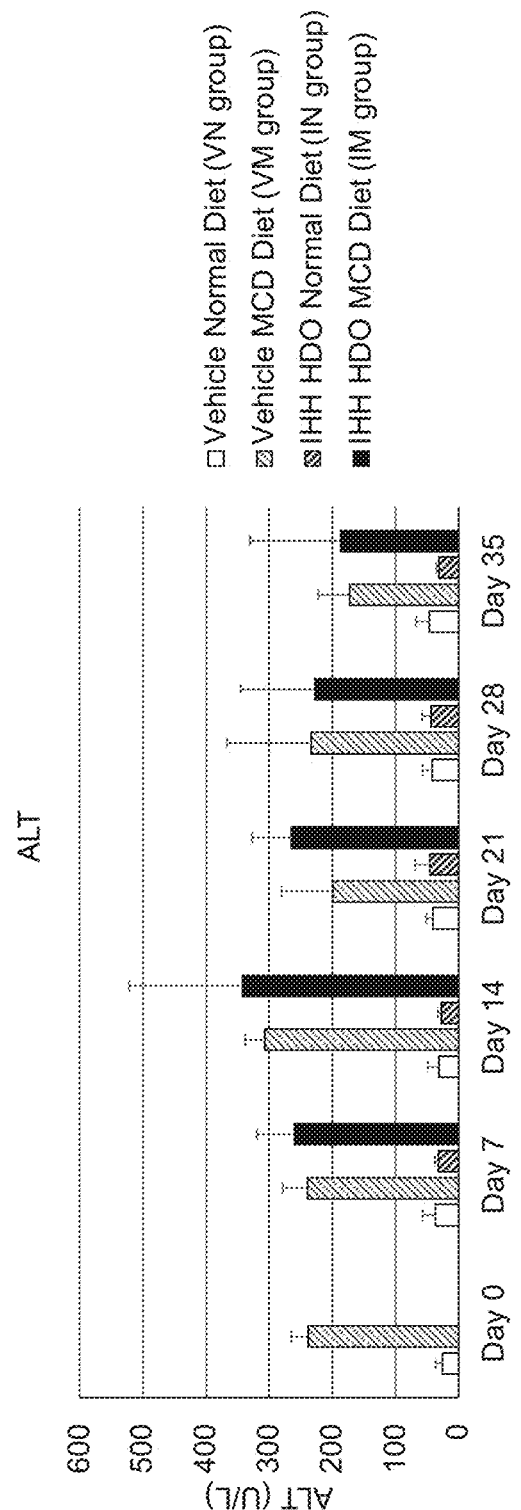
FIG. 14 shows the influence of Toc-Ren-1-12-27 HDO on enzyme escaped from the liver in the blood (ALT) activity in NASH pathological mouse models prepared by feeding an MCD diet.

[Example 13] Influence of Toc-Ren-1-12-27 HDO on Enzyme Escaped from the Liver in the Blood (ALT) Activity in NASH Pathological Mouse Models Prepared by Feeding MCD Diet To the NASH pathological mouse models prepared by feeding an MCD diet, a vehicle or Toc-Ren-1-12-27 HDO was administered once a week for 5 weeks, and the influence of administration on enzyme escaped from the liver in the blood (ALT) activity in the mice was inspected. As a result, as shown in FIG. 14, ALT activity observed in the VM group was significantly higher than that observed in the VN group (P<0.0001).

Figure 15:
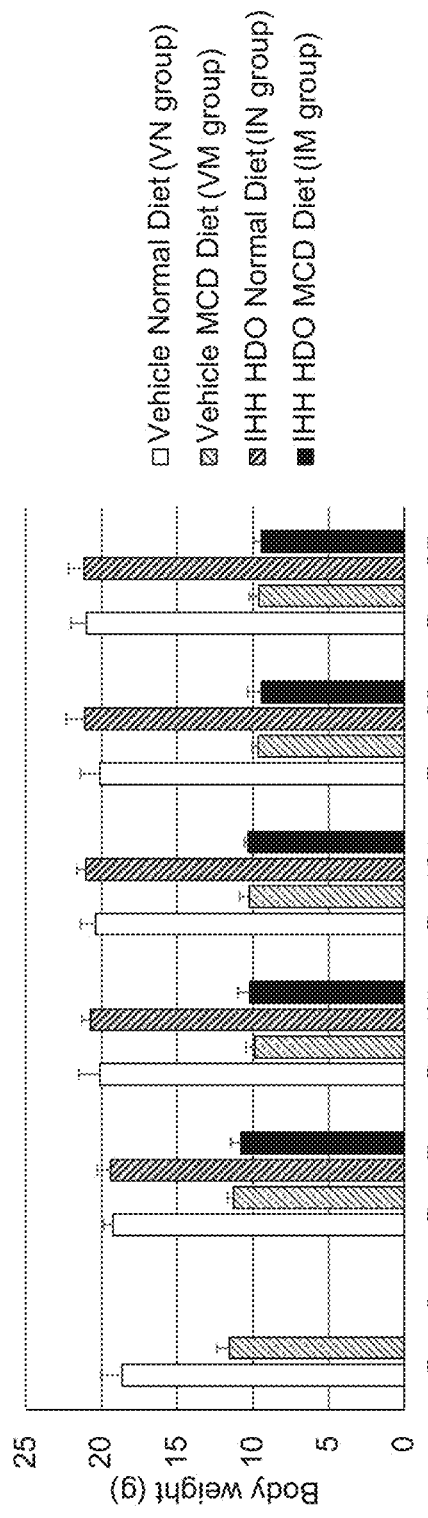
FIG. 15 shows the influence of Toc-Ren-1-12-27 HDO on (A) the body weight and (B) the liver weight in NASH pathological mouse models prepared by feeding an MCD diet.
Figure 15:
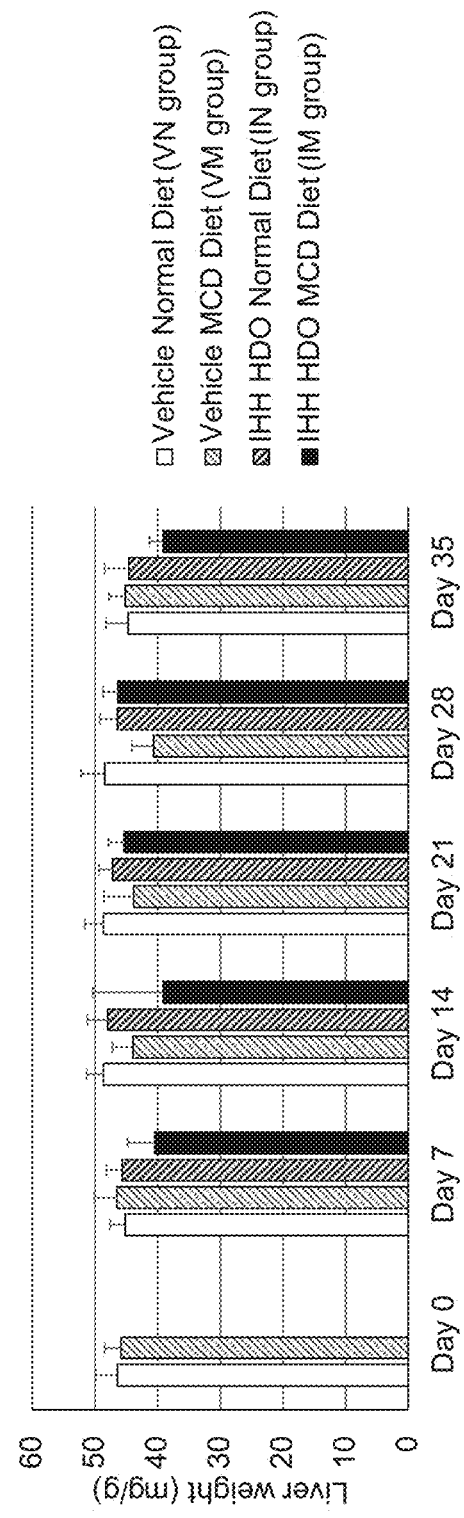

[Example 14] Influence of Toc-Ren-1-12-27 HDO on Body Weight and Liver Weight in NASH Pathological Mouse Models Prepared by Feeding MCD Diet To the NASH pathological mouse models prepared by feeding an MCD diet, a vehicle or Toc-Ren-1-12-27 HDO was administered once a week for 5 weeks, and the influence of administration on the body weight and the liver weight in the mice was inspected. As a result, as shown in FIG. 15 A and FIG. 15 B, significantly decreased body weight and liver weight were observed in the VM group compared with the VN group (P<0.0001).

Figure 16:
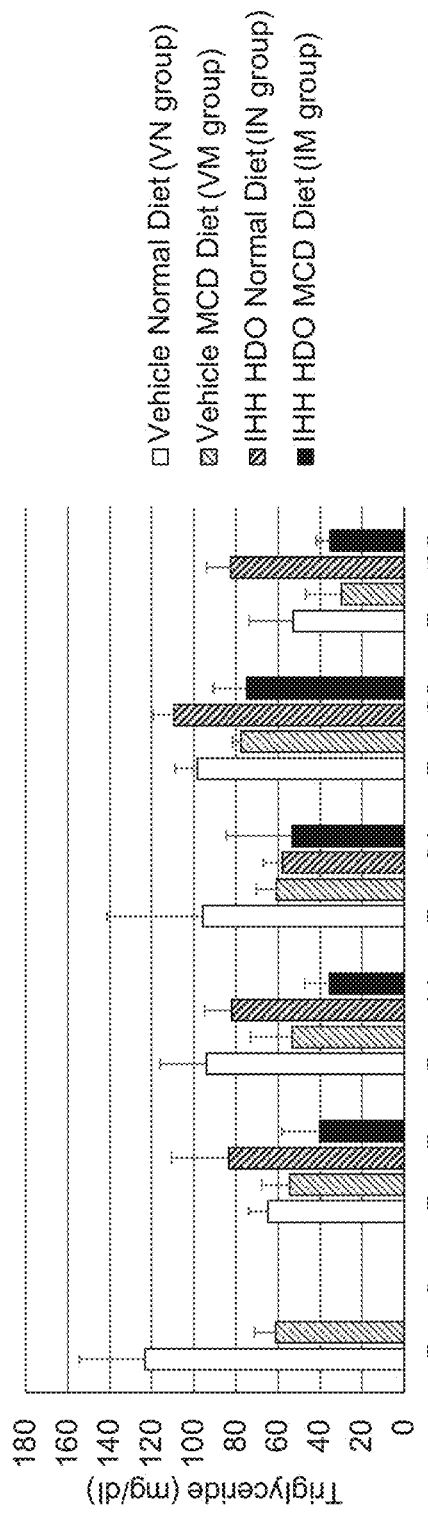
FIG. 16 shows the influence of Toc-Ren-1-12-27 HDO on (A) the blood triglyceride level and (B) the blood cholesterol level in NASH pathological mouse models prepared by feeding an MCD diet.
Figure 16:

To the NASH pathological mouse models prepared by feeding an MCD diet, a vehicle or Toc-Ren-1-12-27 HDO was administered once a week for 6 weeks, and the influence of administration on the body weight and the liver weight in the mice was inspected. As a result, as shown in FIG. 16, significantly decreased body weight and liver weight were observed in the VM group compared with the VN group (P<0.0001). In this case, no significant differences were observed between the VM group and the IM group.

[Example 15] Influence of Toc-Ren-1-12-27 HDO on Blood Triglyceride Level and Blood Cholesterol Level in NASH Pathological Mouse Models Prepared by Feeding MCD Diet To the NASH pathological mouse models prepared by feeding an MCD diet, a vehicle or Toc-Ren-1-12-27 HDO was administered once a week for 5 weeks, and the influence of administration on the blood triglyceride level and the blood cholesterol level in the mice was inspected. As a result, as shown in FIG. 16 A and FIG. 16 B, significantly decreased blood triglyceride level and blood cholesterol level were observed in the VM group compared with the VN group (P<0.0001 each). While no significant differences were observed in the blood triglyceride level between the VM group and the IM group, a significantly increased blood cholesterol level was observed (p<0.05).

The above results demonstrate that, as a result of administration of Toc-Ren-1-12-27 HDO (30 nmol (0.3 mg)/kg)) to the NASH pathological mouse models prepared by feeding an MCD diet once a week for 5 weeks, the expression level of IHH mRNA would be decreased and the expression level of COL1A1 mRNA, which is a representative fibrosis marker, would be decreased to a significant extent (P<0.05).

Thus, Toc-Ren-1-12-27 HDO was verified to be a compound capable of serving as a therapeutic agent of NASH.

[Example 16] Tertiary Screening

Figure 17:
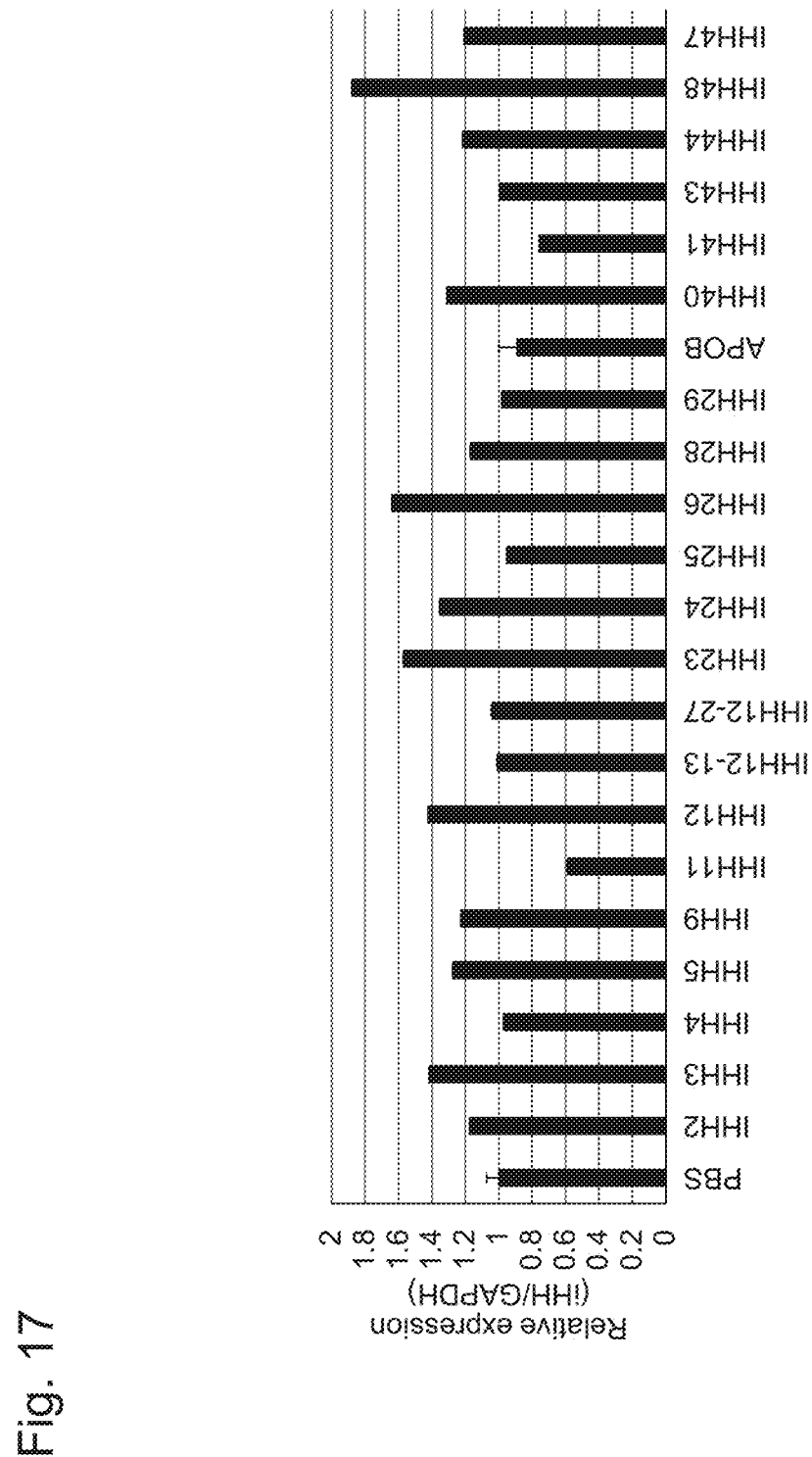
FIG. 17 shows the results of tertiary screening of 37ASOs used in Example 1 and Example 4.

The 37 ASOs used in Example 1 and Example 4 (i.e., Ren-1-2, Ren-1-3, Ren-1-4, Ren-1-5, Ren-1-6, Ren-1-7, Ren-1-9, Ren-1-11, Ren-1-12, Ren-1-12-13, Ren-1-12-27, Ren-1-14, Ren-1-15, Ren-1-16, Ren-1-17, Ren-1-18, Ren-1-19, Ren-1-23, Ren-1-24, Ren-1-25, Ren-1-26, Ren-1-28, Ren-1-29, Ren-1-33, Ren-1-35, Ren-1-36, Ren-1-37, Ren-1-38, Ren-1-39, Ren-1-40, Ren-1-41, Ren-1-43, Ren-1-44, Ren-1-48, Ren-1-47, Ren-1-49, and Ren-1-50), PBS as a negative control, and the antisense nucleic acid of the APOB gene as a positive control were subjected to screening again at nucleic acid concentration of 50 nM, which is different from that in Example 1 and Example 4. Screening was carried out in the same manner as in Example 1 and Example 4 except for different nucleic acid concentration (50 nM). The results are shown in FIG. 17. At nucleic acid concentration of 50 nM, Ren-1-11 and Ren-1-41 were found to inhibit IHH mRNA expression.

[Example 17] Knockdown Activity of Ren-1-12-27, Ren-1-11, Ren-1-39, and Ren-1-41 on IHH Gene Expression in Normal Mouse Liver In this experiment, other 4 ASOs (i.e., Ren-1-12-27, Ren-1-11, Ren-1-39, and Ren-1-41) found to exert strong knockdown activity on IHH gene expression via in vitro screening were subjected to inspection of in vivo knockdown activity.

Figure 18:
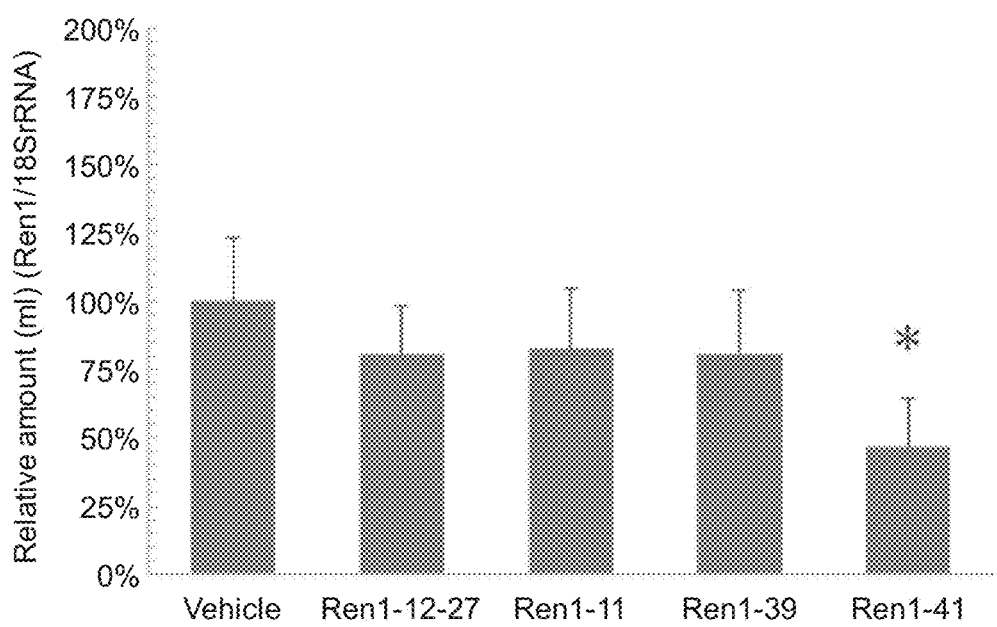
FIG. 18 shows knockdown activity of Ren1 ASO on IHH mRNA expression in the normal mouse liver (*: in comparison with the vehicle administration group; $p<0.05$).

Twenty five 6-week-old normal mice (c57BL/6j) were divided into 5 groups depending on body weight (i.e., Vehicle, Ren-1-12-27, Ren-1-11, Ren-1-39, Ren-1-41). Knockdown activity of the positive control (Ren-1-12-27 (17 mer)) administration group was compared with that of the negative control vehicle administration group. The ASO dose was set at 30 nmol/10 ml/kg and ASO was administered through the caudal vein of the mice (the day of administration: Day 0). Three days after administration (Day 3), the mice were subjected to blood sampling from the heart under isoflurane anesthesia, and the liver was extirpated by opening the abdomen. Total mRNA was extracted from the liver tissue and subjected to reverse transcription and qPCR to assay IHH mRNA expression. The results are shown in FIG. 18.

Compared with the vehicle administration group, the IHH mRNA expression levels in the Ren-1 ASO administration groups were decreased. Knockdown activity of Ren-1-11 and that of Ren-1-39 were equivalent to that of Ren-1-12-27 (20%). The IHH mRNA expression level of the Ren-1-41 administration group was decreased to approximately a half (53%) that of the vehicle administration group, and IHH mRNA was knocked down to a significant extent.

[Example 18] Influence of Toc-Ren-1-12-27 on Mouse NASH/Liver Fibrosis Via MCD Feeding Six-week-old mice were divided into the normal diet group and the MCD (methionine and choline deficient) diet group, and NASH/liver fibrosis models were prepared by feeding an MCD diet. One week after administration of MCD, Toc-Ren1-12-27 was administered intravenously at 30 nmol/kg once a week for 5 weeks.

Figure 19:
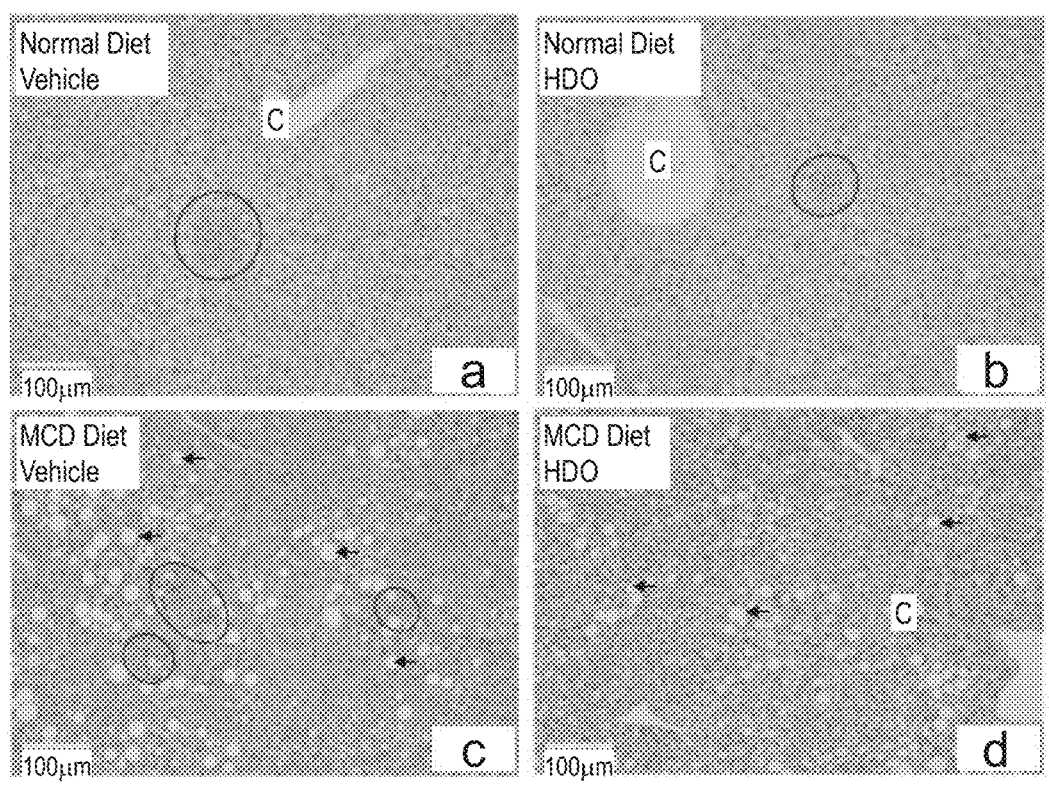
FIG. 19 shows mouse liver tissue demonstrating the influence of Toc-Ren-1-12-27 on NASH pathological mouse models (hematoxylin and eosin staining); a: the diagram of mouse liver tissue of the normal diet+vehicle administration group; b: that of the normal diet+HDO administration group; c: that of the MCD diet+vehicle administration group; and d: that of the MCD diet+HDO administration group. In the figure, "C" indicates the central vein; "G" indicates the Glisson's capsule; "○" indicates an inflammatory cell aggregation; and an arrow (→) indicates a lipid droplet.

FIG. 19 shows the results of HE staining of the liver tissue 5 week after administration of Ren1-12-27.

In the vehicle administration group, aggregation of a larger number of inflammatory cells resulting from administration of the MCD diet (FIG. 19c) (within black circles) leading to intrahepatic lipid droplets and ballooning changes is more often observed, compared with the normal diet group (FIG. 19a).

In the HDO administration group, in contrast, aggregation of inflammatory cells was observed in the normal diet group (FIG. 19b). Aggregation of a larger number of inflammatory cells observed as a result of administration of the MCD diet (FIG. 19c) was decreased as a result of HDO administration, and such aggregation was not observed in FIG. 19d. Also, intrahepatic lipid droplets and ballooning changes were decreased in the HDO administration group.

Figure 20:
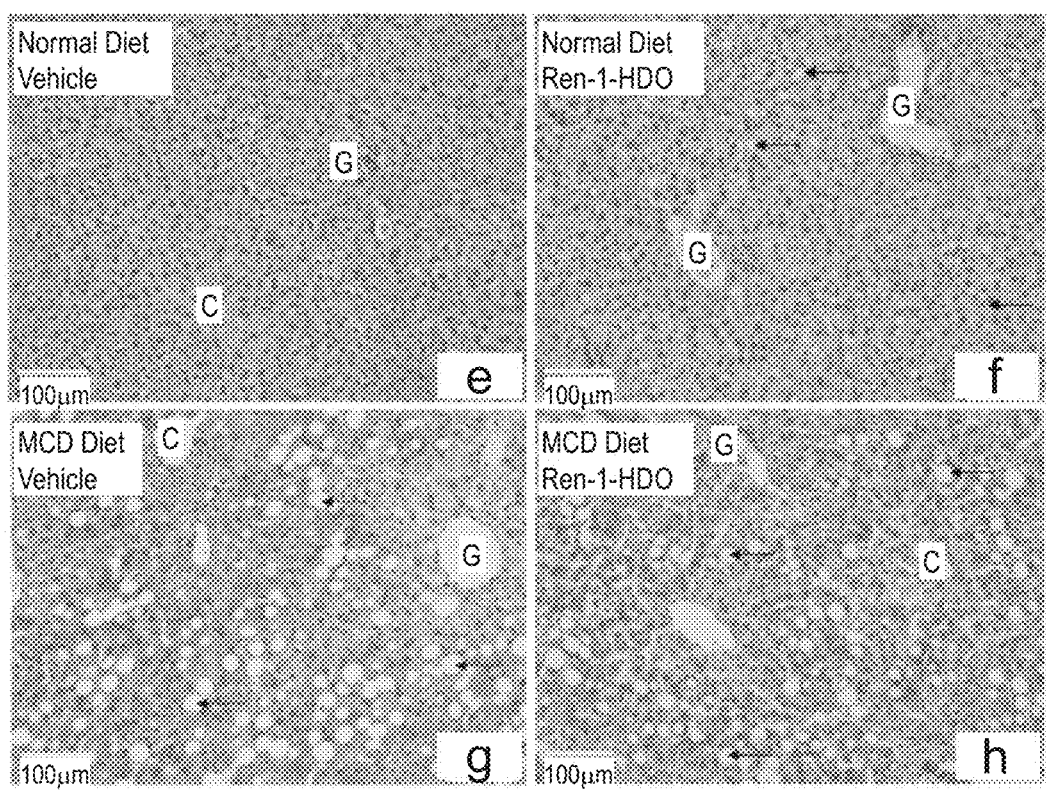
FIG. 20 shows liver tissue of the NASH pathological mouse models 5 weeks after the administration of Ren1-12-27 (Oil red O staining); e: the normal diet+vehicle administration group; f: the normal diet+HDO administration group; g: the MCD diet+vehicle administration group; and h: the MCD diet+HDO administration group. In the figure, "C" indicates the central vein; "G" indicates the Glisson's capsule; and an arrow (←) indicates a lipid droplet.

FIG. 20 shows the results of Oil red O staining of the liver tissue 5 weeks after administration of Ren1-12-27. In the vehicle administration group, adipose degeneration of liver tissue cells resulting from administration of the MCD diet was more often observed (i.e., stained red via Oil red O staining), compared with the normal diet group (FIG. 20e). Also, a large number of intrahepatic lipid droplets was observed.

In contrast, more adipose degeneration was observed in the HDO administration group (FIG. 20h), compared with the normal diet group (FIG. 20f), but the number of lipid tissue and that of lipid droplets stained red via Oil red O staining were apparently decreased compared with the vehicle administration group (FIG. 20g).

Figure 21:
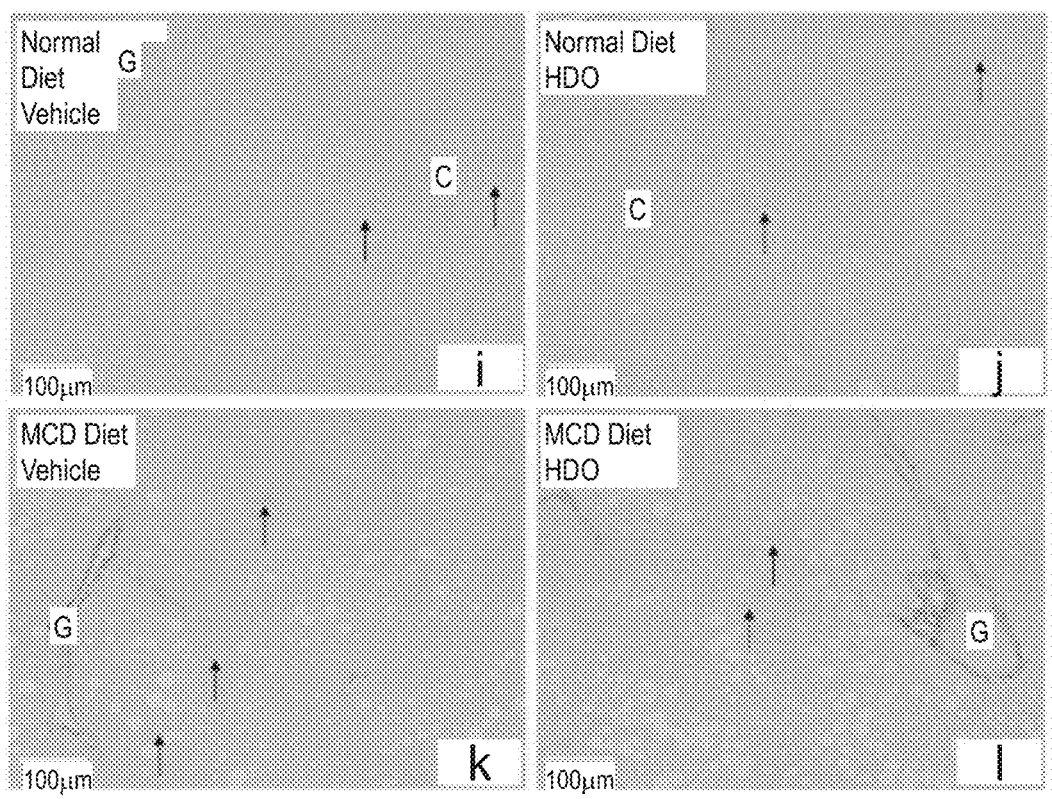
FIG. 21 shows liver tissue of the NASH pathological mouse models 5 weeks after the administration of Ren1-12-27 (Sirius staining); i: the normal diet+vehicle administration group; j: the normal diet+HDO administration group; k: the MCD diet+vehicle administration group; and l: the MCD diet+HDO administration group. In the figure, "C" indicates the central vein; "G" indicates the Glisson's capsule; and an arrow (T) indicates a collagen fiber.

FIG. 21 shows the results of Sirius staining of the liver tissue 5 weeks after administration of Ren-1-12-27. Because of a short observation period in the present test, no significant liver fibrosis caused by the MCD diet (FIG. 21k) was observed compared with the normal diet group (FIG. 21i). In the MCD diet group, in addition, no significant differences were observed in the results of collagen staining between the Ren-1 HDO administration group and the vehicle administration group (FIG. 21k).

Table 6 shows the results of evaluation of NAFLD activity scores* (NAS). In the normal diet groups, no significant differences were observed in NAS between the vehicle administration group and the Ren-1 HDO administration group, and the normal diet groups were pathologically diagnosed to have NAFLD.

In the MCD diet administration groups, in contrast, the vehicle administration group exhibited NAS of 5, and the results of pathological diagnosis was NASH. In contrast, the Ren-1 HDO administration group exhibited NAS lowered to 3, and the results of pathological diagnosis was borderline NASH. It was verified that administration of Ren-1 HDO would exert therapeutic effects on fatty liver generation and invasion by inflammatory cells caused by the MCD diet.

As a result of NAS evaluation, the fibrosis stages of the administration groups were 0 to 1A, and no significant differences were observed.

Figure 22:
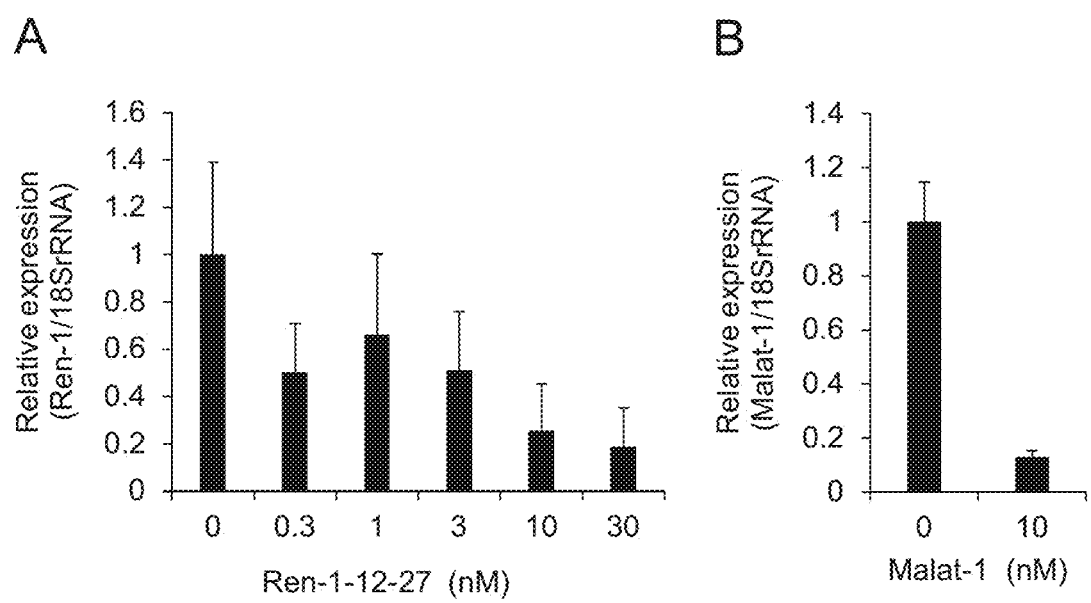
FIG. 22 shows inhibitory effects of Ren-1-12-27 on IHH mRNA expression in normal mouse pulmonary fibroblasts (MPFs); A: inhibitory effects on IHH mRNA expression; and B: inhibitory effects on Malat-1 mRNA expression (the positive control).

$CO_2$ incubator for 2 hours to perform PLL coating. Subsequently, MPFs cultured in a dedicated-purpose medium (Fibroblast Medium, Cat. #2301) in advance were sowed onto a PLL-coated 24-well plate for adhesion cell culture at $1 \times 10^5$ cells/well. On the following day, Ren-1-12-27 ASO was transfected using Lipofectamine 2000 (Thermo Fisher Scientific). In this case, ASO doses were 0, 0.3, 1, 3, 10, and 30 (nM), and Malat-1ASO doses as the positive controls were 0 and 10 (nM). Subsequently, total RNA was purified using the SV96 Total RNA Isolation System (Promega) 2 days after transfection, and cDNA was synthesized from total RNA using PrimeScript™RT Master Mix (TAKARA BIO INC.) qPCR was performed using StepOnePlus-01 (Thermo Fisher Scientific), reagents designed in TaqMan Gene Expression Assays (Thermo Fisher Scientific) were used for mouse Ren-1 and mouse 18SrRNA primers/probes, Ct values of mouse Ren-land mouse 18SrRNA were measured, and the mRNA expression levels were calculated via relative quantification based on the ΔΔCt method. FIG. 22 shows the results of inspection of inhibitory effects of Ren-1-12-27 ASO on IHH mRNA expression in MPFs.

The results of the experiment demonstrate that IHH mRNA expression would be inhibited upon transfection of Ren-1-12-27 ASO into MPF (FIG. 22A). Also, expression of Malat-1 mRNA used as the positive control was inhibited by Malat-1 ASO (FIG. 22B).

TABLE 6

Results of NAFLD activity score evaluation

| | Normal Diet | | | | MCD Diet | | | |
|---|---|---|---|---|---|---|---|---|
| | Vehicle | | Ren-1 HDO | | Vehicle | | Ren-1 HDO | |
| | Identification No. | | | | | | | |
| | 1 | 2 | 3 | 4 | 5 | 6 | 7 | 8 |
| Hepatic fat accumulation | 1 | 1 | 1 | 0 | 3 | 3 | 3 | 3 |
| Invasion of lobule by inflammatory cells | 1 | 1 | 1 | 1 | 2 | 2 | 0 | 0 |
| Ballooning change of liver cell | 0 | 0 | 0 | 0 | 0 | 0 | 0 | 0 |
| Total score | 2 | 2 | 2 | 1 | 5 | 5 | 3 | 3 |
| Diagnosis | NAFLD | NAFLD | NAFLD | NAFLD | NASH | NASH | Borderline NASH | Borderline NASH |
| NAS fibrosis stage | 0-1A | 0-1A | 0-1A | 0-1A | 0-1A | 0-1A | 0-1A | 0-1A |
| Presence/absence of Mallory Denk body | None | None | None | None | None | None | None | None |
| Presence/absence of cytoplasmic invagination into nucleus | None | None | None | None | None | None | None | None |

NAFLD: nonalcoholic fatty liver disease;
NASH: nonalcoholic steatohepatitis;
NAS: NAFLD activity score;
*Kleiner DE1, Brunt E M, Van Natta M, et al., Design and validation of a histological scoring system for nonalcoholic fatty liver disease. Hepatology. 2005 June; 41(6): 1313-21.

[Example 19] Inhibitory Effects of Ren-1-12-27 on IHH mRNA Expression in Normal Mouse Pulmonary Fibroblasts (MPF)

Normal mouse pulmonary fibroblasts (MPF: Cat. No. M3300-57) were purchased from ScienCell Research Laboratories. Experiment aimed at inspection of inhibitory effects of Ren-1-12-27 on IHH mRNA expression using MPF was performed in the manner described below. To a commercially available 24-well plate for adhesion cell culture, a poly-L-lysine (PLL) solution (ScienCell Research Laboratories) diluted to 700-fold with sterilized water was fractionated at 0.5 ml/well, and incubation was carried out in a

[Example 20] Inhibitory Effects of Ren-1-12-27 on IHH mRNA Expression in Normal Mouse Dermal Fibroblasts (MDF)

Figure 23:
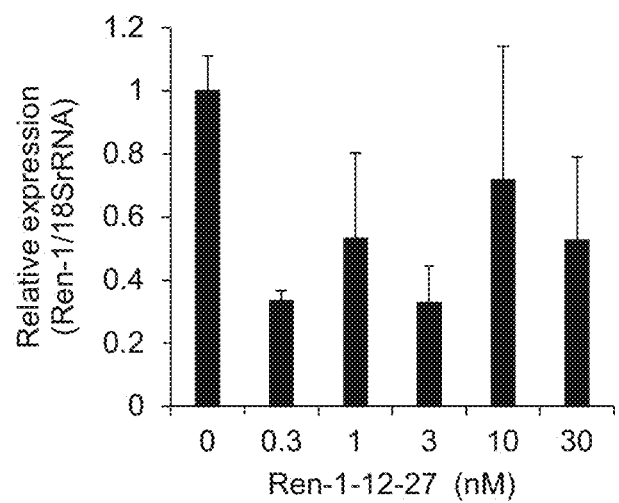
FIG. 23 shows inhibitory effects of Ren-1-12-27 on IHH mRNA expression in normal mouse dermal fibroblasts (MDFs); A: inhibitory effects on IHH mRNA expression; and B: inhibitory effects on Malat-1 mRNA expression (the positive control).
Figure 23:
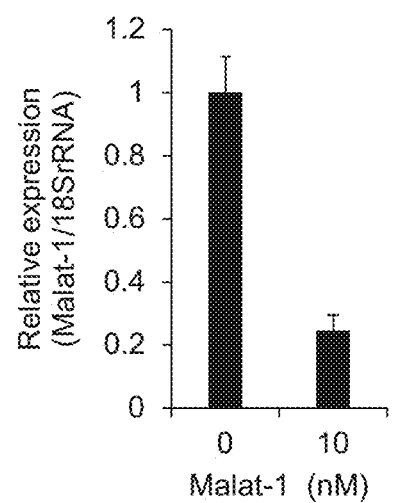

Normal mouse dermal fibroblasts (MDF: Cat. No. M2300-57) were purchased from ScienCell Research Laboratories. Experiment aimed at inspection of inhibitory effects of Ren-1-12-27 on IHH mRNA expression using MDF was performed in the same manner as in Example 19 as described below. Specifically, MDFs cultured in a dedicated-purpose medium (Fibroblast Medium-2, Cat. #2331) in advance were sowed onto a PLL-coated 24-well plate for adhesion cell culture at $1 \times 10^5$ cells/well. In the same manner as in Example 22, transfection, mRNA extraction, cDNA synthesis, and qPCR were performed. FIG. 23 shows the results of inspection of inhibitory effects of Ren-1-12-27 ASO on IHH mRNA expression in MDFs.

The results attained in the present example demonstrate that transfection of Ren-1-12-27 ASO into MDF would inhibit IHH mRNA expression (FIG. 23A). Also, expression of Malat-1 mRNA used as a positive control was inhibited by Malat-1ASO (FIG. 23B).

[Example 21] Inhibitory Effects of Ren-1-12-27 on IHH mRNA Expression in TGF-Beta1-Stimulated Normal Mouse Renal Proximal Tubular Epithelial Cells (MRPTEC)

Figure 24:
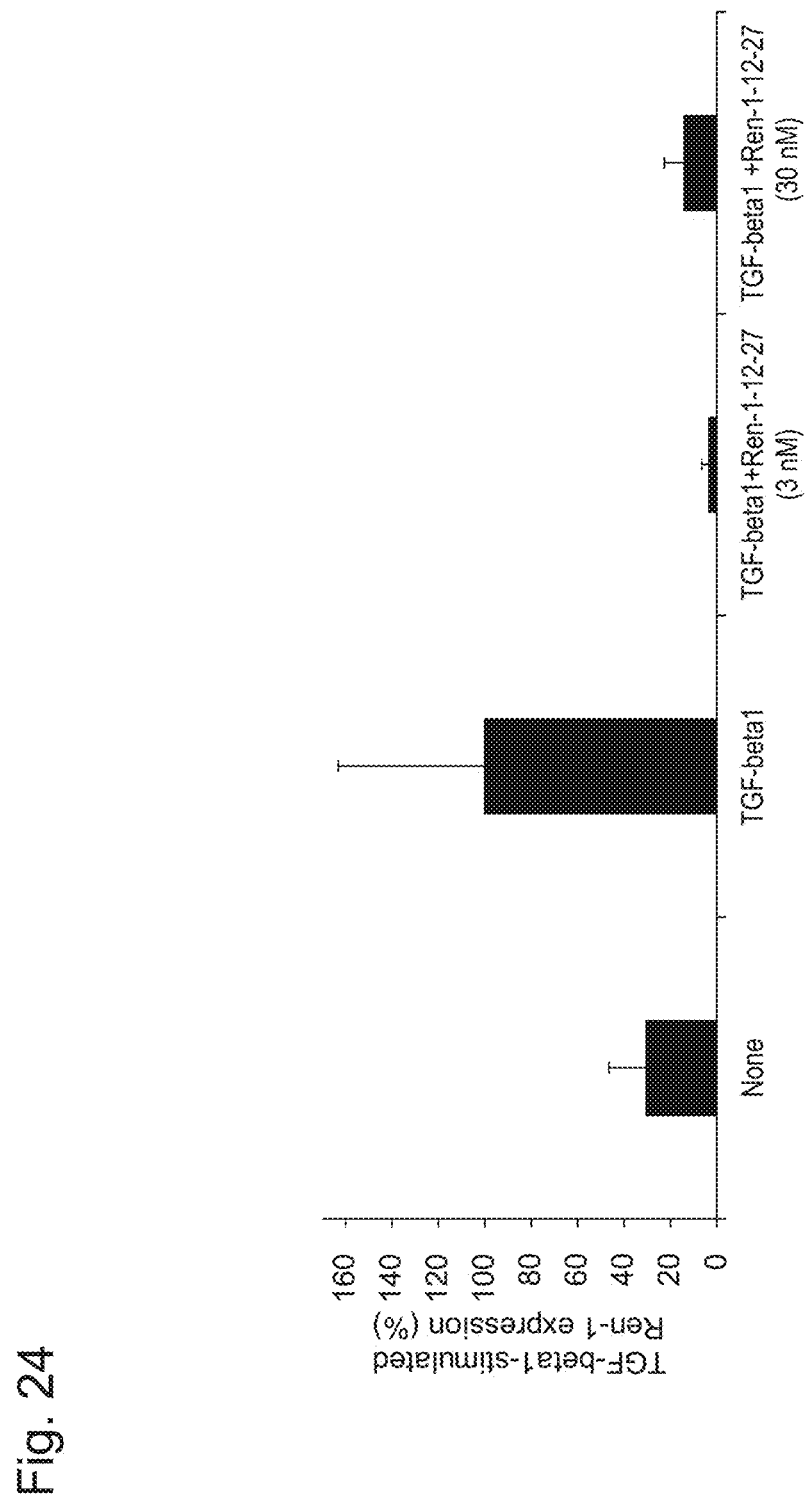
FIG. 24 shows inhibitory effects of Ren-1-12-27 on IHH mRNA expression in TGF-beta1-stimulated normal mouse renal proximal tubular epithelial cells (MRPTECs).

Normal mouse renal proximal tubular epithelial cells (MRPTEC; Cat. No. M4100) were purchased from ScienCell Research Laboratories. Experiment aimed at inspection of inhibitory effects of Ren-1-12-27 on IHH mRNA expression using MRPTEC was performed in the manner described below. Specifically, MRPTECs cultured in a dedicated-purpose medium (Epithelial Cell Medium-animal, Cat. #4131 NZ) in advance were sowed onto a PLL-coated 24-well plate for adhesion cell culture at $1\times10^4$ cells/well. On the following day, MRPTECs were transfected in the same manner as in Example 19. Subsequently, the cells were washed two times with 1 ml of PBS on the following day, and the medium was exchanged with 0.5 ml of a medium containing RPMI 1640, 0.2% FBS, and penicillin/streptomycin. On the following day, in addition, TGF-beta1 (10 ng/ml) was added to all wells other than Ren-1-12-27-free wells (the negative control), culture was conducted for an additional 24 hours, and RNA extraction, cDNA synthesis, and qPCR were then performed. FIG. 24 shows the results of inspection of inhibitory effects of Ren-1-12-27 ASO on IHH mRNA expression in TGF-beta1-stimulated MRPTECs.

The results attained in the present example demonstrate that IHH mRNA expression would be inhibited to a significant extent upon transfection of Ren-1-12-27 ASO into TGF-beta1-stimulated MRPTEC (FIG. 24).

INDUSTRIAL APPLICABILITY

The nucleic acid complex according to the present invention is useful as a therapeutic agent of fibrosis.
[Sequence Listing Free Text]
SEQ ID NOs: 3 to 194; Synthetic All publications, patents, and patent applications cited herein are incorporated herein by reference in their entirety.

The invention claimed is:

1. A nucleic acid complex comprising an oligonucleotide having a nucleic acid base sequence complementary to an Indian hedgehog (IHH) gene (SEQ ID NO: 1) transcription product, wherein the oligonucleotide is composed of 14 to 30 continuous nucleotides comprising a nucleic acid base sequence as shown in any of SEQ ID NO: 24, 26, 160, 170, 178, 180, or 184.

2. The nucleic acid complex according to claim 1, wherein the oligonucleotide is a single-stranded oligonucleotide.

3. The nucleic acid complex according to claim 1, which is a heteroduplex oligonucleotide consisting of an antisense strand consisting of the oligonucleotide and a nucleic acid strand complementary to the antisense strand.

4. The nucleic acid complex according to claim 2, wherein the oligonucleotide comprises at least 1 modified nucleotide.

5. The nucleic acid complex according to claim 1, wherein
  (i) the oligonucleotide comprises at least 1 phosphorothioate oligonucleotide,
  (ii) the oligonucleotide comprises at least 1 phosphodiester oligonucleotide, or
  iii) the oligonucleotide is phosphorothioate oligonucleotide.

6. The nucleic acid complex according to claim 2, wherein the oligonucleotide comprises a modified nucleic acid base.

7. The nucleic acid complex according to claim 6, wherein the modified nucleic acid base is 5-methylcytosine, 2'-MOE, BNA, LNA, or AmNA.

8. The nucleic acid complex according to claim 3, wherein the nucleic acid strand complementary to the antisense strand is RNA.

9. The nucleic acid complex according to claim 1, wherein the oligonucleotide comprises:
  a gap region consisting of a plurality of nucleic acids;
  a 5'-wing region consisting of a plurality of nucleic acids; and
  a 3'-wing region consisting of a plurality of nucleic acids.

10. The nucleic acid complex according to claim 1, which comprises a functional part having labeling functions, purification functions, and/or functions of delivery to a target.

11. The nucleic acid complex according to claim 10, wherein the functional part is a compound selected from among a compound, which is a fluorescent protein or luciferase; a compound, which is biotin, avidin, His-tag peptide, GST-tag peptide, or FLAG-tag peptide; lipid, which is cholesterol or fatty acid; fat-soluble vitamin, which is as vitamin E, tocopherols, tocotrienols, vitamin A, vitamin D, or vitamin K; and an intermediate metabolite, which is acylcarnitine or acyl-CoA; a glycolipid; and a glyceride.

12. An Indian hedgehog (IHH)-specific inhibitor comprising the nucleic acid complex according to claim 1.

13. A therapeutic agent of fibrosis, Nash, hepatic fibrosis, renal fibrosis, pancreatic fibrosis, pulmonary fibrosis, or dermal fibrosis comprising the nucleic acid complex according to claim 1.

14. A heteroduplex oligonucleotide consisting of an antisense strand, which is an oligonucleotide, and a nucleic acid strand, which is an oligonucleotide having a nucleic acid base sequence complementary to the antisense strand, wherein the antisense strand has a nucleic acid base sequence complementary to an Indian hedgehog (IHH) gene (SEQ ID NO: 1) transcription product consisting of 14 to 30 continuous nucleotides comprising a nucleic acid base sequence as shown in any of SEQ ID NO: 24, 26, 160, 170, 178, 180, or 184, the antisense strand is a DNA strand, the complementary strand is an RNA strand, and the antisense strand comprises:

a gap region consisting of at least 4 nucleic acids recognized by RNase H;

a 5'-wing region consisting of a plurality of nucleic acids including at least 1 modified nucleic acid; and a 3'-wing region consisting of a plurality of nucleic acids including at least 1 modified nucleic acid.

15. The heteroduplex oligonucleotide according to claim 14, wherein the gap region of the antisense strand and the complementary strand comprise at least 1 modified nucleotide.

16. The heteroduplex oligonucleotide according to claim 14, wherein the oligonucleotide comprises at least 1 phosphorothioate oligonucleotide, or at least 1 phosphodiester oligonucleotide.

17. The heteroduplex oligonucleotide according to claim 14, wherein the oligonucleotide comprises a modified nucleic acid base.

18. The heteroduplex oligonucleotide according to claim 17, wherein the modified nucleic acid base is 5-methylcytosine, 2'-MOE, BNA, LNA, or AmNA.

19. An Indian hedgehog (IHH)-specific inhibitor comprising the heteroduplex oligonucleotide according to claim 14.

20. A therapeutic agent of fibrosis, Nash, hepatic fibrosis, renal fibrosis, pancreatic fibrosis, pulmonary fibrosis, or dermal fibrosis containing an Indian hedgehog (IHH)-specific inhibitor, which comprises the heteroduplex oligonucleotide according to claim 14.

* * * * *